United States Patent
Yang et al.

(10) Patent No.: US 11,635,887 B2
(45) Date of Patent: Apr. 25, 2023

(54) DEVICES, METHODS, AND GRAPHICAL USER INTERFACES FOR PROVIDING AND INTERACTING WITH NOTIFICATIONS

(71) Applicant: Apple Inc., Cupertino, CA (US)

(72) Inventors: Lawrence Y. Yang, Bellevue, WA (US); Christopher P. Foss, San Francisco, CA (US); Stephen O. Lemay, San Francisco, CA (US); Jonathan R. Dascola, San Francisco, CA (US); Woo-Ram Lee, Bellevue, WA (US); Chanaka G. Karunamuni, San Jose, CA (US)

(73) Assignee: APPLE INC., Cupertino, CA (US)

( * ) Notice: Subject to any disclaimer, the term of this patent is extended or adjusted under 35 U.S.C. 154(b) by 449 days.

(21) Appl. No.: 16/136,178

(22) Filed: Sep. 19, 2018

(65) Prior Publication Data

US 2019/0018586 A1 Jan. 17, 2019

Related U.S. Application Data

(63) Continuation of application No. 15/835,366, filed on Dec. 7, 2017, now Pat. No. 10,802,705, which is a
(Continued)

(51) Int. Cl.
*G06F 3/0488* (2022.01)
*H04L 51/224* (2022.01)
(Continued)

(52) U.S. Cl.
CPC ........ *G06F 3/04883* (2013.01); *G06F 3/0482* (2013.01); *G06F 3/04847* (2013.01);
(Continued)

(58) Field of Classification Search
CPC .. G06F 3/0488; G06F 3/04883; G06F 3/0482; G06F 3/04847; H04L 51/04; H04M 1/72522; H04M 1/72566; H04W 4/14
See application file for complete search history.

(56) References Cited

U.S. PATENT DOCUMENTS

| 5,745,116 A | 4/1998 | Pisutha |
| 5,958,006 A | 9/1999 | Egglesteon et al. |

(Continued)

FOREIGN PATENT DOCUMENTS

| CA | 2 917 174 A1 | 1/2015 |
| CN | 101950236 | 1/2011 |

(Continued)

OTHER PUBLICATIONS

YouTube, "Android Lollipop Lock-Screen Notification Tips", https://www.youtube.com/watch?v=LZTxHBOwzIU, Nov. 13, 2014, 3 pages.
(Continued)

*Primary Examiner* — Kavita Stanley
*Assistant Examiner* — William Wong
(74) *Attorney, Agent, or Firm* — Morgan, Lewis & Bockius LLP

(57) ABSTRACT

An electronic device includes instructions for receiving a first communication; in response to receiving the first communication, generating a first notification for the first communication received at the device, the first notification including content of the first communication; receiving a second communication at the device; and in response to receiving the second communication: determining whether the second communication and the first communication are received from the same sender. The instructions include, in accordance with a determination that the second communication and the first communication are from the same sender, updating the first notification such that the updated first
(Continued)

notification concurrently includes the content of the first communication and the second communication; and in accordance with a determination that the second communication and the first communication are not from the same sender, generating a second notification, for concurrent display with the first notification.

21 Claims, 62 Drawing Sheets

Related U.S. Application Data continuation of application No. PCT/US2016/033528, filed on May 20, 2016.

(60) Provisional application No. 62/172,186, filed on Jun. 7, 2015.

(51) Int. Cl.
| | |
|---|---|
| G06F 3/04883 | (2022.01) |
| H04M 1/72403 | (2021.01) |
| G06F 3/0482 | (2013.01) |
| G06F 3/04847 | (2022.01) |
| H04L 51/04 | (2022.01) |
| H04M 1/67 | (2006.01) |
| H04M 1/72436 | (2021.01) |
| H04M 1/72451 | (2021.01) |
| H04W 4/14 | (2009.01) |

(52) U.S. Cl.
CPC ............ H04L 51/04 (2013.01); H04L 51/224 (2022.05); H04M 1/72403 (2021.01); G06F 3/0488 (2013.01); H04M 1/67 (2013.01); H04M 1/72436 (2021.01); H04M 1/72451 (2021.01); H04W 4/14 (2013.01)

(56) References Cited

U.S. PATENT DOCUMENTS

| | | | |
|---|---|---|---|
| 8,738,090 | B2 | 5/2014 | Kanda et al. |
| 8,799,406 | B1 | 8/2014 | Slonh |
| 9,406,103 | B1 | 8/2016 | Gray et al. |
| 2001/0021649 | A1 | 9/2001 | Kinnunen et al. |
| 2004/0162877 | A1 | 8/2004 | Van Dok et al. |
| 2006/0129947 | A1 | 6/2006 | Hamzy et al. |
| 2007/0150842 | A1* | 6/2007 | Chaudhri ............ G06F 3/04883 |
| | | | 715/863 |
| 2007/0156910 | A1 | 7/2007 | Christie et al. |
| 2008/0114716 | A1 | 5/2008 | Mock |
| 2008/0134088 | A1* | 6/2008 | Tse ...................... H04M 3/4938 |
| | | | 715/810 |
| 2008/0140488 | A1 | 6/2008 | Oral et al. |
| 2008/0220752 | A1 | 9/2008 | Forstall et al. |
| 2008/0306997 | A1 | 12/2008 | Keohane et al. |
| 2008/0307323 | A1 | 12/2008 | Coffman et al. |
| 2008/0316183 | A1 | 12/2008 | Westerman et al. |
| 2009/0005011 | A1 | 1/2009 | Christie et al. |
| 2009/0174680 | A1 | 7/2009 | Anzures et al. |
| 2009/0228322 | A1 | 9/2009 | Van Os et al. |
| 2010/0123724 | A1 | 5/2010 | Moore et al. |
| 2010/0125785 | A1 | 5/2010 | Moore et al. |
| 2010/0125811 | A1* | 5/2010 | Moore ................. G06F 3/04817 |
| | | | 715/846 |
| 2010/0146384 | A1 | 6/2010 | Peev et al. |
| 2010/0159994 | A1 | 6/2010 | Stallings et al. |
| 2010/0159995 | A1 | 6/2010 | Stallings et al. |
| 2010/0257490 | A1* | 10/2010 | Lyon ..................... G06F 3/0488 |
| | | | 715/863 |
| 2011/0081889 | A1 | 4/2011 | Gao et al. |
| 2011/0087970 | A1* | 4/2011 | Swink ..................... G06F 9/451 |
| | | | 715/752 |
| 2011/0105096 | A1 | 5/2011 | Dods et al. |
| 2011/0167357 | A1 | 7/2011 | Benjamin et al. |
| 2011/0184768 | A1 | 7/2011 | Norton et al. |
| 2012/0081375 | A1* | 4/2012 | Robert .................... G06F 9/445 |
| | | | 345/522 |
| 2012/0084691 | A1 | 4/2012 | Yun |
| 2012/0233239 | A1* | 9/2012 | Urim ...................... G06F 9/542 |
| | | | 709/203 |
| 2012/0284297 | A1 | 11/2012 | Aguera-Arcas et al. |
| 2013/0007665 | A1 | 1/2013 | Chaudhri et al. |
| 2013/0080923 | A1 | 3/2013 | Anzures et al. |
| 2013/0102281 | A1 | 4/2013 | Kanda et al. |
| 2013/0145295 | A1 | 6/2013 | Bocking et al. |
| 2013/0185650 | A1 | 7/2013 | Gutowitz |
| 2013/0219332 | A1* | 8/2013 | Woley .................... G06F 3/048 |
| | | | 715/808 |
| 2013/0290058 | A1 | 10/2013 | Gray et al. |
| 2013/0332826 | A1 | 12/2013 | Karunamuni et al. |
| 2013/0346882 | A1 | 12/2013 | Shiplacoff et al. |
| 2013/0346892 | A1 | 12/2013 | Wren et al. |
| 2013/0346922 | A1 | 12/2013 | Shiplacoff et al. |
| 2014/0055426 | A1* | 2/2014 | Park ..................... G06F 3/03545 |
| | | | 345/179 |
| 2014/0089857 | A1 | 3/2014 | Wang et al. |
| 2014/0101768 | A1 | 4/2014 | Miller et al. |
| 2014/0118272 | A1 | 5/2014 | Gunn et al. |
| 2014/0189524 | A1 | 7/2014 | Murarka et al. |
| 2014/0201527 | A1 | 7/2014 | Krivorot |
| 2014/0282084 | A1 | 9/2014 | Murarka et al. |
| 2014/0282233 | A1 | 9/2014 | Sandler et al. |
| 2014/0310643 | A1 | 10/2014 | Karmanenko et al. |
| 2014/0335827 | A1 | 11/2014 | Tsuda |
| 2014/0366158 | A1 | 12/2014 | Han et al. |
| 2014/0378099 | A1 | 12/2014 | Huang et al. |
| 2015/0004945 | A1* | 1/2015 | Steeves .................... H04W 4/12 |
| | | | 455/412.2 |
| 2015/0019966 | A1 | 1/2015 | Jeon et al. |
| 2015/0082255 | A1 | 3/2015 | DeVries et al. |
| 2015/0082446 | A1 | 3/2015 | Flowers et al. |
| 2015/0094120 | A1 | 4/2015 | Suh et al. |
| 2015/0121312 | A1 | 4/2015 | Li |
| 2016/0028875 | A1 | 1/2016 | Brown et al. |
| 2016/0048316 | A1 | 2/2016 | Bae et al. |
| 2016/0124614 | A1 | 5/2016 | Bromberg et al. |
| 2016/0266769 | A1* | 9/2016 | Oursbourn ............. G06V 30/40 |
| 2017/0097715 | A1 | 4/2017 | Kim et al. |
| 2018/0101297 | A1 | 4/2018 | Yang et al. |
| 2018/0165002 | A1 | 6/2018 | Yang et al. |

FOREIGN PATENT DOCUMENTS

| | | |
|---|---|---|
| CN | 102111505 A | 6/2011 |
| CN | 102239740 A | 11/2011 |
| CN | 102317887 | 1/2012 |
| CN | 102821180 A | 12/2012 |
| CN | 102929917 A | 2/2013 |
| CN | 103019681 A | 4/2013 |
| CN | 103049274 | 4/2013 |
| CN | 103235688 | 8/2013 |
| CN | 104090720 A | 10/2014 |
| CN | 104169855 A | 11/2014 |
| CN | 104317516 A | 1/2015 |
| CN | 104331246 A | 2/2015 |
| CN | 104503689 | 4/2015 |
| CN | 104584488 | 4/2015 |
| EP | 2 219 105 A1 | 8/2010 |
| EP | 2 521 080 A2 | 11/2012 |
| EP | 2 787 465 A1 | 10/2014 |
| WO | WO 01/27783 | 4/2001 |
| WO | WO 2009/012820 A1 | 1/2009 |
| WO | WO 2012/172164 A1 | 12/2011 |
| WO | WO 2012/170446 A2 | 12/2012 |
| WO | WO 2014/160327 A1 | 10/2014 |
| WO | WO 2014/101527 A1 | 10/2015 |

(56) References Cited

OTHER PUBLICATIONS

Final Office Action, dated Apr. 5, 2019, 2018, received in U.S. Appl. No. 15/835,366, 17 pages.
Office Action, dated May 13, 2019, received in Australian Patent Application No. 2017276028, which corresponds with U.S. Appl. No. 15/835,366, 4 pages.
Intention to Grant, dated Apr. 30, 2019, received in European Patent Application No. 16728165.8, which corresponds with U.S. Appl. No. 15/835,366, 7 pages.
Office Action, dated Nov. 29, 2018, received in U.S. Appl. No. 15/835,382, 38 pages.
Final Office Action, dated Apr. 8, 2019, received in U.S. Appl. No. 15/835,382, 20 pages.
Office Action, dated Jun. 26, 2019, received in U.S. Appl. No. 15/835,366, 19 pages.
Notice of Acceptance, dated Jul. 30, 2019, received in Australian Patent Application No. 2017276028, which corresponds with U.S. Appl. No. 15/835,366, 3 pages.
Schulzrinne, "Indication of Message Composition for Instant Messaging", Network Working Group, Comumbia University, Jan. 31, 2005, 14 pages.
Office Action, dated Nov. 16, 2018, received in U.S. Appl. No. 15/835,366, 14 pages.
Office Action, dated Aug. 9, 2018, received in Australian Patent Application No. 2017276028, which corresponds with U.S. Appl. No. 15/835,366, 4 pages.
Office Action, dated Sep. 2, 2016, received in Danish Patent Application No. 201570865, which corresponds with U.S. Appl. No. 15/835,366, 4 pages.
Office Action, dated Mar. 8, 2017, received in Danish Patent Application No. 201570865, which corresponds with U.S. Appl. No. 15/835,366, 5 pages.
Office Action, dated Oct. 10, 2017, received in Danish Patent Application No. No. 201570865, which corresponds with U.S. Appl. No. 15/835,366, 2 pages.
Office Action, dated Jan. 3, 2018, received in Danish Patent Application No. 201570865, which corresponds with U.S. Appl. No. 15/835,366, 2 pages.
Notice of Allowance, dated Mar. 19, 2018, received in Danish Patent Application No. 201570865, which corresponds with U.S. Appl. No. 15/835,366, 2 pages.
Patent, dated May 22, 2018, received in Danish Patent Application No. 201570865, which corresponds with U.S. Appl. No. 15/835,366, 2 pages.
Office Action, dated Sep. 7, 2016, received in Danish Patent Application No. 201570867, which corresponds with U.S. Appl. No. 15/835,366, 3 pages.
Office Action, dated Feb. 21, 2017, received in Danish Patent Application No. 201570867, which corresponds with U.S. Appl. No. 15/835,366, 2 pages.
Office Action, dated Sep. 22, 2017, received in Danish Patent Appliction No. 201570867, which corresponds with U.S. Appl. No. 15/835,366, 2 pages.
Office Action, dated Mar. 13, 2018, received in Danish Patent Appliction No. 201570867, which corresponds with U.S. Appl. No. 15/835,366, 2 pages.
Patent, dated May 7, 2018, received in Danish Patent Appliction No. 201570867, which corresponds with U.S. Appl. No. 15/835,366, 3 pages.
Office Action, dated Oct. 18, 2016, received in Danish Patent Application No. 201570871, which corresponds with U.S. Appl. No. 62/172,186, 4 pages.
Office Action, dated Jun. 12, 2017, received in Danish Patent Application No. 201570871, which corresponds with U.S. Appl. No. 15/835,366, 3 pages.
Office Action, dated Jan. 15, 2018, received in Danish Patent Application No. 201570871, which corresponds with U.S. Appl. No. 15/835,366, 2 pages.
Notice of Allowance, dated Mar. 19, 2018, received in Danish Patent Application No. 201570871, which corresponds with U.S. Appl. No. 15/835,366, 2 pages.
Patent, dated May 22, 2018, received in Danish Patent Application No. 201570871, which corresponds with U.S. Appl. No. 15/835,366, 2 pages.
Office Action, dated Aug. 31, 2016, received in Danish Patent Application No. 201570874, which corresponds with U.S. Appl. No. 15/835,366, 4 pages.
Office Action, dated May 15, 2017, received in Danish Patent Application No. 201570874, which corresponds with U.S. Appl. No. 15/835,366, 4 pages.
Office Action, dated Nov. 16, 2017, received in Danish Patent Application No. 201570874, which corresponds with U.S. Appl. No. 15/835,366, 2 pages.
Notice of Allowance, dated Jan. 26, 2018, received in Danish Patent Application No. 201570874, which corresponds with U.S. Appl. No. 15/835,366, 2 pages.
Patent, dated Apr. 9, 2018, received in Danish Patent Application No. 201570874, which corresponds with U.S. Appl. No. 15/835,366, 3 pages.
Office Action, dated Sep. 7, 2016, received in Danish Patent Application No. 201570880, which corresponds with U.S. Appl. No. 15/835,366, 3 pages.
Office Action, dated Mar. 31, 2017, received in Danish Patent Application No. 201570880, which corresponds with U.S. Appl. No. 15/835,366, 5 pages.
Office Action, dated Oct. 24, 2017, received in Danish Patent Application No. 201570880, which corresponds with U.S. Appl. No. 15/835,366, 5 pages.
Office Action, dated Feb. 1, 2018, received in Danish Patent Application No. 201570880, which corresponds with U.S. Appl. No. 15/835,366, 2 pages.
Office Action, dated May 9, 2018, received in Danish Patent Application No. 201570880, which corresponds with U.S. Appl. No. 15/835,366, 2 pages.
Office Action, dated Aug. 29, 2018, received in European Patent Application No. 16728165.8, which corresponds with U.S. Appl. No. 15/835,366, 4 pages.
Search Report, dated Mar. 30, 2016, received in Danish Patent Application No. 201570865, which corresponds with U.S. Appl. No. 15/835,366, 8 pages.
Search Report, dated dated Apr. 1, 2016, received in Danish Patent Application No. 201570867, which corresponds with U.S. Appl. No. 15/835,366, 8 pages.
Search Report, dated Apr. 12, 2016, received in Danish Patent Application No. 201570871, which corresponds with U.S. Appl. No. 15/835,366, 9 pages.
Search Report, dated Mar. 30, 2016, received in Danish Patent Application No. 201570874, which corresponds with U.S. Appl. No. 15/835,366, 9 pages.
Search Report, dated Apr. 4, 2016, received in Danish Patent Application No. 201570880, which corresponds with U.S. Appl. No. 15/835,366, 8 pages.
Extended European Search Report, dated Oct. 16, 2018, received in European Patent Application No. 18196448.7, which corresponds with U.S. Appl. No. 15/835,366, 9 pages.
International Search Report and Written Opinion, dated Feb. 6, 2017, received in International Patent Application No. PCT/US2016/033528, which corresponds with U.S. Appl. No. 15/835,366, 43 pages.
International Preliminary Report on Patentability, dated Dec. 12, 2017, received in International Patent Application No. PCT/US2016/033528, which corresponds with U.S. Appl. No. 15/835,366, 30 pages.
Final Office Action, dated Oct. 21, 2019, received in U.S. Appl. No. 15/835,366, 17 pages.
Certificate of Grant, dated Nov. 28, 2019, received in Australian Patent Application No. 2017276028, which corresponds with U.S. Appl. No. 15/835,366, 3 pages.
Office Action, dated Oct. 22, 2019, received in Chinese Patent Application No. 201680026995.6, which corresponds with U.S. Appl. No. 15/835,366, 7 pages.

(56) References Cited

OTHER PUBLICATIONS

Decision to Grant, dated Sep. 12, 2019, received in European Patent Application No. 16728165.8, which corresponds with U.S. Appl. No. 15/835,366, 2 pages.
Patent, dated Oct. 9, 2019, received in European Patent Application No. 16728165.8, which corresponds with U.S. Appl. No. 15/835,366, 3 pages.
Office Action, dated Sep. 16, 2019, received in European Patent Application No. 18196448.7, which corresponds with U.S. Appl. No. 15/835,366, 4 pages.
Office Action, dated Feb. 6, 2020, received in U.S. Appl. No. 15/835,366, 15 pages.
Notice of Allowance, dated Mar. 18, 2020, received in Chinese Patent Application No. 201680026995.6, which corresponds with U.S. Appl. No. 15/835,366, 3 pages.
Office Action, dated Mar. 3, 2020, received in Chinese Patent Application No. 2018103753805, which corresponds with U.S. Appl. No. 15/835,366, 7 pages.
Office Action, dated Feb. 26, 2020, received in Chinese Patent Application No. 201810760112.5, which corresponds with U.S. Appl. No. 15/835,366, 7 pages.
Patent, dated Apr. 17, 2020, received in Chinese Patent Application No. 201680026995.6, which corresponds with U.S. Appl. No. 15/835,366, 6 pages.
Intention to Grant, dated Jun. 19, 2020, received in European Patent Application No. 18196448.7, which corresponds with U.S. Appl. No. 15/835,366, 7 pages.
Notice of Allowance, dated Jul. 23, 2020, received in U.S. Appl. No. 15/835,366, 10 pages.
Office Action, dated Nov. 3, 2020, received in Chinese Patent Application No. 201810368058.X, , which corresponds with U.S. Appl. No. 15/835,366, 14 pages.
Office Action, dated May 8, 2021, received in Chinese Patent Application No. 201810368058.X, which corresponds with U.S. Appl. No. 15/835,366, 1 page.
Notice of Allowance, dated Jul. 30, 2021, received in Chinese Patent Application No. 201810368058.X, which corresponds with U.S. Appl. No. 15/835,366, 1 page.
Office Action, dated Nov. 12, 2020, received in Chinese Patent Application No. 2018103753805, which corresponds with U.S. Appl. No. 15/835,366, 12 pages.
Office Action, dated Sep. 15, 2021, received in Chinese Patent Application No. 2018103753805, which corresponds with U.S. Appl. No. 15/835,366, 1 page.
Office Action, dated Jan. 14, 2022, received in Chinese Patent Application No. 2018103753805, which corresponds with U.S. Appl. No. 15/835,366, 5 pages.
Office Action, dated Apr. 2, 2022, received in Chinese Patent Application No. 2018103753805, which corresponds with U.S. Appl. No. 15/835,366, 1 page.
Decision on Appeal, dated Jul. 6, 2022, received Chinese Patent Application No. 2018103753805, which corresponds with U.S. Appl. No. 15/835,366, 1 page.
Notice of Allowance, dated Jul. 25, 2022, received Chinese Patent Application No. 2018103753805, which corresponds with U.S. Appl. No. 15/835,366, 9 pages.
Patent, dated Aug. 18, 2022, received Chinese Patent Application No. 2018103753805, which corresponds with U.S. Appl. No. 15/835,366, 6 pages.
Office Action, dated Jul. 21, 2020, received in Chinese Patent Application No. 201810760112.5, which corresponds with U.S. Appl. No. 15/835,366, 4 pages.
Notice of Allowance, dated Sep. 21, 2020, received in Chinese Patent Application No. 201810760112.5, which corresponds with U.S. Appl. No. 15/835,366, 5 pages.
Patent, dated Nov. 13, 2020, received in Chinese Patent Application No. 201810760112.5, which corresponds with U.S. Appl. No. 15/835,366, 6 pages.
Decision to Grant, dated Aug. 6, 2020, received in European Patent Application No. 18196448.7, which corresponds with U.S. Appl. No. 15/835,366, 2 pages.
Certificate of Grant, dated Sep. 2, 2020, received in European Patent Application No. 18196448.7, which corresponds with U.S. Appl. No. 15/835,366, 3 pages.
Office Action, dated Sep. 13, 2021, received in European Patent Application No. 20193661.4, which corresponds with U.S. Appl. No. 15/835,366, 6 pages.
Office Action, dated Sep. 7, 2020, received in Australian Patent Application No. 2019257353, which corresponds with U.S. Appl. No. 16/136,178, 6 pages.
Grant Certificate, dated Feb. 25, 2021, received in Australian Patent Application No. 2019257353, which corresponds with U.S. Appl. No. 16/136,178, 3 pages.
Extended European Search Report, dated Feb. 2, 2021, received in European Patent Application No. 20193661.4, which corresponds with U.S. Appl. No. 15/835,366, 10 pages.

\* cited by examiner

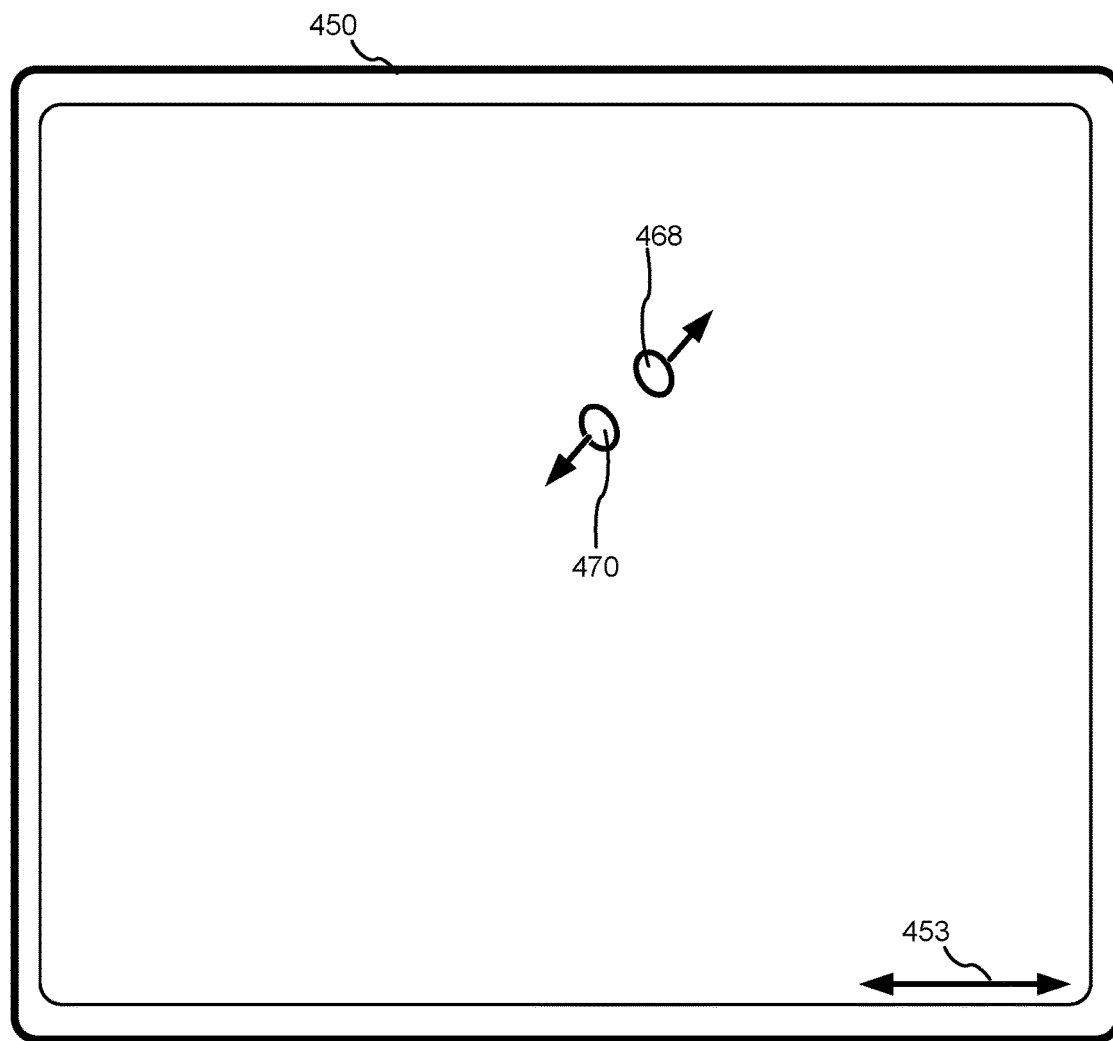
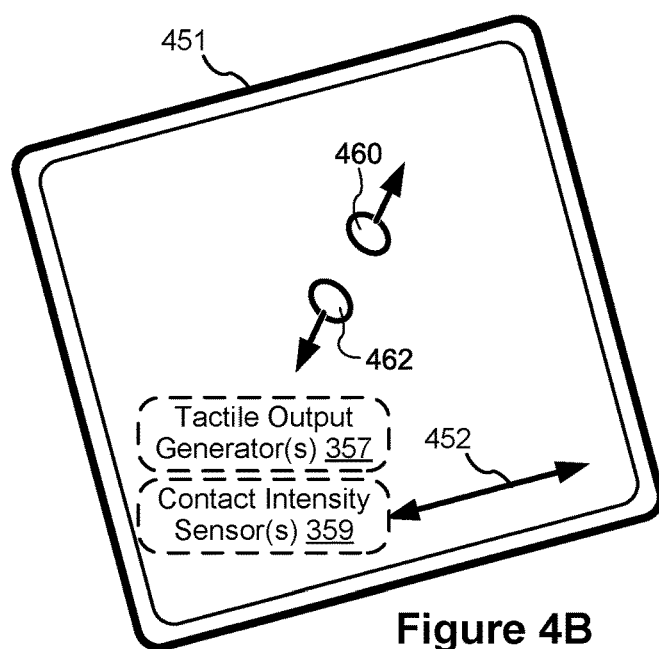
Figure 4B

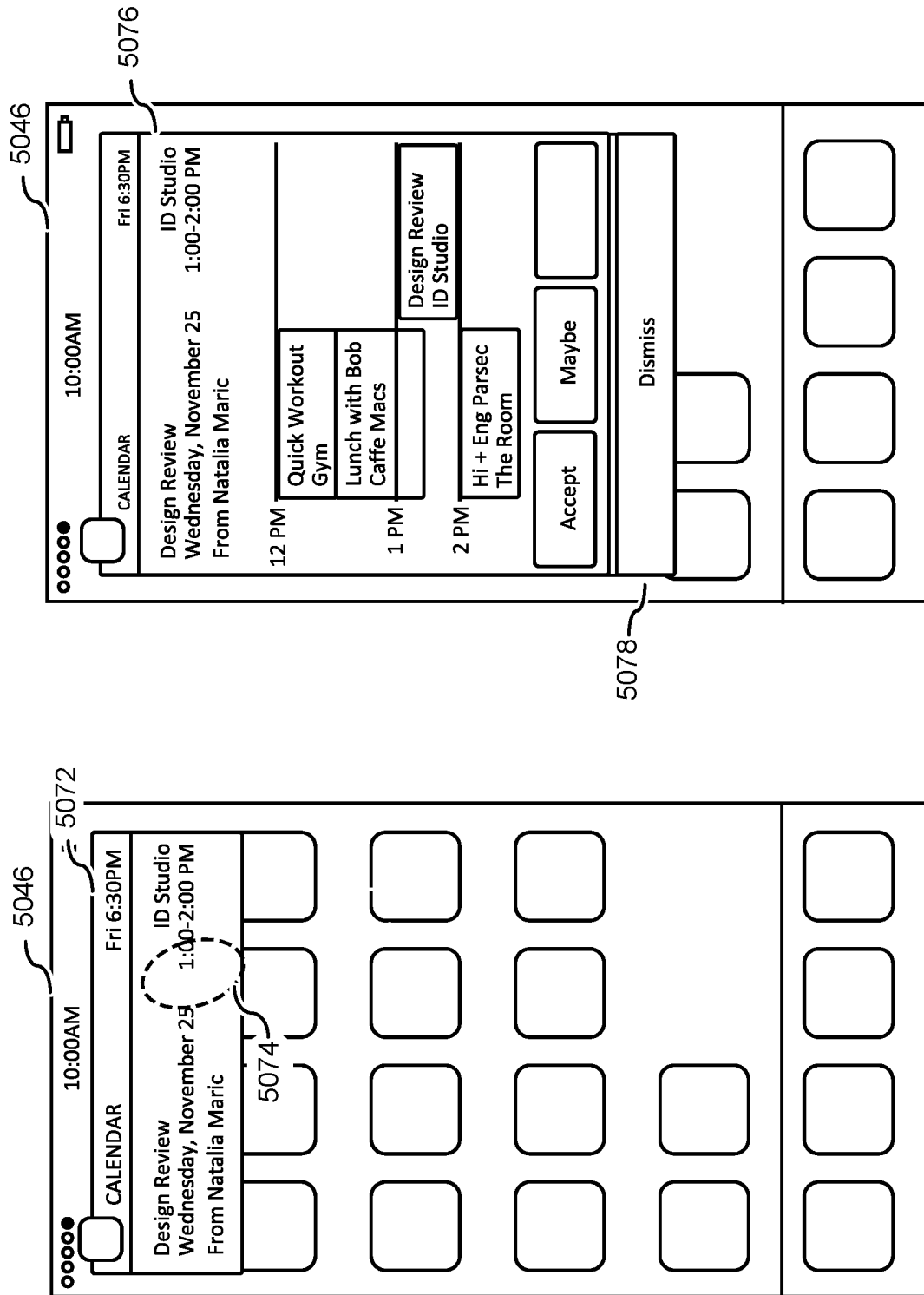

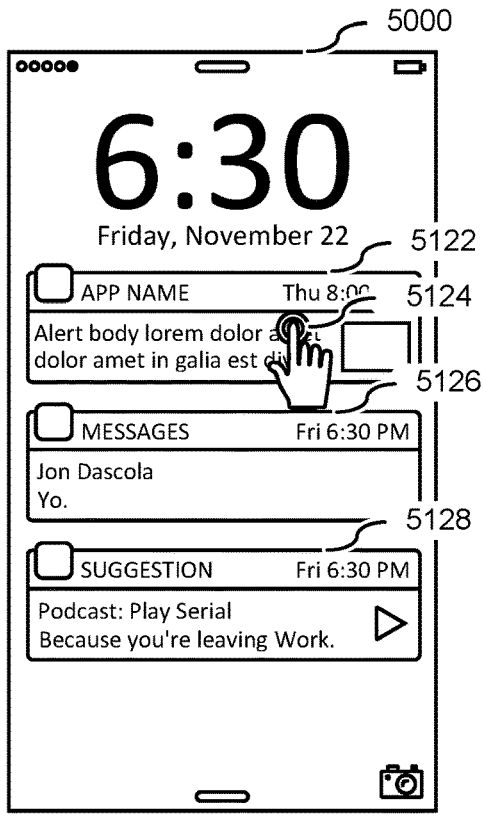
Figure 5AAA
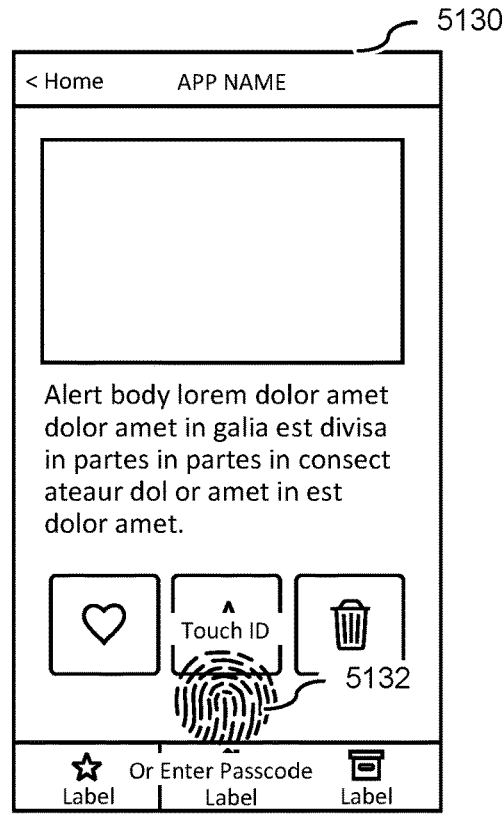
Figure 5BBB
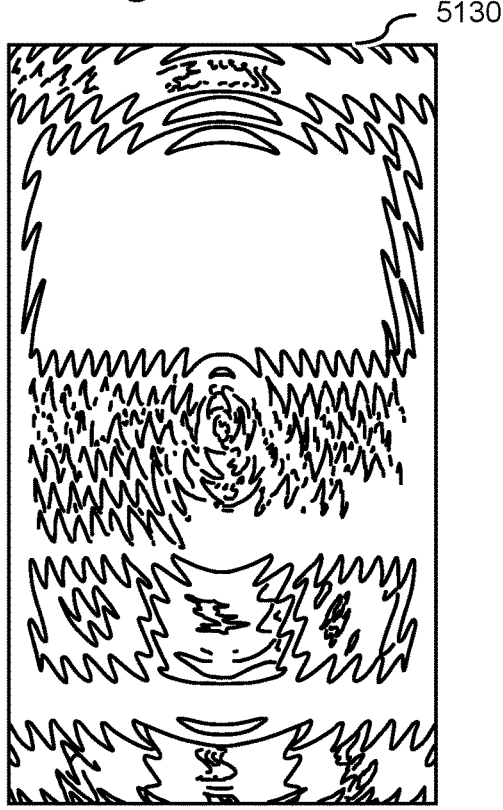
Figure 5CCC
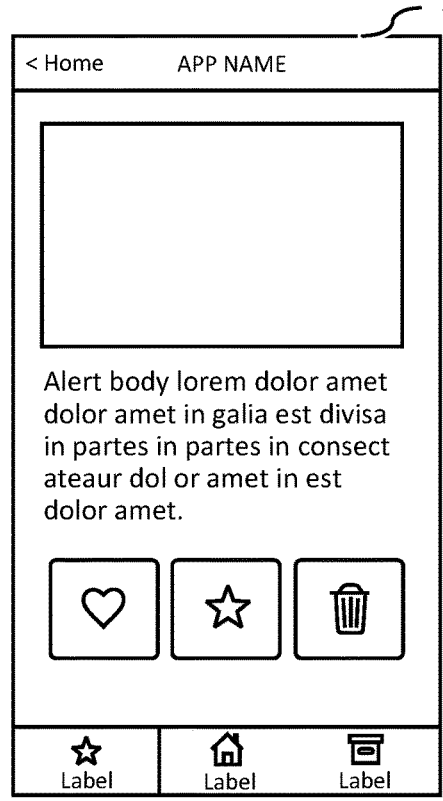
Figure 5DDD

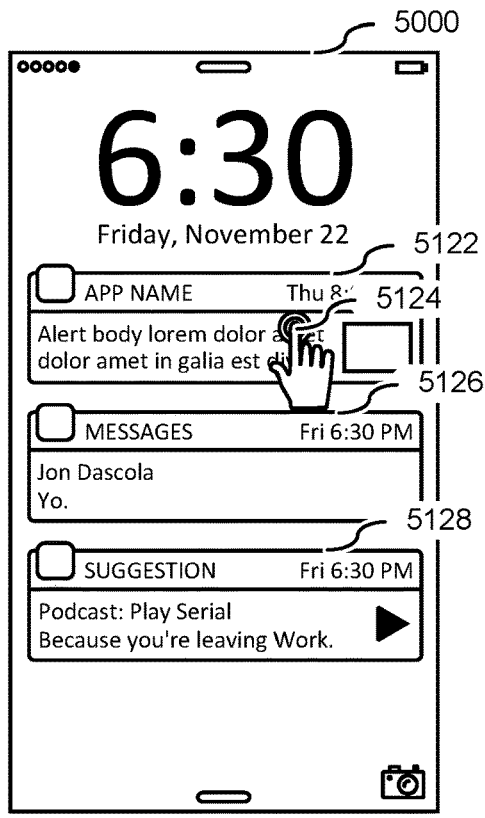
Figure 5EEE
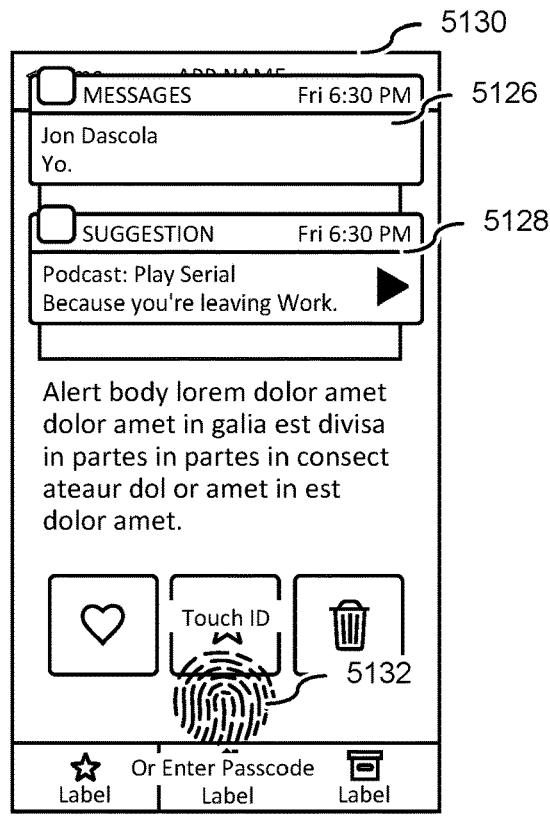
Figure 5FFF
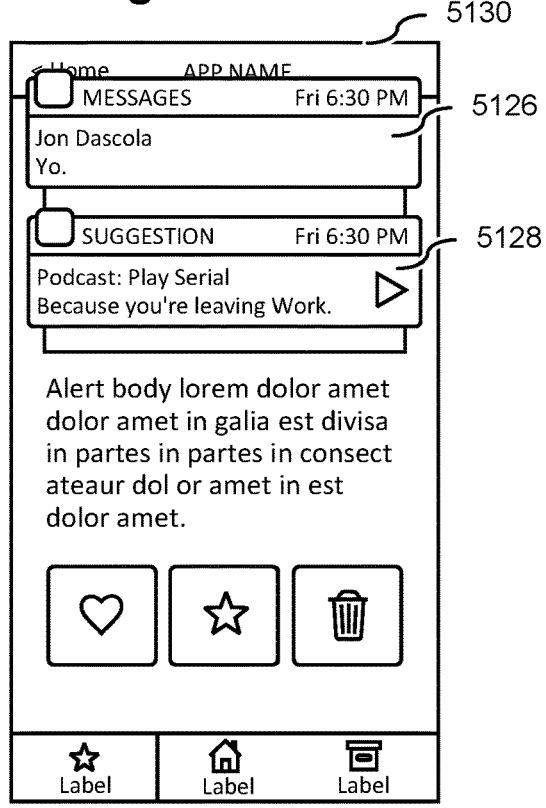
Figure 5GGG
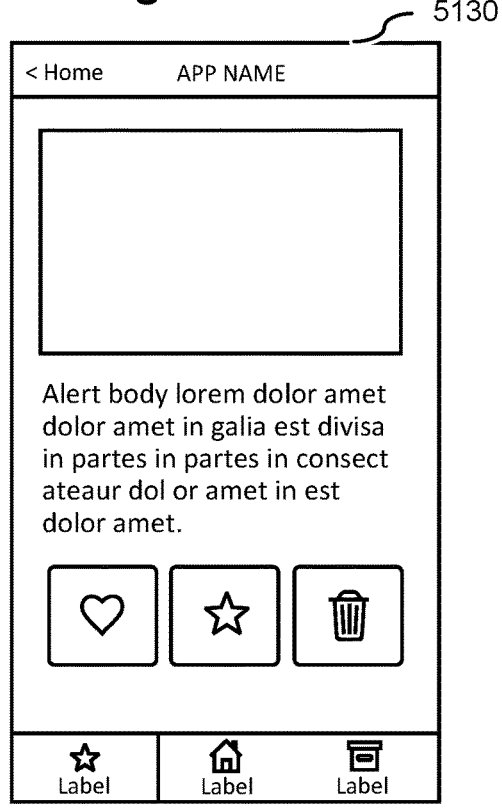
Figure 5HHH

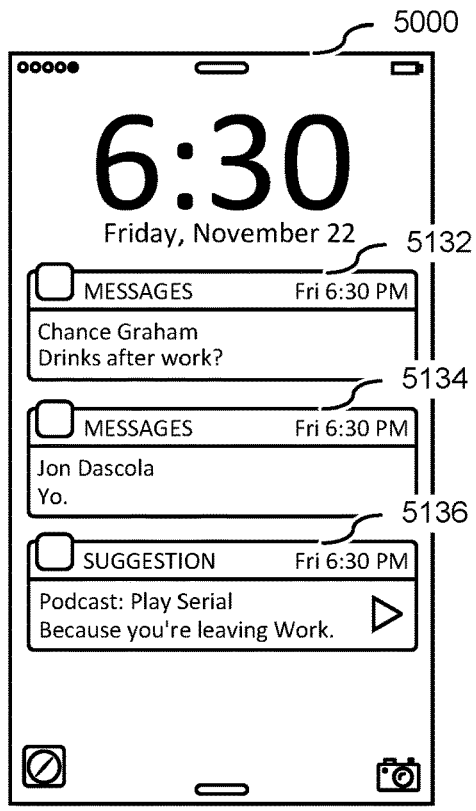
Figure 5III
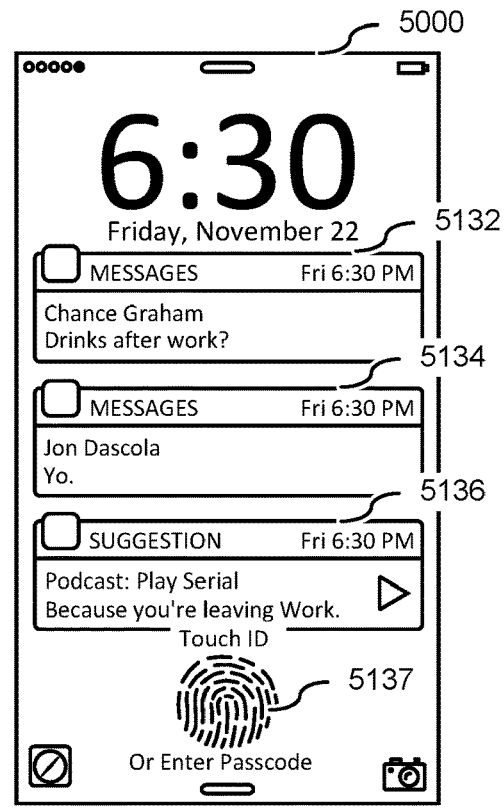
Figure 5JJJ
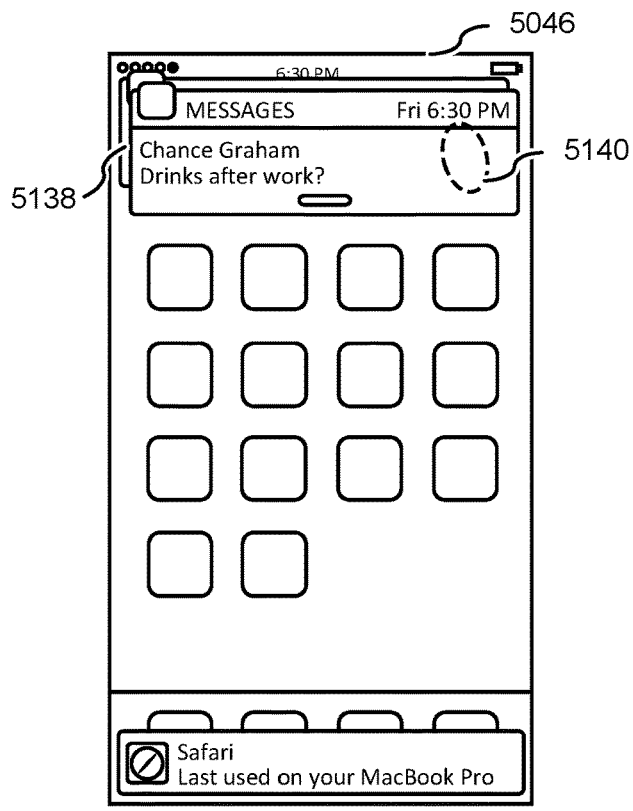
Figure 5KKK
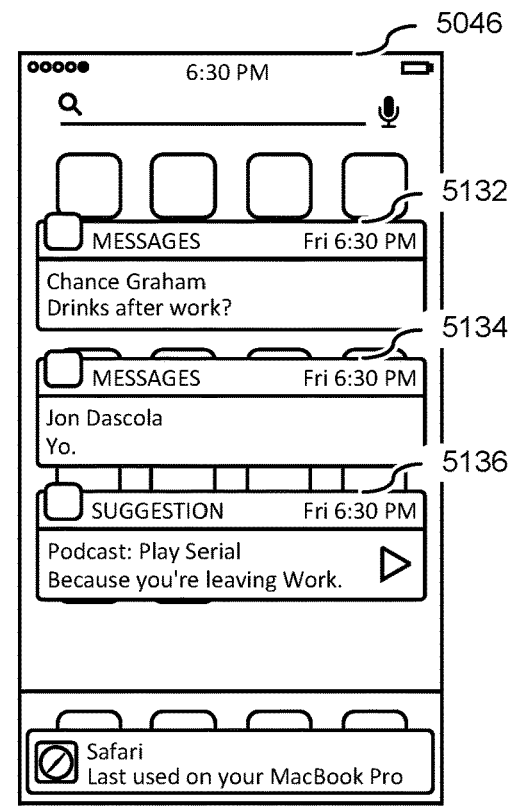
Figure 5LLL

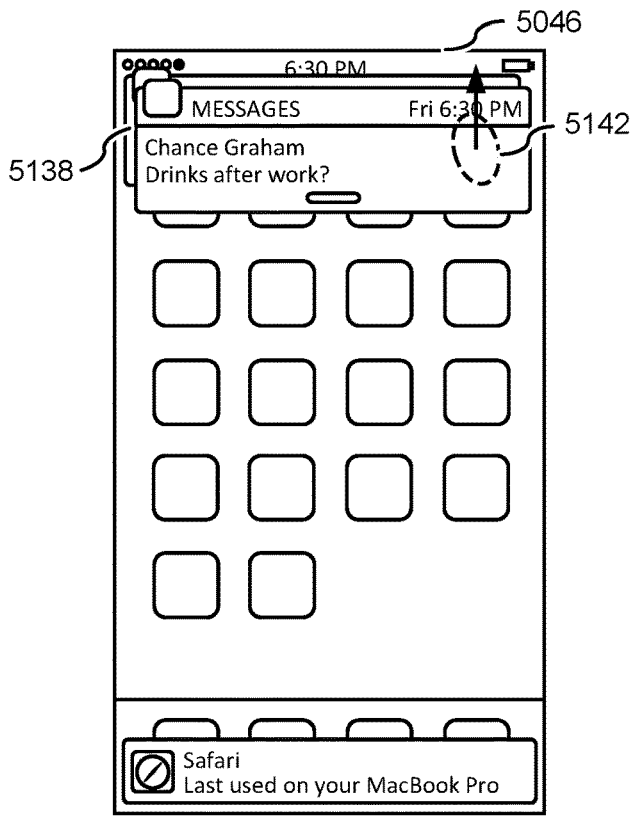
Figure 5MMM
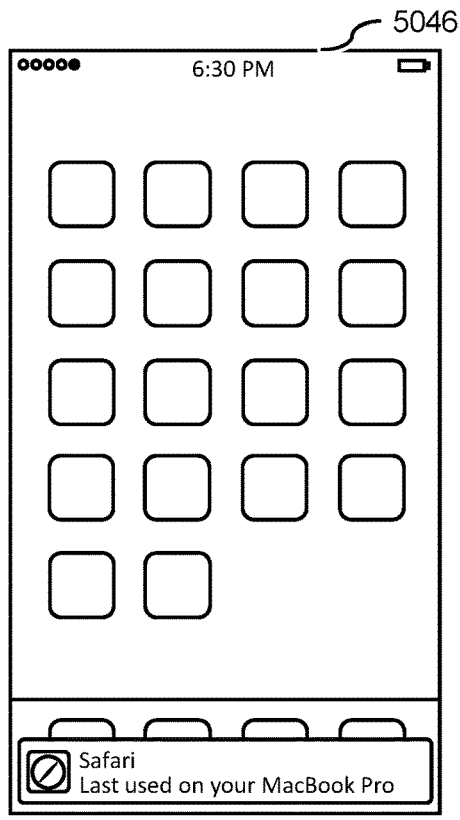
Figure 5NNN
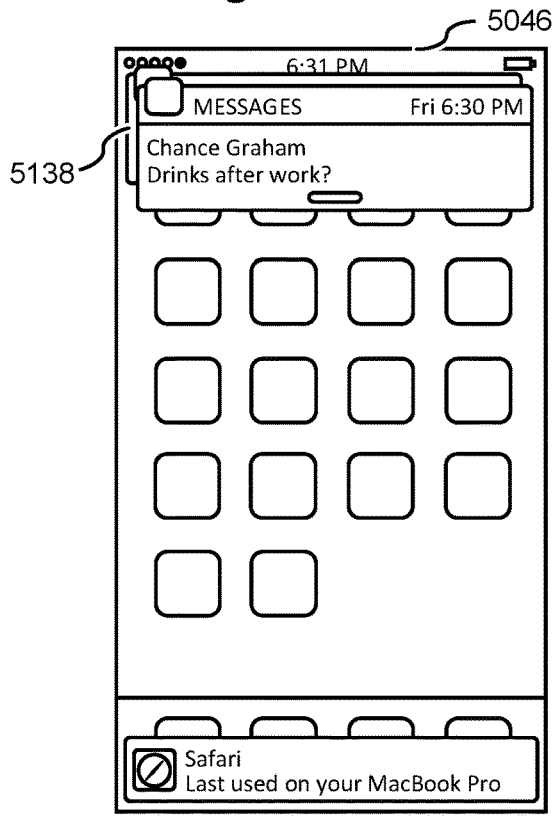
Figure 5OOO
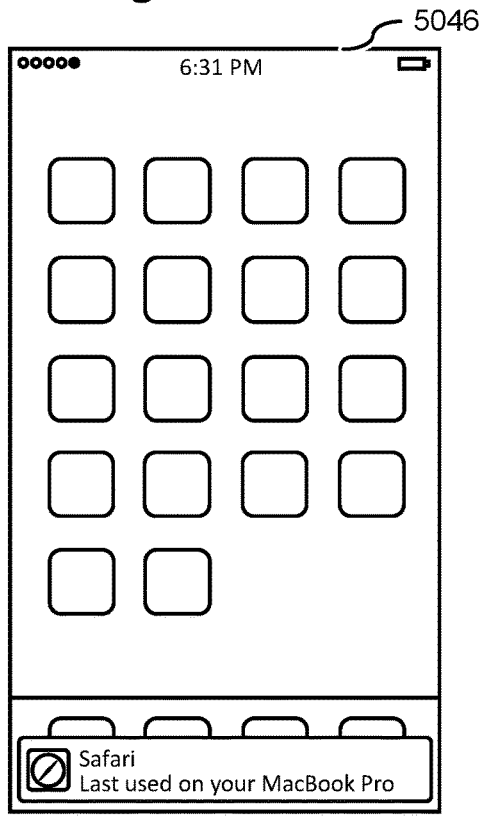
Figure 5PPP

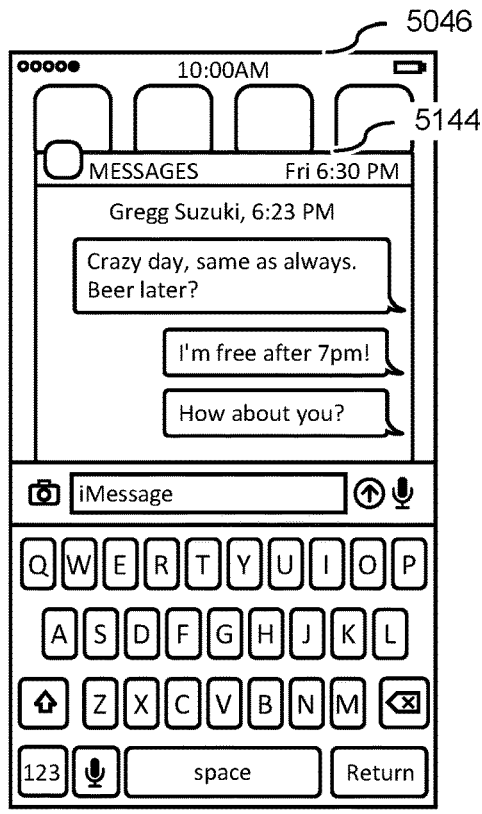
Figure 5QQQ
Figure 5RRR
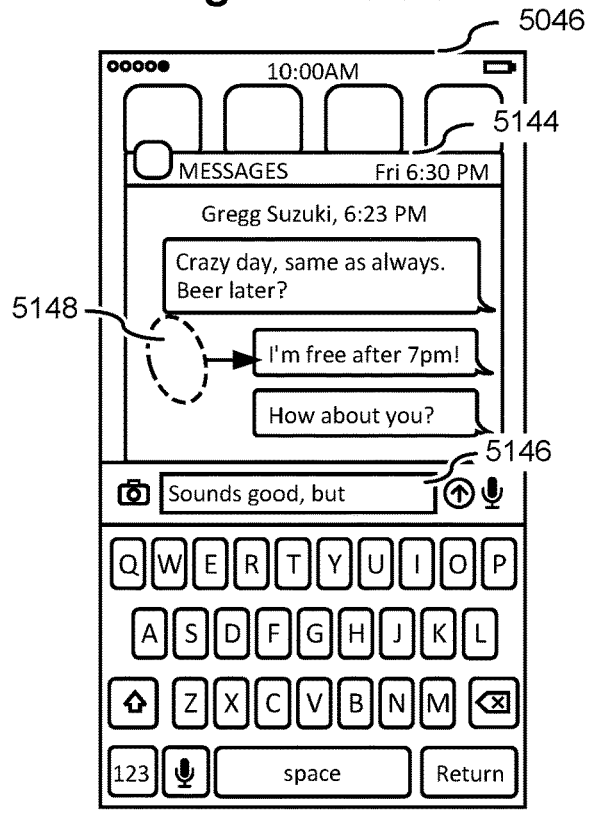
Figure 5SSS
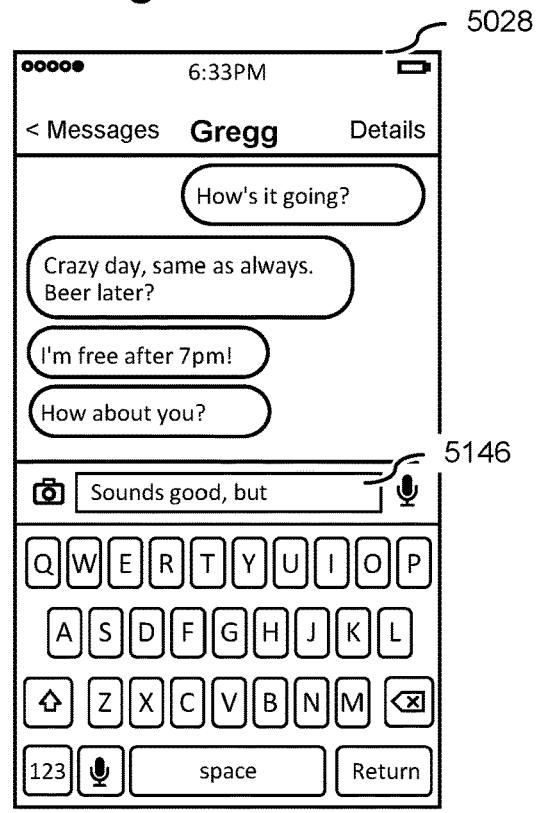
Figure 5TTT

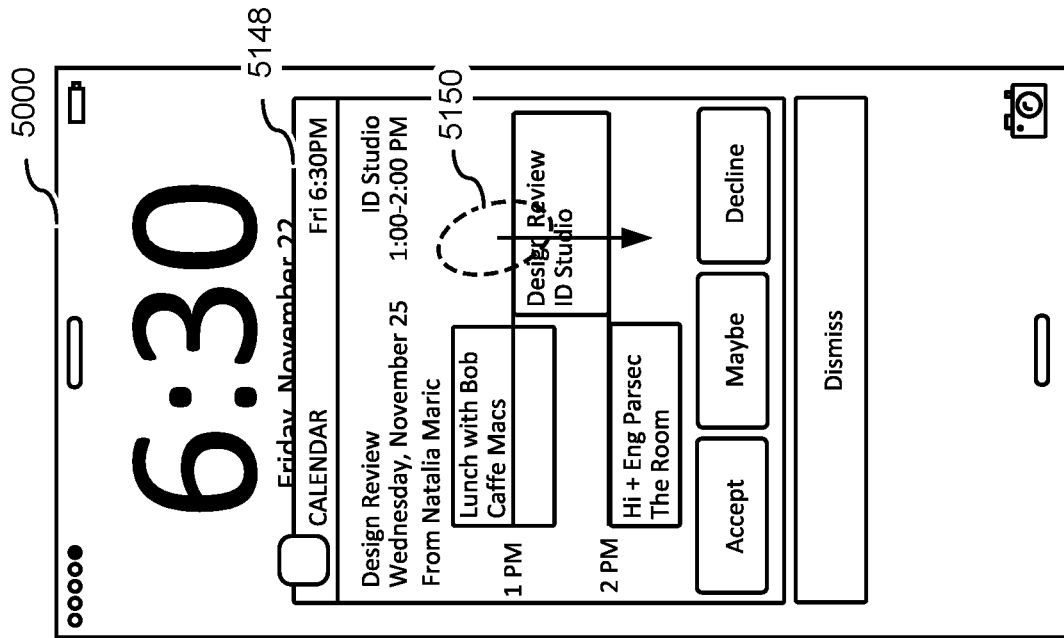
Figure 5VVV
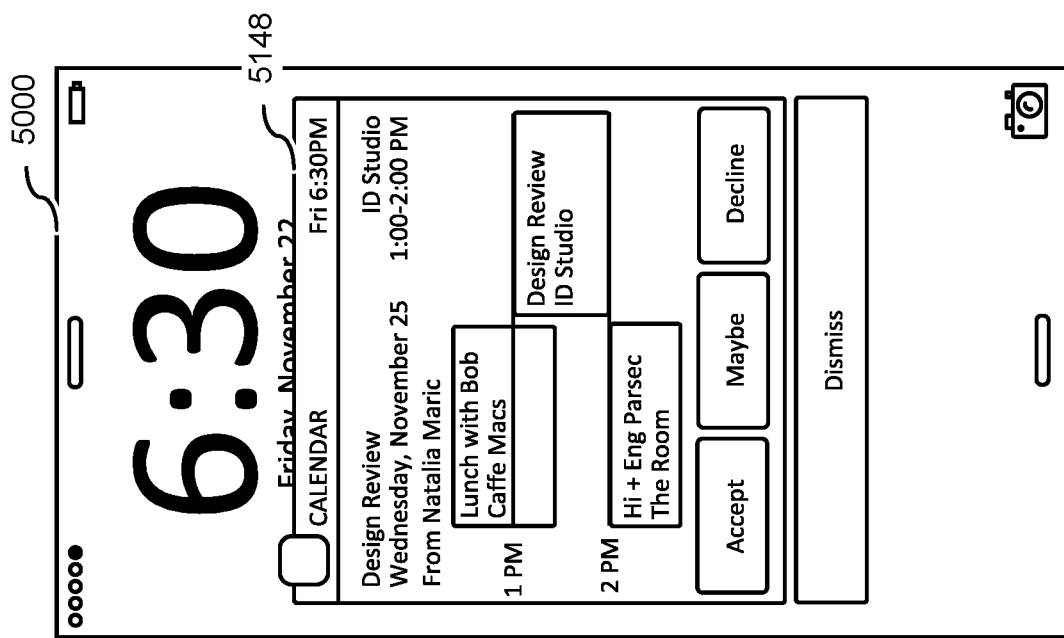
Figure 5UUU

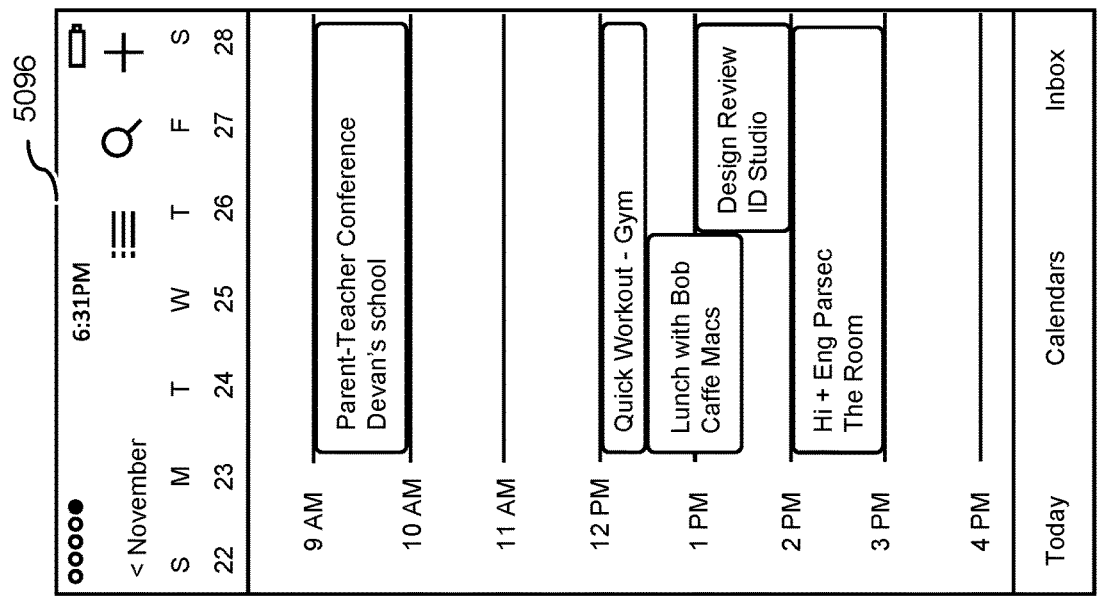
Figure 5XXX
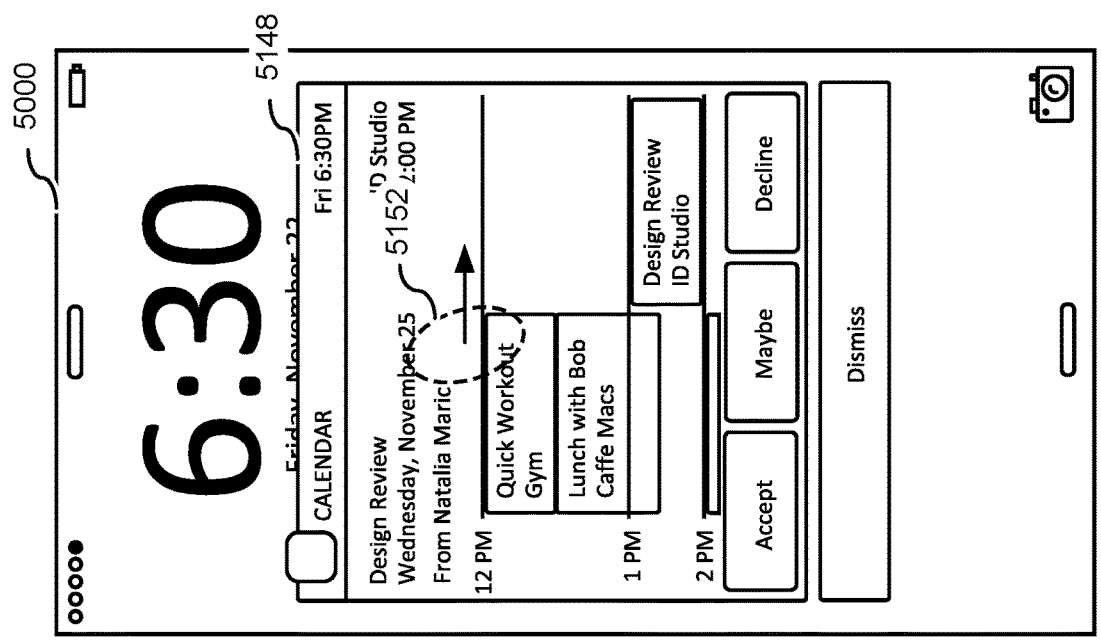
Figure 5WWW

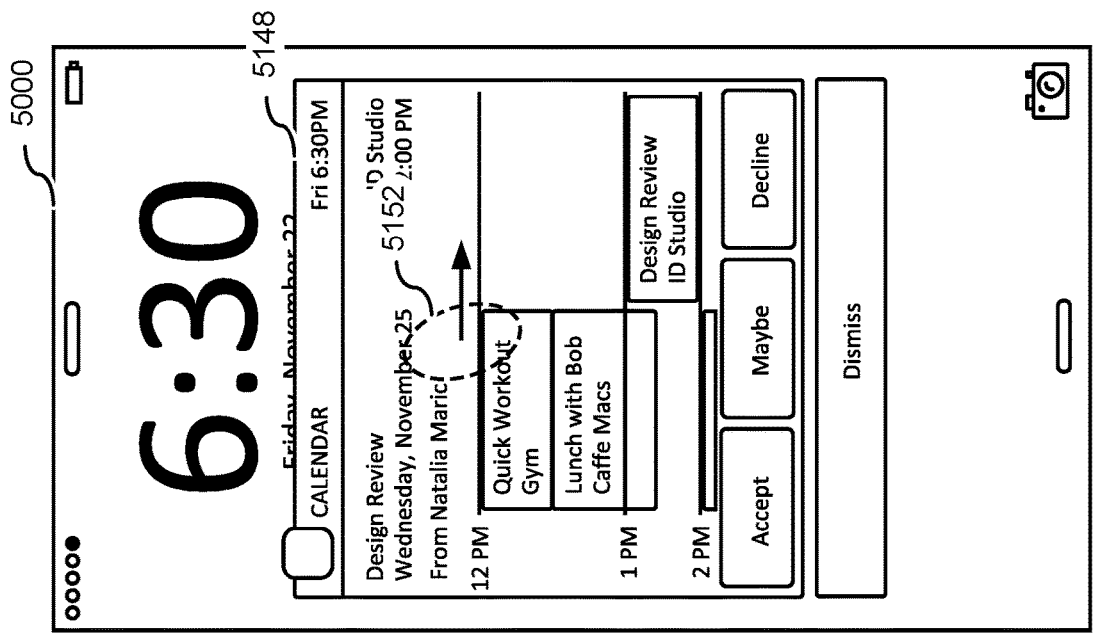
Figure 5YYY
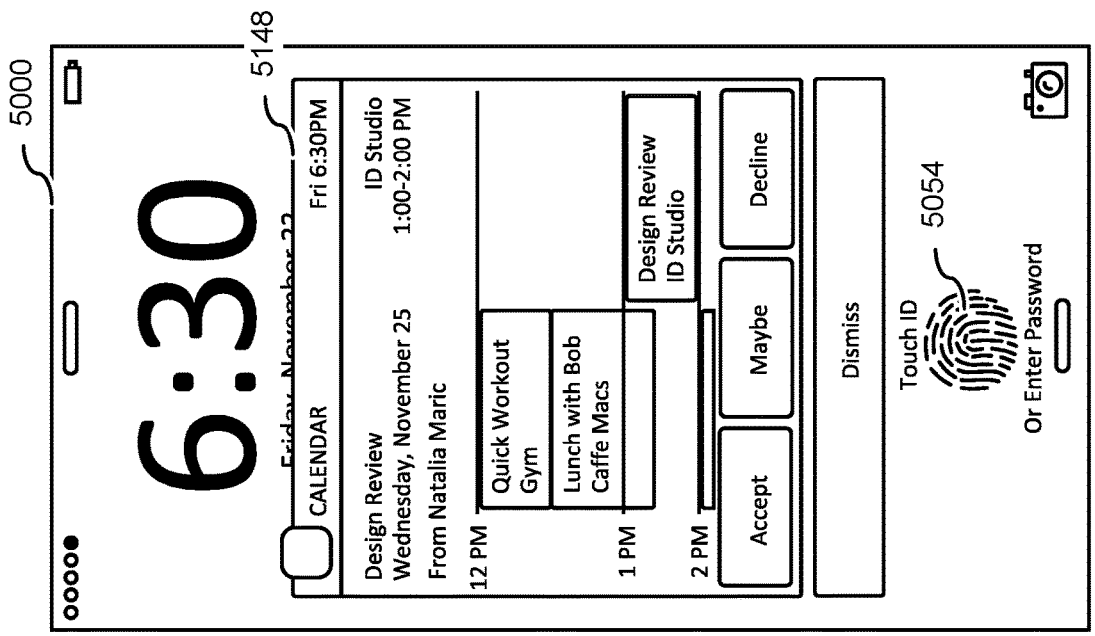
Figure 5ZZZ

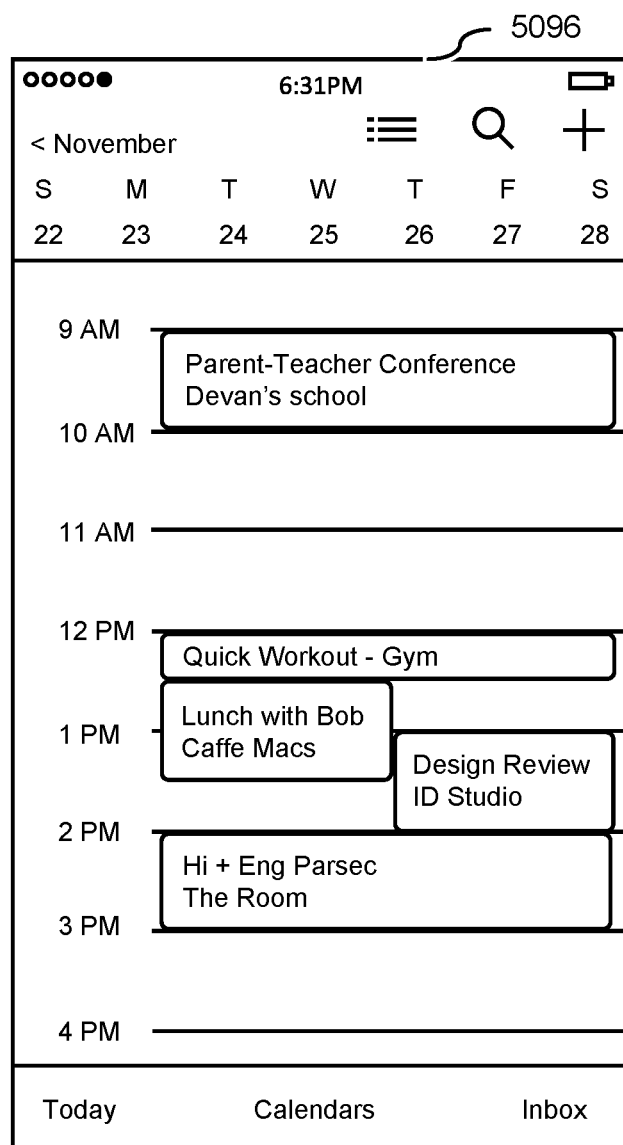
Figure 5AAAA

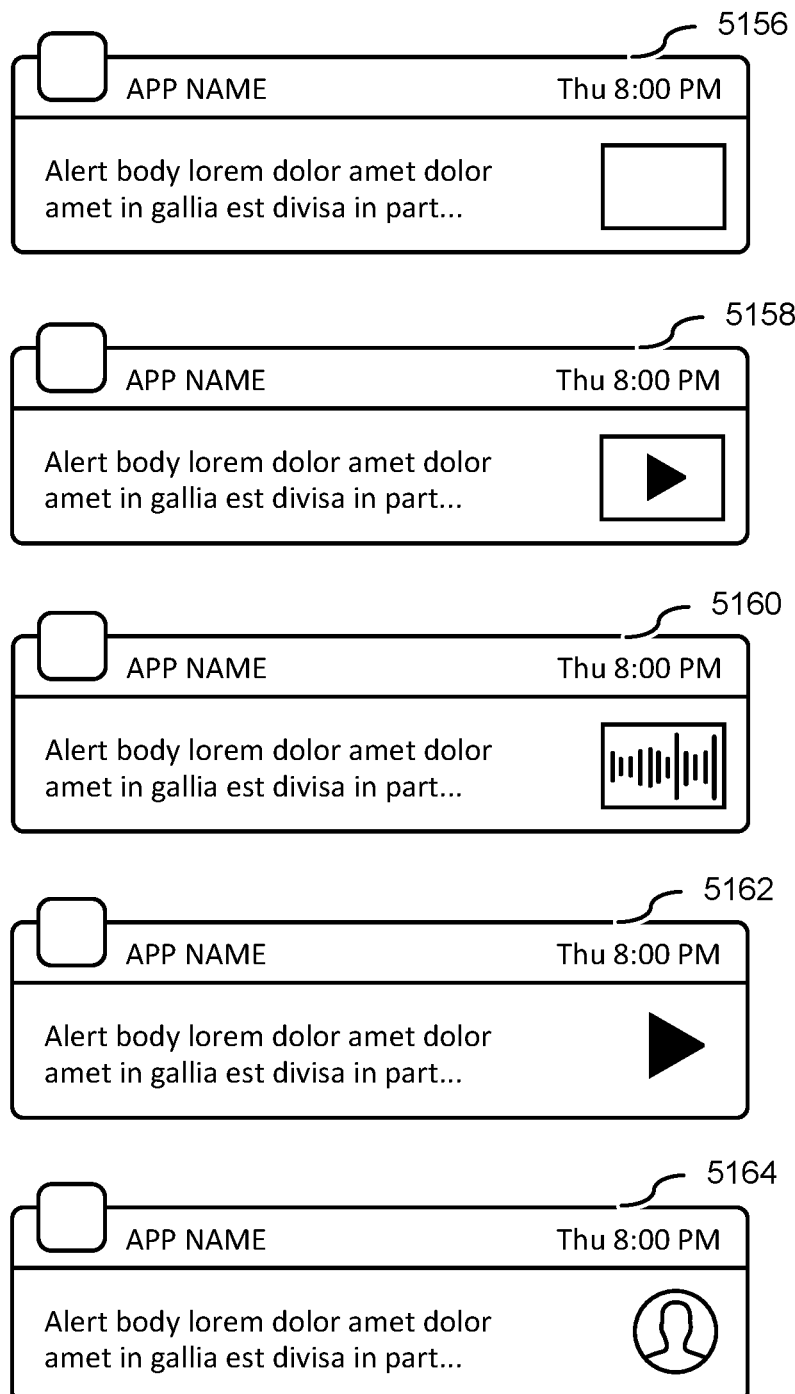
Figure 5BBBB

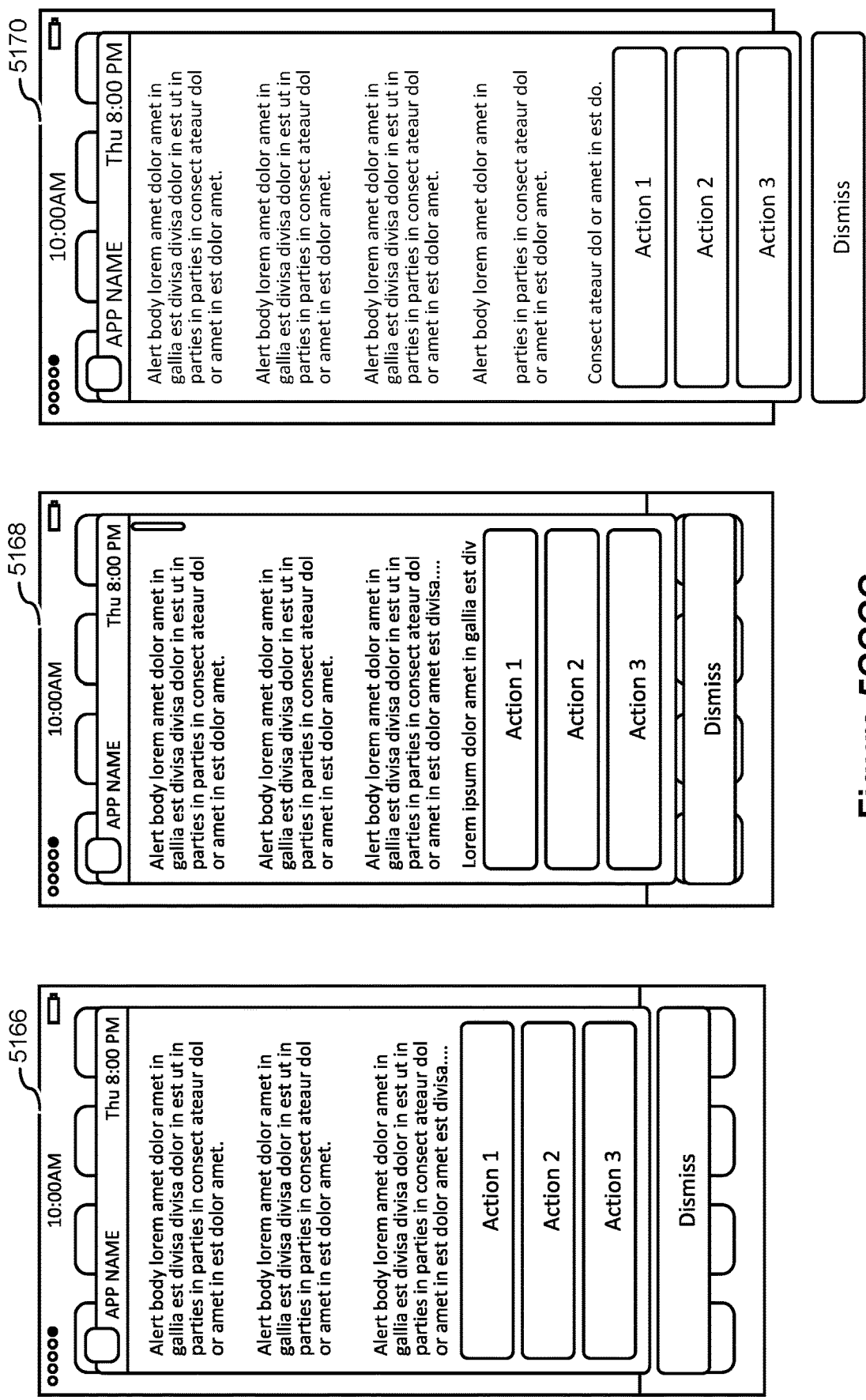
Figure 5CCCC

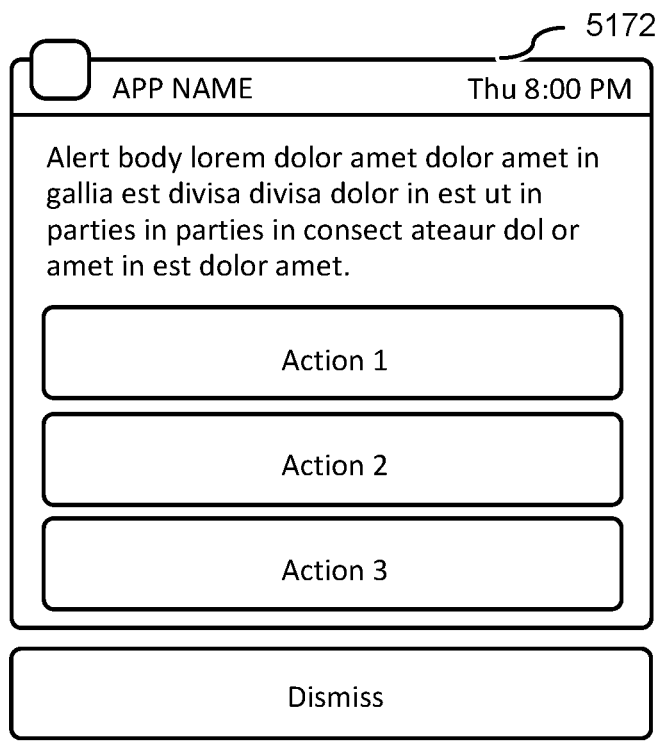
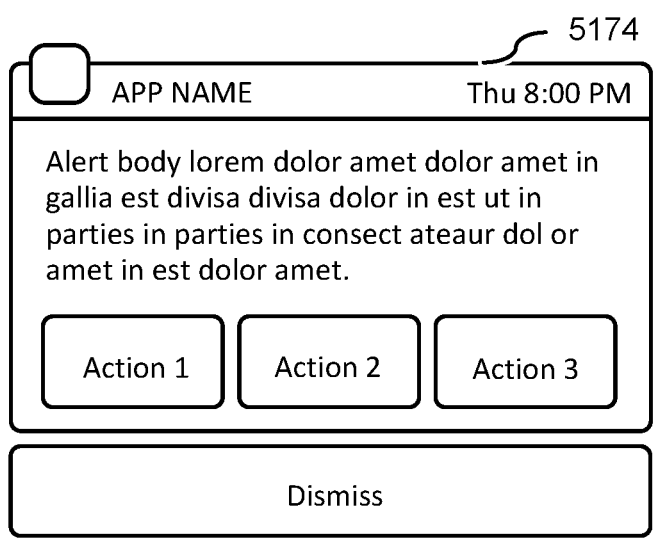
Figure 5DDDD

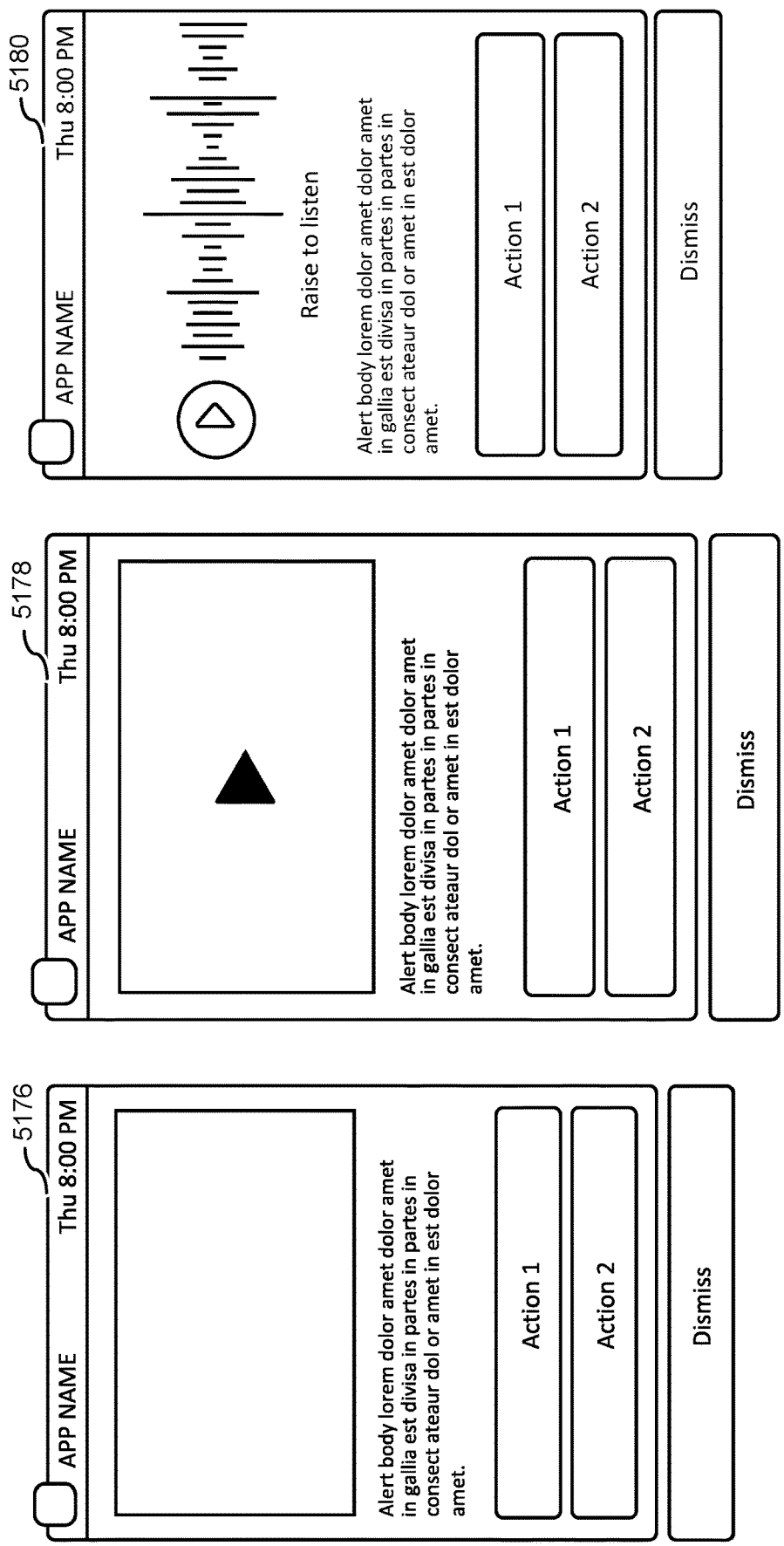
Figure 5EEEE

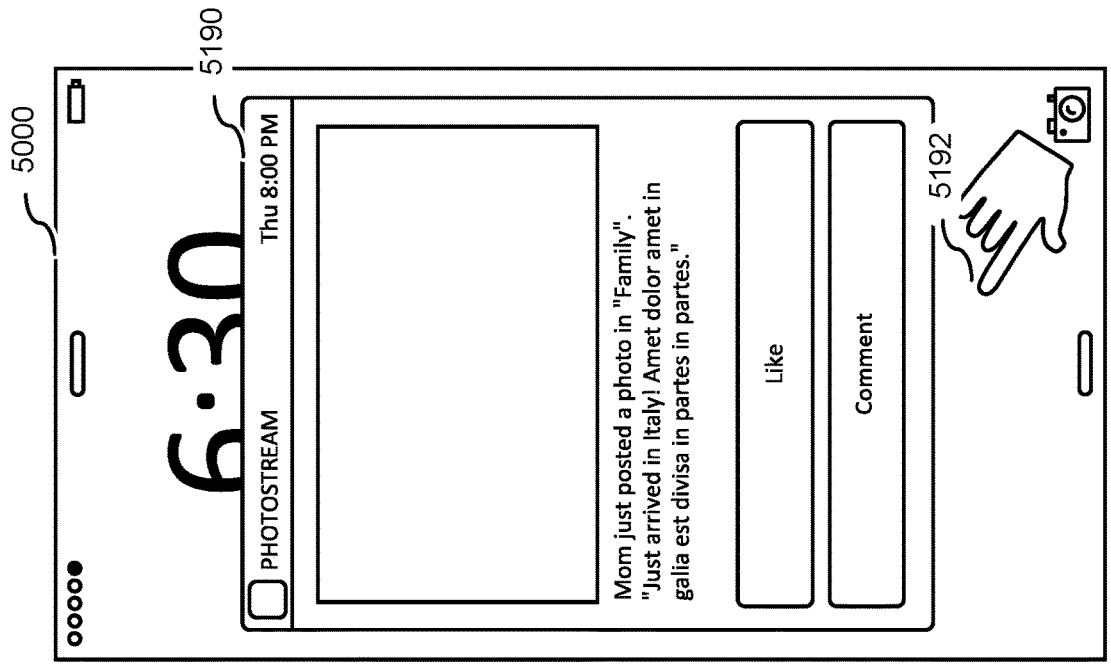
Figure 5GGGG
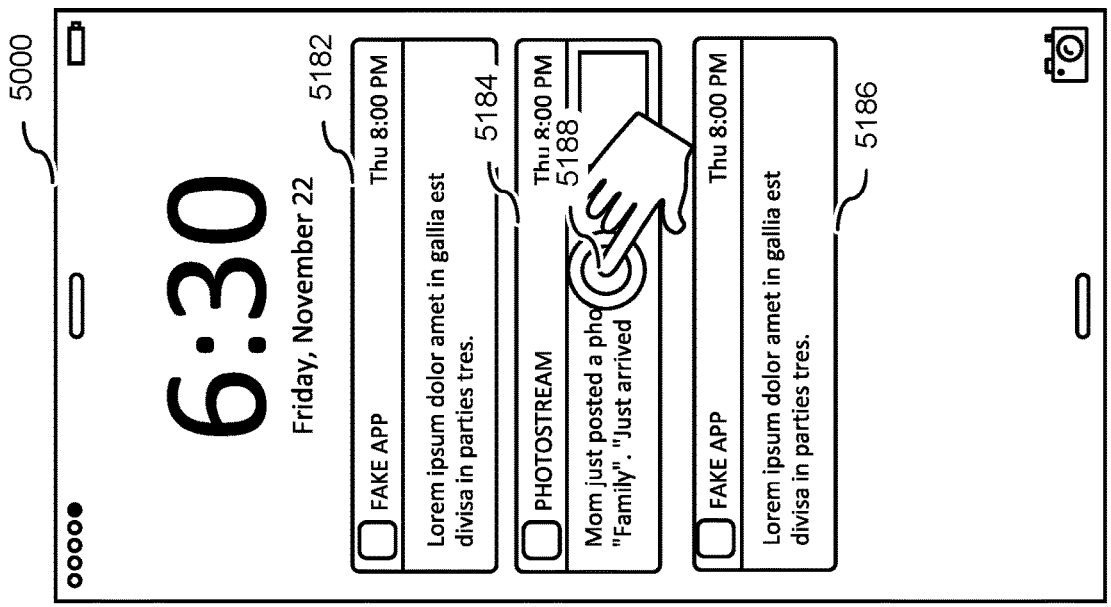
Figure 5FFFF

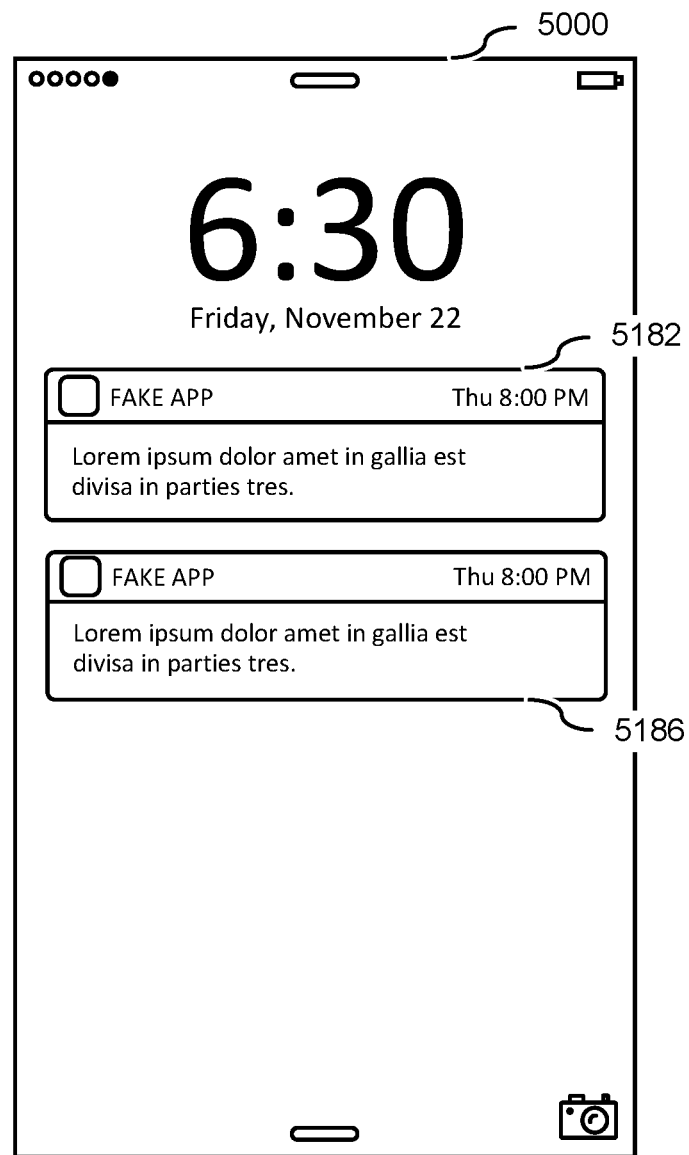
Figure 5HHHH

600

602 Receive a first communication at the device while the device is in a locked state

↓

604 In response to receiving the first communication at the device while the device is in the locked state, generate, for display on a lock screen, a first notification for the first communication received at the device, wherein the first notification includes content of the first communication

↓

606 Receive a second communication at the device while the device is in the locked state

↓

In response to receiving the second communication at the device while the device is in the locked state:

608 Determine whether the second communication and the first communication are received from the same sender

↓

610 In accordance with a determination that the second communication and the first communication are from the same sender, update the first notification for display on the lock screen such that the updated first notification concurrently includes the content of the first communication and content of the second communication

---

612 The first communication and the second communication are instant messages

---

614 In accordance with the determination that the second communication and the first communication are from the same sender, the updated first notification sequentially includes a message body from the first communication and a message body from the second communication

---

616 The first notification displays a timestamp with a receipt time of the first communication, and updating the first notification for display on the lock screen includes updating the timestamp to display a receipt time of the second communication

```
┌─────────────────────────────────────────────────────────────────────────┐
│ 626 While the device is in the locked state, receive an input directed to the updated │
│                              first notification; and,                                    │
│ in response to receiving the input directed to the updated first notification while the │
│ device is in the locked state, generate, for display on the lock screen, an alternative │
│ version of the updated first notification, wherein the alternative version of the       │
│                    updated first notification includes:                                  │
│      a first set of action controls for content in the updated first notification that  │
│              corresponds to the first communication, and                                 │
│     a second set of action controls for content in the updated first notification that  │
│     corresponds to the second communication, distinct from the first set of action      │
│     controls for content in the updated first notification that corresponds to the first│
│                              communication                                               │
└─────────────────────────────────────────────────────────────────────────┘
```

```
┌─────────────────────────────────────────────────────────────────────────┐
│         628 Receive an input directed to the updated first notification; and            │
│ in response to receiving the input directed to the updated first notification, activate │
│ an application associated with the first and second communications, the application     │
│ displaying the first communication and the second communication in context with a       │
│              previous communication session with the same user                           │
└─────────────────────────────────────────────────────────────────────────┘
```

```
┌─────────────────────────────────────────────────────────────────────────┐
│       630 Receive a dismissal input directed to the updated first notification; and     │
│ in response to receiving the dismissal input directed to the updated first notification,│
│ update respective read/unread statuses of the first communication and the second        │
│              communication in accordance with the dismissal input                        │
└─────────────────────────────────────────────────────────────────────────┘
```

```
┌─────────────────────────────────────────────────────────────────────────┐
│ 632 At a first time after receiving the first communication and prior to receiving the  │
│     second communication, display the first notification and a third notification in    │
│                    accordance with a first display order; and                            │
│ at a second time after receiving the second communication, display the updated          │
│ first notification and the third notification in accordance with a second display order │
│ that is different from the first display order, wherein the second display order is     │
│ generated based on the updated timestamp in the updated first notification              │
└─────────────────────────────────────────────────────────────────────────┘
```

Figure 6C

634 After receiving the first communication and before receiving the second communication, display the first notification on the lock screen, wherein the first notification includes content in the first communication;
while displaying the first notification on the lock screen and before receiving the second communication, receive information that indicates a sender of the first communication is preparing another communication and,
in response to receiving the information that indicates the sender of the first communication is preparing another communication, update the displayed first notification on the lock screen to concurrently display content in the first communication, and a communication-preparation indicator that indicates preparation of another communication by the sender of the first communication.

636 The second communication is received while the first notification concurrently displays content in the first communication and the communication-preparation indicator on the lock screen, and in accordance with the determination that the second communication and the first communication are from the same sender, update the displayed first notification on the lock screen to concurrently display content in the first communication and content in the second communication, and cease to display the communication-preparation indicator

Figure 6D

812 In accordance with a determination that the input is received while the device is in the unlocked state, display a second long version of the notification that is distinct from the first-long version of the notification (A)

> 820 The short version of the notification displays a calendar invitation, and the second long version of the notification displays at least one previously scheduled event relevant to the calendar invitation that is not displayed in the first long version of the notification > 822 The short version of the notification displays a calendar invitation, and the second long version of the notification displays at least one portion of a calendar that is not displayed in the first long version of the notification > 824 The second long version of the notification includes at least one user interface control not available in the first long version of the notification > 826 While displaying either the first long version of the notification or the second long version of the notification, receive a second input invoking an application that corresponds to the notification, and in response to receiving the input invoking the application that corresponds to the notification, display a user interface of the application, wherein the user interface of the application provides more content than the first long version of the notification and the user interface of the application provides more content than the second long version of the notification > 828 While displaying either the first long version of the notification or the second long version of the notification, receive a second input invoking an application that corresponds to the notification, and in response to receiving the input invoking the application that corresponds to the notification, display a user interface of the application, wherein the user interface of the application provides more functions than the first long version of the notification and the user interface of the application provides more functions than the second long version of the notification

| 1202 Display a plurality of notifications on a lock screen while the device is in a locked state |

| 1204 Detect an authentication input to unlock the device |

| 1206 In response to detecting the authentication input to unlock the device, verify the authentication input |

| 1208 Unlock the device in accordance with successful verification of the authentication input |

| 1210 In response to unlocking of the device in accordance with successful verification of the authentication input, display a first user interface of the device and arrange the plurality of notifications into a cluster overlaid on the first user interface |

 

| 1212 While the cluster is overlaid on the first user interface, receive a user input directed to the cluster, and in response to receiving the user input directed to the cluster, determine whether the user input satisfies a first criterion, and in accordance with a determination that the user input satisfies the first criterion, expand the notification cluster to show the plurality of notifications |

Figure 12A

```
┌─────────────────────────────────────────────────────────────────────────┐
│ 1214 While the cluster is overlaid on the first user interface, receive a user input │
│ directed to the cluster, and in response to receiving the user input directed to the │
│ cluster, determine whether the user input satisfies a second criterion, and in │
│ accordance with a determination that the user input satisfies the second criterion, │
│ cease to display the cluster │
│                                                                         │
│   ┌─────────────────────────────────────────────────────────────────┐   │
│   │ 1216 Clear the plurality of notifications after ceasing to display the cluster │   │
│   │   ┌─────────────────────────────────────────────────────────┐   │   │
│   │   │ 1218 A cleared notification is not displayed as a notification again │   │   │
│   │   └─────────────────────────────────────────────────────────┘   │   │
│   └─────────────────────────────────────────────────────────────────┘   │
│                                                                         │
│   ┌─────────────────────────────────────────────────────────────────┐   │
│   │ 1220 Store the plurality of notifications in a notification center after ceasing to │   │
│   │ display the cluster │   │
│   └─────────────────────────────────────────────────────────────────┘   │
└─────────────────────────────────────────────────────────────────────────┘
```

```
┌─────────────────────────────────────────────────────────────────────────┐
│ 1222 Determine whether a user input directed to the cluster has been received │
│ during a predetermined time window since the cluster was overlaid on the first user │
│ interface, and in accordance with a determination that no user input directed to the │
│ cluster has been received during the predetermined time window since the cluster │
│ was overlaid on the first user interface, cease to display the cluster │
│                                                                         │
│   ┌─────────────────────────────────────────────────────────────────┐   │
│   │ 1224 Clear the plurality of notifications after ceasing to display the cluster │   │
│   └─────────────────────────────────────────────────────────────────┘   │
│                                                                         │
│   ┌─────────────────────────────────────────────────────────────────┐   │
│   │ 1226 Store the plurality of notifications in a notification center after ceasing to │   │
│   │ display the cluster │   │
│   └─────────────────────────────────────────────────────────────────┘   │
└─────────────────────────────────────────────────────────────────────────┘
```

Figure 12B

1318 The communication is a calendar invitation associated with a calendar application, the initial local state of the user interface includes a first portion of a calendar in a first view, the current local state of the user interface includes a second portion of the calendar in a second view that is different from the first portion of the calendar in the first view, and starting the application in the modified state includes displaying the second portion of the calendar in the second view

1320 Provide data regarding the current local state of the user interface of the notification to the application 1322 Store the data regarding the current local state of the user interface of the notification in a data store accessible by the application 1324 Providing data regarding the current local state of user interface of the notification to the application further comprises sending the data regarding the current local state of the user interface of the notification to the application

Figure 13B ual video playing, note taking, and/or digital video playing.

DEVICES, METHODS, AND GRAPHICAL USER INTERFACES FOR PROVIDING AND INTERACTING WITH NOTIFICATIONS

RELATED APPLICATIONS

This application is a continuation of U.S. application Ser. No. 15/835,366, filed Dec. 7, 2017, which is a continuation of International Patent Application No. PCT/US2016/033528, filed May 20, 2016, which claims the benefit of, and priority to, U.S. Provisional Patent Application Ser. No. 62/172,186, filed Jun. 7, 2015. Each of these applications is incorporated by reference herein in its entirety.

TECHNICAL FIELD

This relates generally to electronic devices with touch-sensitive surfaces, including but not limited to electronic devices with touch-sensitive surfaces that provide notifications of received communications.

BACKGROUND

The use of portable electronic devices has increased significantly in recent years, with many applications typically residing in the memory of such devices. Exemplary applications include messaging applications, calendar applications and social media applications. Electronic devices often receive communications for these applications, which contain information of importance to users. These electronic devices then often provide notifications that correspond to the received communications.

Exemplary communications include instant messages, calendar invitations, social media updates, microblog posts and news stories. Exemplary notifications associated with these communications may include digital images, video, text, icons, control elements (such as buttons) and/or other graphics to notify users of the receipt of these communications. Exemplary applications receiving communications and generating notifications include instant messaging applications (e.g., iMessage® from APPLE INC. of Cupertino, Calif.), calendar applications (e.g., iCal® or Calendar from APPLE INC. of Cupertino, Calif.), social networking applications, microblogging applications, and news applications.

But methods for providing and interacting with notifications are cumbersome and inefficient. For example, the notifications may be displayed in a confusing manner. In addition, there may be little or no ability to interact with a notification, thereby requiring a user to open the corresponding application to deal with the communication. These methods take longer than necessary, thereby wasting energy. This latter consideration is particularly important in battery-operated devices.

SUMMARY

Accordingly, there is a need for electronic devices with faster, more efficient methods and interfaces for providing and interacting with notifications. Such methods and interfaces optionally complement or replace conventional methods for providing and interacting with notifications. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with one or more processors, memory, and a display. The method includes: receiving a first communication at the device while the device is in a locked state, and in response to receiving the first communication at the device while the device is in the locked state, generating, for display on a lock screen, a first notification for the first communication received at the device, wherein the first notification includes content of the first communication. The method includes receiving a second communication at the device while the device is in the locked state, and in response to receiving the second communication at the device while the device is in the locked state, determining whether the second communication and the first communication are received from the same sender. In accordance with a determination that the second communication and the first communication are from the same sender, the method includes updating the first notification for display on the lock screen such that the updated first notification concurrently includes the content of the first communication and content of the second communication, and in accordance with a determination that the second communication and the first communication are not from the same sender, the method includes generating a second notification, distinct from the first notification, for concurrent display on the lock screen with the first notification.

In accordance with some embodiments, a method is performed at an electronic device with one or more processors, memory, and a display. The method includes receiving a notification; displaying a short version of the notification; while displaying the short version of the notification, receiving an input invoking a corresponding long version of the notification, distinct from the short version of the notification; determining whether the input invoking the corresponding long version of the notification is received while the device is in a locked state or an unlocked state; in accordance with a determination that the input is received while the device is in the locked state, displaying a first long version of the notification; and in accordance with a determination that the input is received while the device is in the unlocked state, displaying a second long version of the notification that is distinct from the first-long version of the notification.

In accordance with some embodiments, a method is performed at an electronic device with one or more processors, memory, and a display. The method includes receiving a communication; displaying a short version of a notification that corresponds to the communication, wherein the short version of the notification includes first information; identifying second information relevant to and distinct from the first information included in the short version of the notification; while displaying the short version of the notification, receiving a user input invoking a long version of the notification; and, in response to receiving the user input invoking the long version of the notification, displaying a first long version of the notification, wherein the first long version of the notification includes at least the first information included in the short version of the notification and the identified second information relevant to and distinct from the first information included in the short version of the notification.

In accordance with some embodiments, a method is performed at an electronic device with one or more processors, memory, and a display. The method includes receiving a communication; displaying a short version of a notification that corresponds to the communication; detecting a gesture directed to the notification; in accordance with a determination that the gesture is in a first direction, clearing the notification; in accordance with a determination that the gesture is in a second direction, displaying a long version of the notification; in accordance with a determination that the gesture is in a third direction, displaying an application associated with the notification; and, in accordance with a determination that the gesture is in a fourth direction, storing the notification for later review.

In accordance with some embodiments, a method is performed at an electronic device with one or more processors, memory, and a display. The method includes receiving one or more communications while the device is in a locked state, displaying one or more notifications that correspond to the one or more communications on a lock screen while the device is in the locked state, receiving a user input directed to a first notification of the one or more notifications displayed on the lock screen to invoke an application associated with the first notification, generating a blurred version of a first user interface for the application associated with the first notification, and displaying the blurred version of the first user interface for the application on the lock screen and a prompt for authentication input in response to receiving the user input.

In accordance with some embodiments, a method is performed at an electronic device with one or more processors, memory, and a display. The method includes displaying a plurality of notifications on a lock screen while the device is in a locked state; detecting an authentication input to unlock the device; in response to detecting the authentication input to unlock the device, verifying the authentication input; unlocking the device in accordance with successful verification of the authentication input; and, in response to unlocking of the device in accordance with successful verification of the authentication input, displaying a first user interface of the device, and arranging the plurality of notifications into a cluster overlaid on the first user interface.

In accordance with some embodiments, a method is performed at an electronic device with one or more processors, memory, and a display. The method includes receiving a communication associated with an application; displaying a notification that corresponds to the communication, wherein the displayed notification includes a user interface that provides a subset of functionalities available in the application; while displaying the notification, detecting user interaction with the user interface of the notification, wherein the user interaction causes changes to an initial local state of the user interface; in response to detecting the user interaction with the user interface of the notification, displaying a current local state of the user interface that is different from the initial local state of the user interface; while displaying the current local state of the user interface, receiving a user input invoking the application from the user interface of the notification; and, in response to receiving the user input invoking the application from the user interface of the notification, starting the application in a modified state, different from a default initial state of the application, wherein the modified state is generated based on the current local state of the user interface of the notification.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: receive a first communication at the device while the device is in a locked state; in response to receiving the first communication at the device while the device is in the locked state, enable, for display on a lock screen, a first notification for the first communication received at the device, where the first notification includes content of the first communication; receive a second communication at the device while the device is in the locked state; and in response to receiving the second communication at the device while the device is in the locked state, determine whether the second communication and the first communication are received from the same sender; in accordance with a determination that the second communication and the first communication are from the same sender, update the first notification for display on the lock screen such that the updated first notification concurrently includes the content of the first communication and content of the second communication; and in accordance with a determination that the second communication and the first communication are not from the same sender, generate a second notification, distinct from the first notification, for concurrent display on the lock screen with the first notification.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: receive a notification; enable for display a short version of the notification; while enabling for display the short version of the notification, receive an input invoking a corresponding long version of the notification, distinct from the short version of the notification; determine whether the input invoking the corresponding long version of the notification is received while the device is in a locked state or an unlocked state; in accordance with a determination that the input is received while the device is in the locked state, enable for display a first long version of the notification; and in accordance with a determination that the input is received while the device is in the unlocked state, enable for display a second long version of the notification that is distinct from the first-long version of the notification.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: receive a communication; enable for display a short version of a notification that corresponds to the communication, wherein the short version of the notification includes first information; identify second information relevant to and distinct from the first information included in the short version of the notification; while displaying the short version of the notification, receive a user input invoking a long version of the notification; and in response to receiving the user input invoking the long version of the notification, enable for display a first long version of the notification; wherein the first long version of the notification includes at least the first information included in the short version of the notification and the identified second information relevant to and distinct from the first information included in the short version of the notification.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: receive a communication; enable display of a short version of a notification that corresponds to the communication; detect a gesture directed to the notification; in accordance with a determination that the gesture is in a first direction, clear the notification; in accordance with a determination that the gesture is in a second direction, enable display of a long version of the notification; in accordance with a determination that the gesture is in a third direction, enable display of an application associated with the notification; and in accordance with a determination that the gesture is in a fourth direction, store the notification for later review.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: receive one or more communications while the device is in a locked state; enable for display one or more notifications that correspond to the one or more communications on a lock screen while the device is in the locked state; receive a user input directed to a first notification of the one or more notifications displayed on the lock screen to invoke an application associated with the first notification; generate a blurred version of a first user interface for the application associated with the first notification; and enable for display the blurred version of the first user interface for the application on the lock screen and a prompt for authentication input in response to receiving the user input In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: enable for display a plurality of notifications on a lock screen while the device is in a locked state; detect an authentication input to unlock the device; in response to detecting the authentication input to unlock the device, verify the authentication input; unlock the device in accordance with successful verification of the authentication input; in response to unlocking of the device in accordance with successful verification of the authentication input, enable for display a first user interface of the device; and arrange the plurality of notifications into a cluster overlaid on the first user interface In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: receive a communication associated with an application; enable for display a notification that corresponds to the communication, where the displayed notification includes a user interface that provides a subset of functionalities available in the application; while enabling for display the notification, detect user interaction with the user interface of the notification, where the user interaction causes changes to an initial local state of the user interface; in response to detecting the user interaction with the user interface of the notification, enable for display a current local state of the user interface that is different from the initial local state of the user interface; while enabling for display the current local state of the user interface, receive a user input invoking the application from the user interface of the notification; and in response to receiving the user input invoking the application from the user interface of the notification, start the application in a modified state, different from a default initial state of the application, wherein the modified state is generated based on the current local state of the user interface of the notification In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, and optionally one or more sensors to detect intensity of contacts with the touch-sensitive surface; and means for performing or causing performance of the operations of any of the methods described herein. In accordance with some embodiments, an information processing apparatus, for use in an electronic device with a display and a touch-sensitive surface, and optionally one or more sensors to detect intensity of contacts with the touch-sensitive surface, includes means for performing or causing performance of the operations of any of the methods described herein.

Thus, electronic devices with displays, optionally touch-sensitive surfaces and optionally one or more sensors to detect intensity of contacts with the touch-sensitive surface are provided with faster, more efficient methods and interfaces for providing and interacting with notifications, thereby increasing the effectiveness, efficiency, and user satisfaction with such devices. Such methods and interfaces may complement or replace conventional methods for providing and interacting with notifications.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 6A-6D are flow diagrams illustrating a method of coalescing notifications in accordance with some embodiments.

FIGS. 8A-8B are flow diagrams illustrating a method of displaying notifications of varying lengths in accordance with some embodiments.

FIGS. 12A-12B are flow diagrams illustrating a method of clustering notifications in accordance with some embodiments.

FIGS. 13A-13B are flow diagrams illustrating a method of transferring notification information to a corresponding application in accordance with some embodiments.

DESCRIPTION OF EMBODIMENTS

Figure 1A:
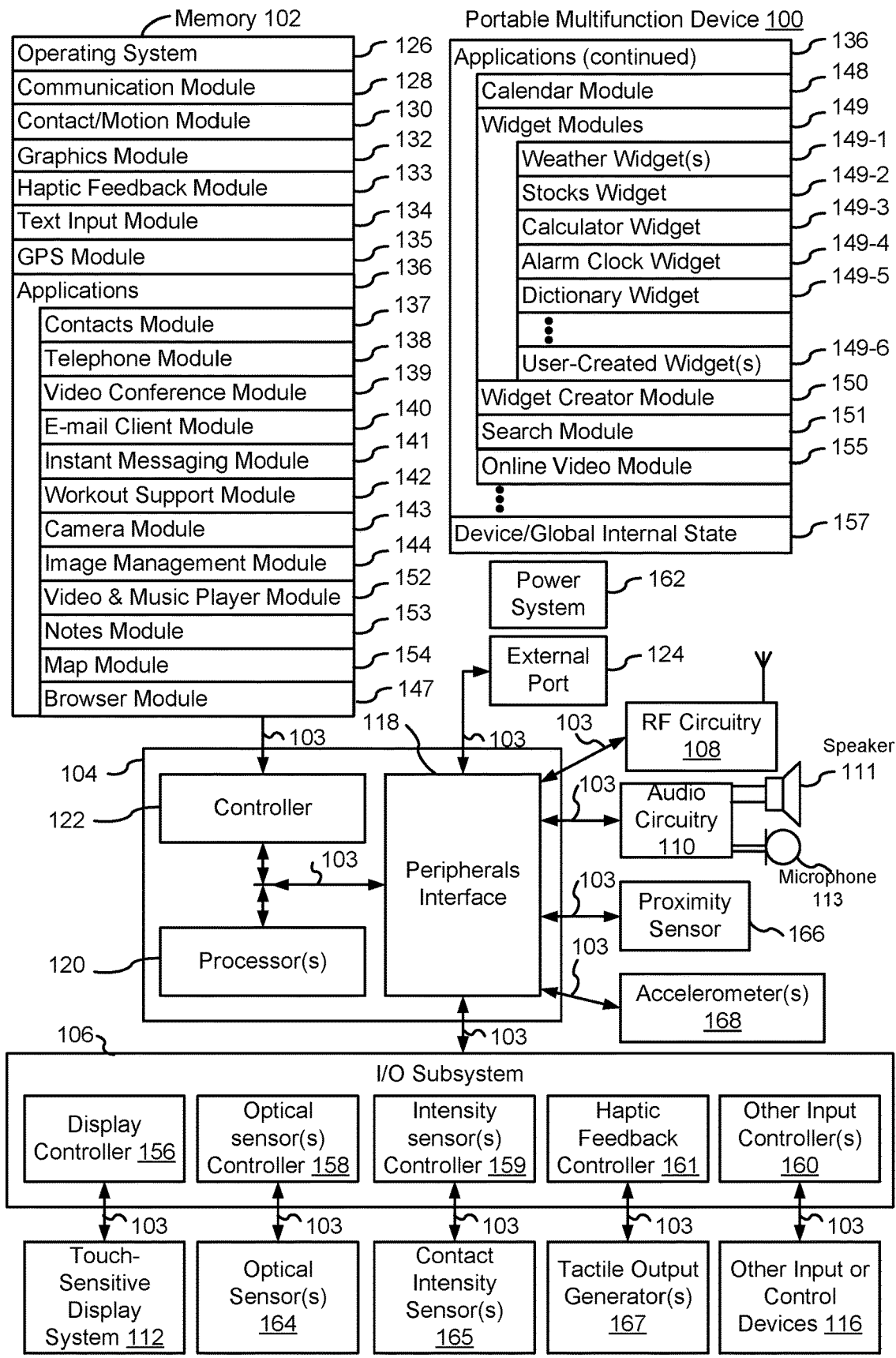
FIG. 1A is a block diagram illustrating a portable multifunction device with a touch-sensitive display in accordance with some embodiments.

As noted above, methods for providing and interacting with notifications are cumbersome and inefficient. For example, the notifications may be displayed in a confusing manner. In addition, there may be little or no ability to interact with a notification, thereby requiring a user to open the corresponding application to deal with the communication.

Here, new improved methods for providing, organizing, generating, updating, and/or interacting with notifications associated with received communications are described. One method coalesces communications from a single sender into a single notification. Other methods cluster notifications or un-cluster notifications according to predefined guidelines. The experience of viewing multiple notifications is also enhanced by providing quick access to additional functionalities associated with applications tied to such notifications, particularly when the electronic device is in a locked state. Privacy concerns are also addressed by providing some content or functionalities after successful authentication of the identity of a registered user, or by providing a distorted view of an associated application until successful authentication occurs.

Below, FIGS. 1A-1B, 2, and 3 provide a description of exemplary devices. FIGS. 4A-4B and 5A-5HHHH, illustrate exemplary user interfaces for providing and interacting with notifications. FIGS. 6A-6D, 7, 8A-8B, 9A-9B, 10A-10B, 11A-11B, 12A-12B and 13A-13B illustrate flow diagrams of methods of providing and interacting with notifications. The user interfaces in FIGS. 5A-5HHHH are used to illustrate the processes in FIGS. 6A-6D, 7, 8A-8B, 9A-9B, 10A-10B, 11A-11B, 12A-12B and 13A-13B. FIG. 14-20 are functional block diagrams of electronic devices in accordance with some embodiments.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from APPLE INC. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), BLUETOOTH, Wireless Fidelity (WI-FI) (e.g., IEEE 802.11a, IEEE 802.11ac, IEEE 802.11ax, IEEE 802.11b, IEEE 802.11g and/or IEEE 802.11n), voice over Internet Protocol (VoIP), WI-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an exemplary embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an exemplary embodiment, projected mutual capacitance sensing technology is used, such as that found in the iPhone®, iPod Touch®, and iPad® from APPLE INC. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
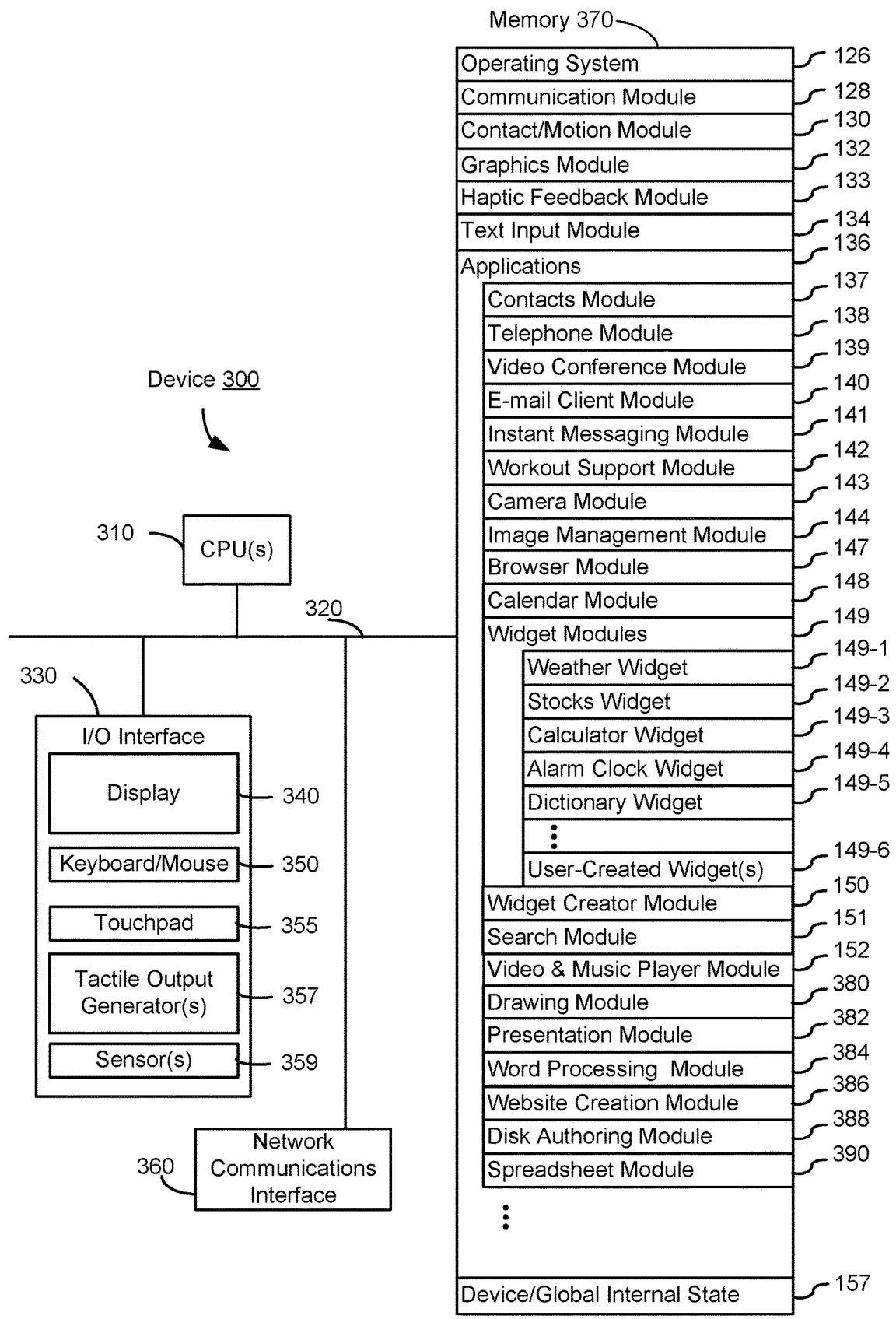
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS®, DARWIN, RTXC, LINUX, UNIX, OS X, WINDOWS, or an embedded operating system such as VXWORKS) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from APPLE INC. of Cupertino, Calif. In some embodiments, the external port is a Lightning connector that is the same as, or similar to and/or compatible with the Lightning connector used in some iPhone®, iPod Touch®, and iPad® devices from APPLE INC. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which is, optionally, made up of a video player module and a music player module;

notes module 153;

map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JAVASCRIPT file. In some embodiments, a widget includes an XML (Extensible Markup Language) file and a JAVASCRIPT file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod® (trademark of APPLE INC.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
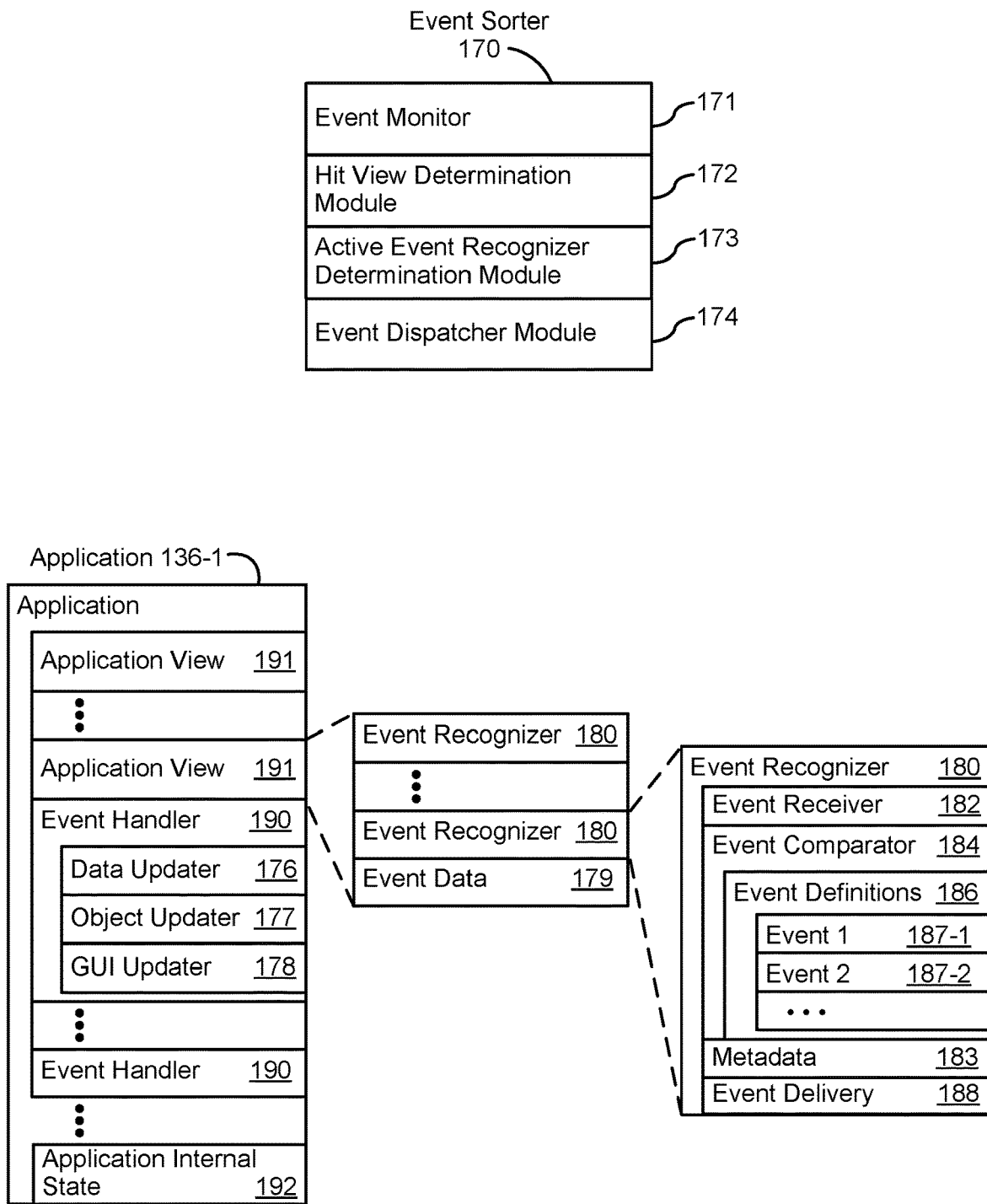
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
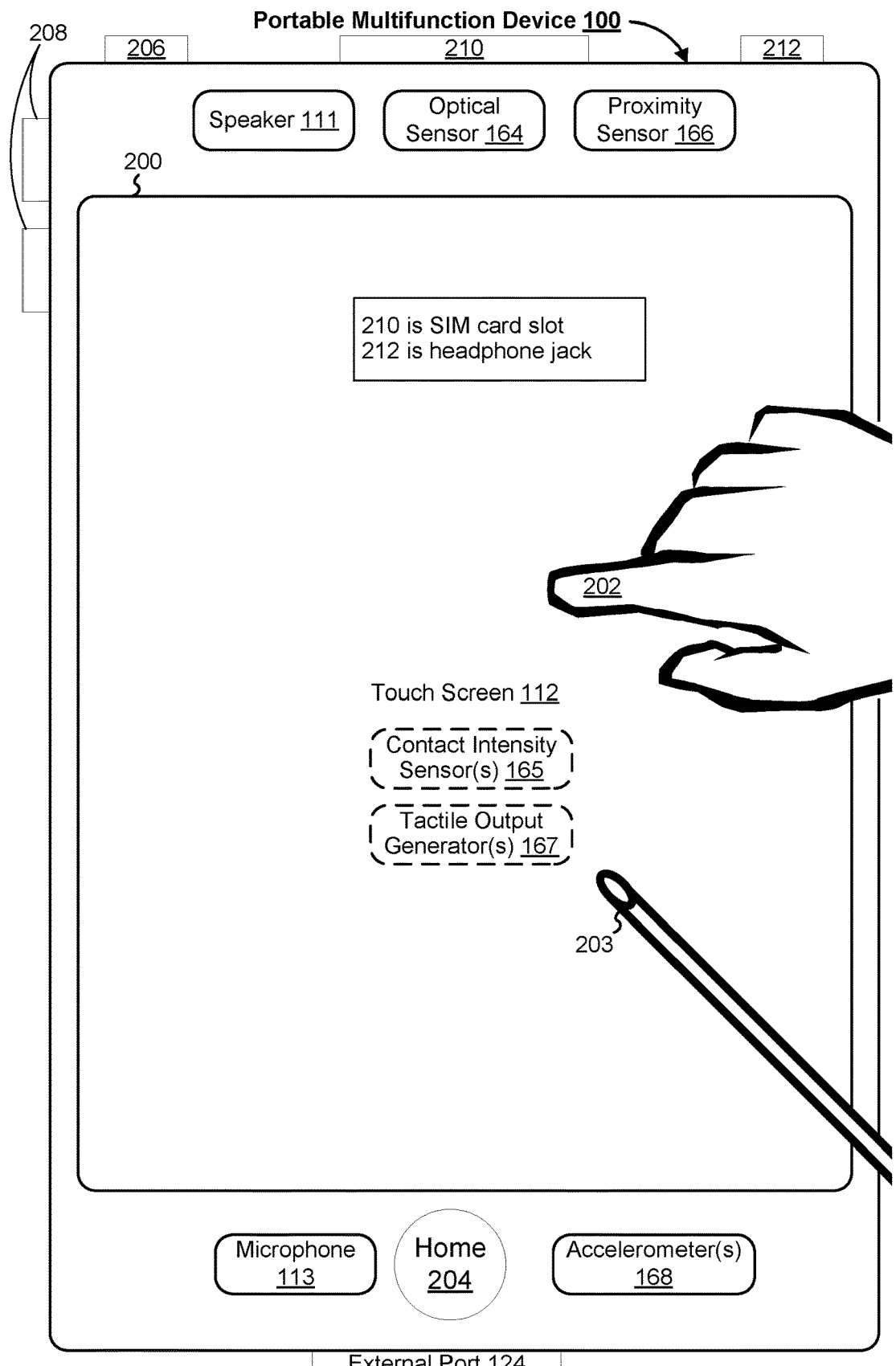
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
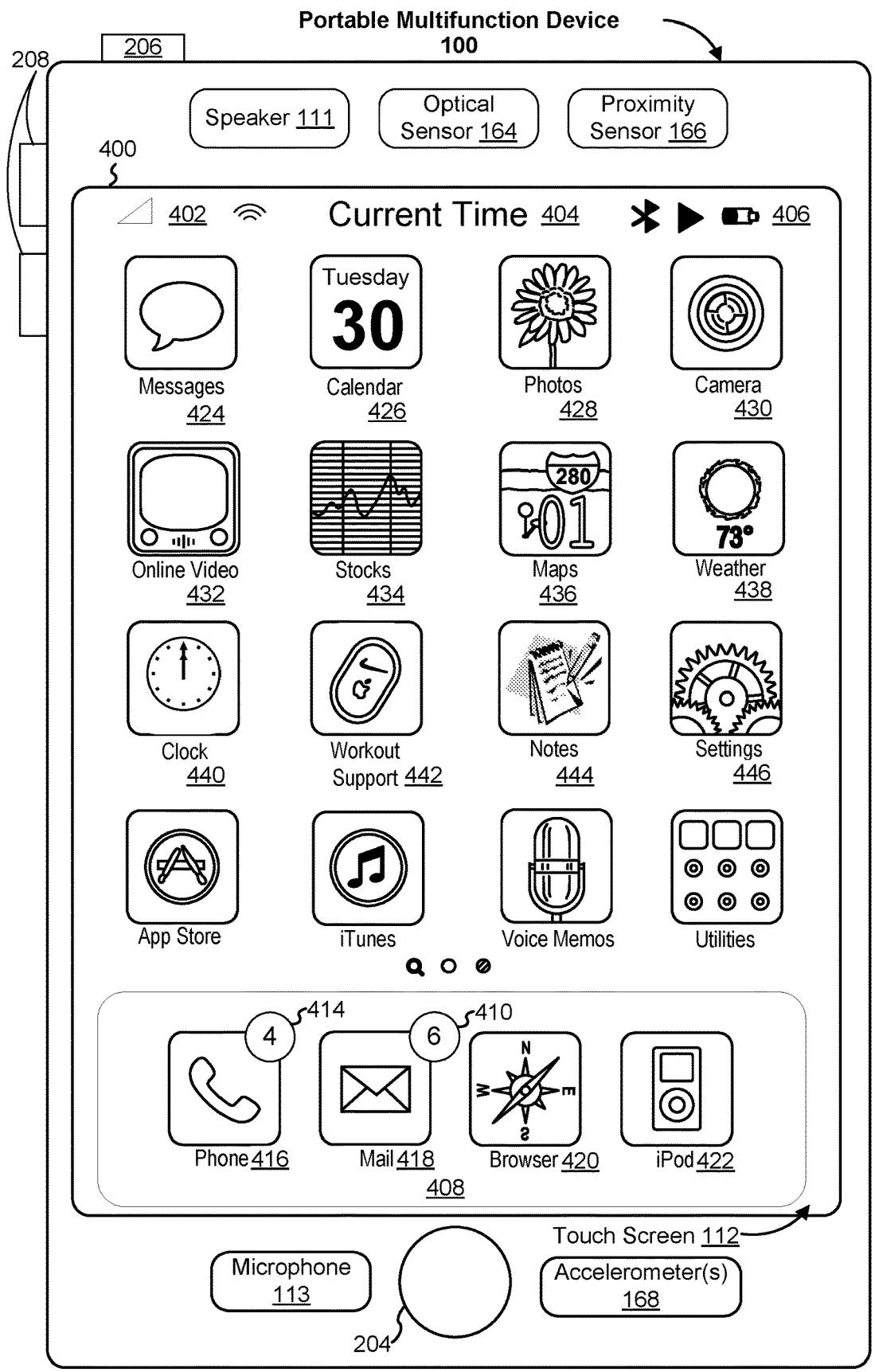
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and WI-FI signals;

Time 404;

BLUETOOTH indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod® (trademark of APPLE INC.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Map;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, which provides access to settings for device 100 and its various applications 136.

It should be noted that the icon labels illustrated in FIG. 4A are merely exemplary. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

FIG. 4B illustrates an exemplary user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used herein, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used herein, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

In some embodiments, a light press intensity threshold corresponds to an intensity at which the device will perform operations typically associated with clicking a button of a physical mouse or a trackpad. In some embodiments, a deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Exemplary factors are described in U.S. patent application Ser. Nos. 14/399,606 and 14/624,296, which are incorporated by reference herein in their entireties.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, optionally a touch-sensitive surface, and optionally one or more sensors to detect intensities of contacts with the touch-sensitive surface.

FIGS. 5A-5HHHH illustrate exemplary user interfaces for providing notifications in accordance with some embodiments. The user interfaces in these figures are used to illustrate the processes described below, including the processes in FIGS. 6A-6D, 7, 8A-8B, 9A-9B, 10A-10B, 11A-11B, 12A-12B and 13A-13B. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

Figure 5A:
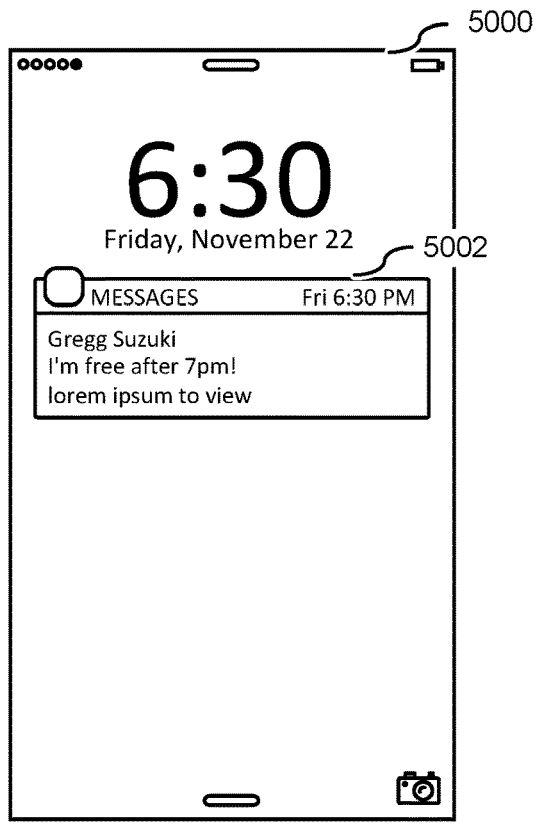
FIGS. 5A-5HHHH illustrate exemplary user interfaces for providing and interacting with notifications in accordance with some embodiments.

FIG. 5A illustrates a locked state user interface 5000 (e.g., a user interface with minimal information and functionality for security), for a portable electronic device (e.g., device 100, 1A). In some embodiments, while locked state user interface 5000 is displayed on the device, the device is considered to be in a locked state. FIG. 5A illustrates a notification displayed after receipt of a first communication at the device, while the device is in a locked state. In some embodiments, a communication includes text-based content, audio/visual content, temporal information, an association with an application, sender information and/or formatting information. FIG. 5A illustrates a notification 5002 generated and displayed in response to receiving the first communication. Notification 5002 includes content from the first communication (e.g., "I'm free after 7 pm!").

FIG. 5A also illustrates that in some embodiments, a notification for an instant message includes the message body of the instant text message, as well as the sender's identifier. In some embodiments, the notification also includes visual characteristics (e.g., logo, icon, color scheme) of the application program (e.g., an instant messaging program) associated with the communication (e.g., an instant message). In some embodiments, the notification includes control elements, such as a link or instructional prompt for opening the application program or otherwise interacting with the communication. In some embodiments, the notification also displays a timestamp associated with the receipt of the communication. In some embodiments, the notification is generated for display locally on the device. In some embodiments, the notification is generated for display on a peripheral device (e.g., a smart watch or wearable badge with a smaller display than the device's native display) associated with the device.

Figure 5B:
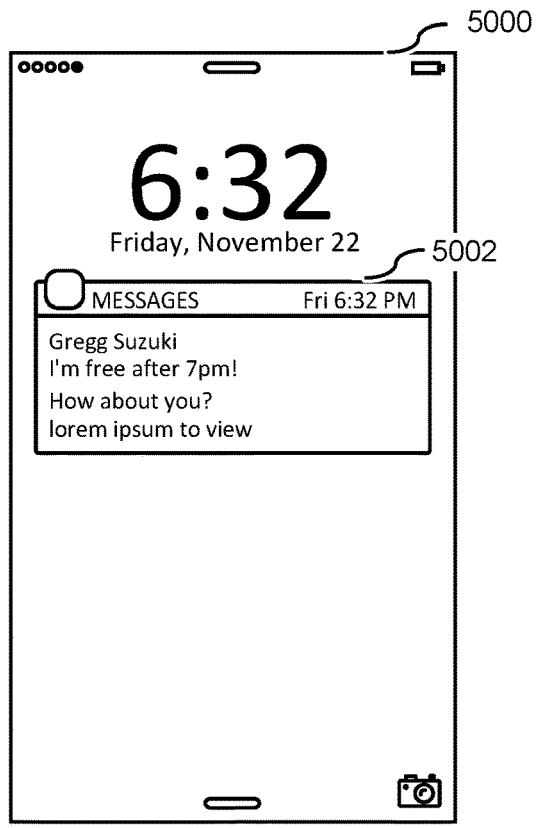

FIG. 5B illustrates an exemplary updated notification that is displayed in response to receipt of a second communication (e.g., "How about you?") at the device, while it is in a locked state. In this example, in response to receiving the second communication, first notification 5002 is updated to include the contents of the second communication. This is done in accordance with a determination that the first and second communications are from the same sender. In some embodiments, determining whether separate communications are from the same sender includes determining if the user name, source telephone number, and/or communication address associated with the sender of the first and second communications are the same (e.g., identical, or belonging to the same restricted group, such as the same department in the same company, in accordance with some predetermined criteria).

In some embodiments, first notification 5002 is updated to include the content of the second communication if one or more notification update criteria are met. For example, the first notification 5002 is updated to include the content of the second communication if the first and second communications are from the same sender, use the same application, are received within a predetermined time period and/or have a common trait or marker. FIG. 5B also illustrates that in some embodiments, notification 5002 displays a timestamp with a receipt time of the first communication (e.g., Fri 6:30 PM), and updating the first notification for display on the lock screen includes updating the timestamp to display a receipt time of the second communication (e.g., Fri 6:32 PM). In some embodiments, the second communication may be received after the receipt of the first communication and before the user has reviewed or interacted with the notification for the first communication.

Figure 5C:
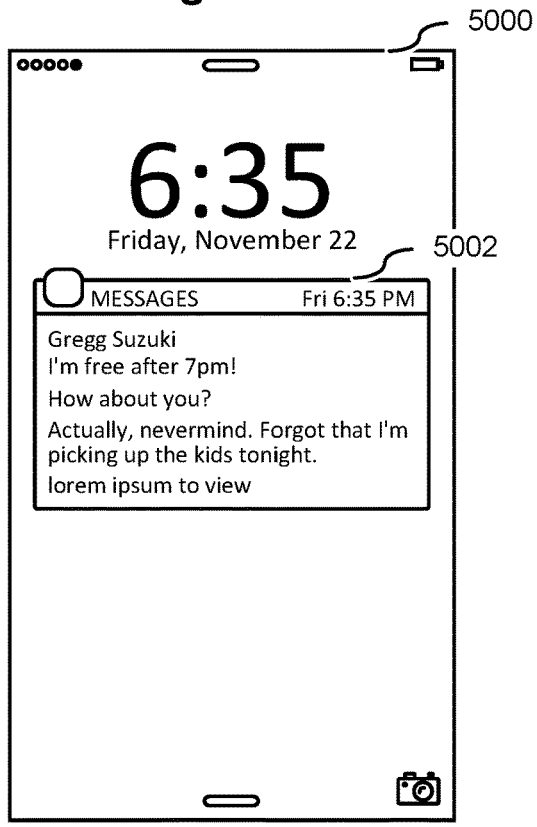

FIG. 5C illustrates an exemplary updated notification that is displayed in response to receipt of a third communication (e.g., "Actually nevermind . . . ") at the device, while it is in a locked state. In this example, in response to receiving the third communication, notification 5002 is updated to include the contents of the third communication, in accordance with a determination that one or more notification update criteria are met (e.g., the first, second and third communication are from the same sender). FIG. 5C illustrates that in some embodiments, if the second communication and the first communication (and optionally the third communication) are from the same sender, the updated first notification sequentially includes a message body from the first communication and a message body from the second communication (and optionally a message body from the third communication).

Additionally, in some embodiments, the updated notification can include the same background, title bar, sender name, and controls for the multiple communication messages. In some embodiments, from the appearance of the updated notification, it would not be distinguishable from a notification that contains just a single message. In other words, the separate notifications usually displayed for separate communications are coalesced or combined into the same notification, if and when it is determined that the separate communications are from the same sender. In some embodiments, the notifications for the separate communications are maintained as separate notifications on the back-end (e.g., in the notification center or some other repository of unhandled notifications on the device), but the notification for display on the lock screen is updated to include the content of both communications. In some embodiments, the notification initially displayed on the lock screen is a short version of the notification, and a corresponding long version of the notification includes more control functions and/or information than the short version of the notification. In some embodiments, the coalesced notification for multiple communications from the same sender includes the same set of control functions and the same types of information (e.g., message body, sender ID, timestamp, etc.) as the short version of a notification for a single communication (e.g., except for the length of the message text), and there is no visual distinction between the two types of notifications. In some embodiments, some visual information that does not add visual clutter (e.g., deepening the color of the title bar) may be provided in the coalesced notification to indicate that it has been updated one or more times due to arrival of new communications from the same sender.

Figure 5D:
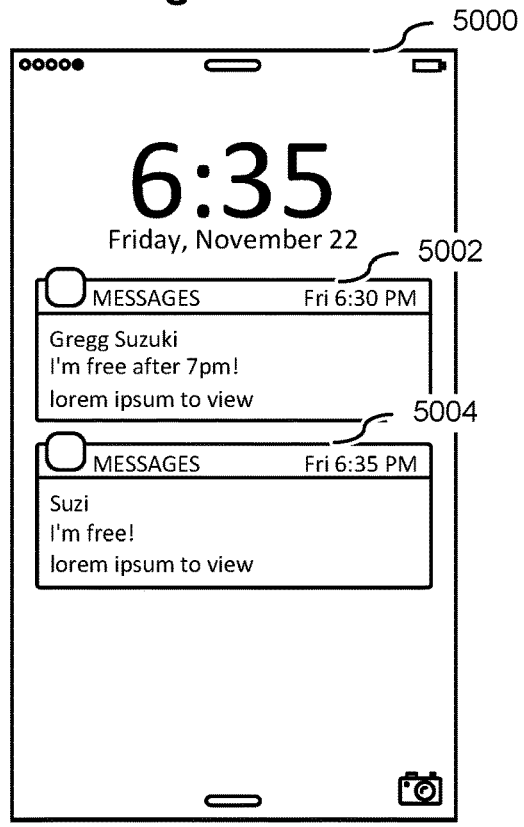

FIG. 5D illustrates an exemplary notification 5004 that is displayed in response to receipt of a fourth communication (e.g., "I'm free!") at the device, while it is in a locked state. In this example, in response to receiving the fourth communication, notification 5004 is generated and displayed, with the content of the fourth communication. In some embodiments, notification 5004 is separate and distinct from notification 5002, and is generated and displayed in accordance with a determination that the first communication and the fourth communication do not satisfy one or more notification update criteria (e.g., the first and fourth communications are not from the same sender). In FIGS. 5A-5D, the received communications correspond to an instant messaging application, but in some embodiments, the received communications correspond to one or more applications such as calendaring, video game, social networking, news, fitness or financial applications.

In some embodiments, the updated first notification is displayed on the lock screen when it is determined that the first and second communications are from the same sender, and the updated first notification includes content from both the first communication and the second communication. In some embodiments, separate notifications are displayed concurrently on the lock screen when it is determined that the first and second communications are from different senders. In some embodiments, the same device both generates the notifications for display and displays them. In some embodiments, if the notification is to be displayed at a peripheral device (e.g., a smart watch coupled to the device via BLUETOOTH) other than the device itself, the device sends the updated first notification to the peripheral device for display at the peripheral device in response to the receipt of the second communication.

Figure 5E:
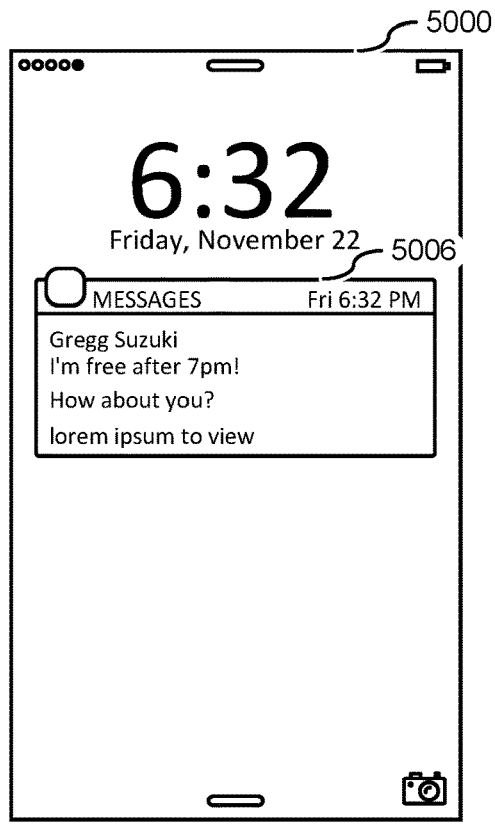
Figure 5F:
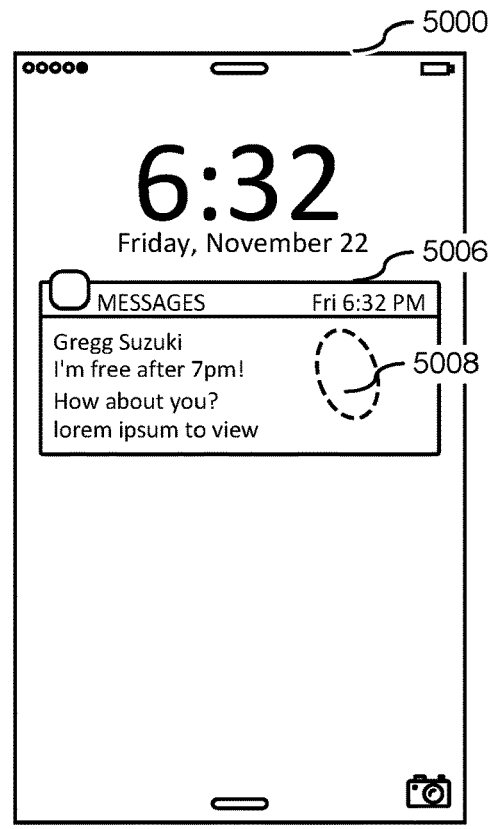
Figure 5G:
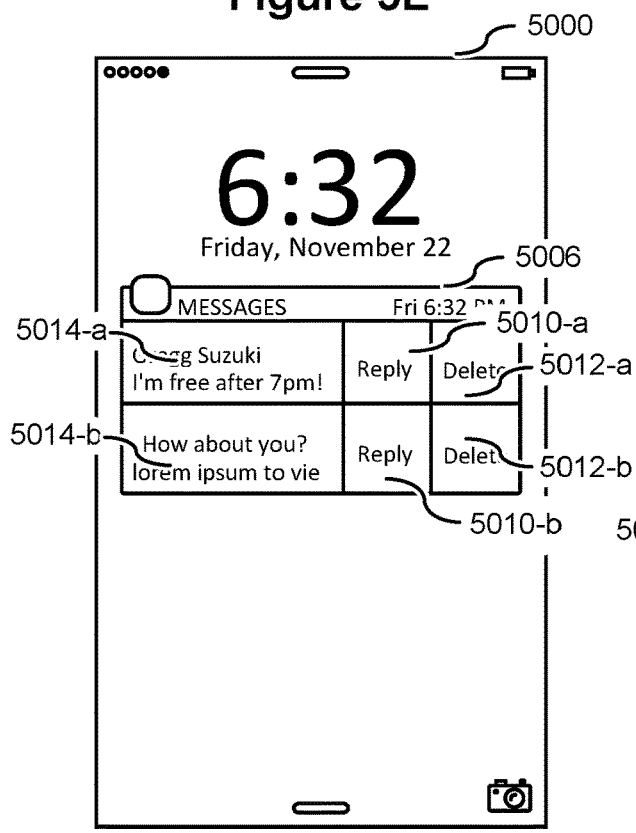

FIG. 5E illustrates an exemplary behavior of a notification 5006 displayed over a locked state user interface 5000. In FIG. 5F, exemplary user input 5008 is detected. In some embodiments, user input 5008 is a tap, press, click, drag, swipe or other gesture on a touch-sensitive surface. FIG. 5G illustrates an exemplary response to detecting user input 5008. In FIG. 5G, an alternative version or an updated version of notification 5006 is generated and displayed, including a first set of action controls 5010-*a* and 5012-*a* (e.g., a reply button and a delete button), corresponding to content 5014-*a* of a first communication, and a second set of action controls 5010-*b* and 5012-*b* corresponding to content 5014-*b* of a second communication. In some embodiments, one or more controls of the first set of action controls is distinct from one or more controls of the second set of action controls (e.g., action control 5012-*b* deletes content 5014-*b* but does not delete content 5014-*a*), while in some embodiments, one or more action controls is common to the first set and the second set of action controls (e.g., reply control 5010-*a* allows for a reply to be written to the messages corresponding to content 5014-*a* and content 5014-*b*.

Figure 5H:
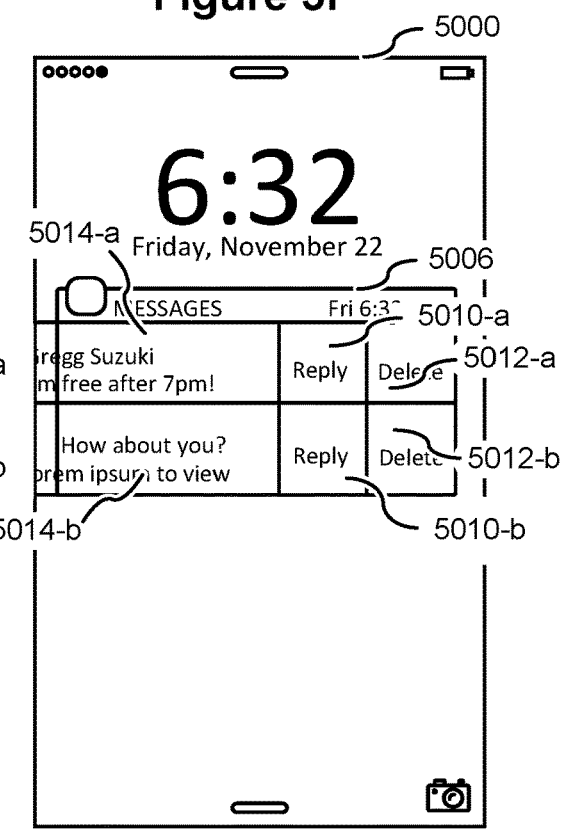

FIG. 5H illustrates another exemplary response to detecting user input 5008. In some embodiments, one or more portions of notification 5006 appear to be displaced off the display of the device (e.g., moved partially off-screen to the left or right), to make room for one or more action controls. For example, the content 5014-*a* of a first received communication is displayed partially off-screen to the left, in order to create room for action controls 5010-*a* and 5012-*a*. In some embodiments, one or more portions of notification 5006 appear to be displaced if the content of one or more communications in notification 5006 exceed a predefined size or value (e.g., if the text of an instant message is more than 20 characters long), and/or the number of corresponding action controls displayed for one or more communications (e.g., slide an instant message to the left if there are two or more action controls displayed).

Figure 5I:
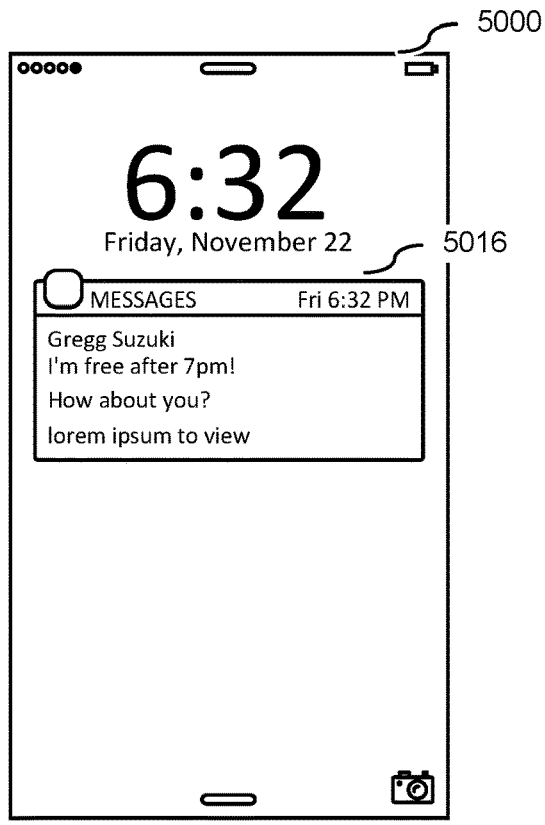

FIG. 5I illustrates receipt of a first and second communication while the device is in a locked state, and a corresponding notification 5016 that is generated and displayed. FIG. 5I illustrates detection of user input 5018 directed to notification 5016. FIG. 5K illustrates an exemplary response to detection of user input 5018, where notification 5016 splits into at least two notifications, corresponding to the number of communications associated with notification 5016. For example, if notification 5016 contains the content of two received communications (e.g., instant messages), in response to detecting user input 5018 (e.g., a tap gesture), two notifications (e.g., notification 5020 and 5022) are generated and displayed on the display of the device, each containing the content of a received communication, respectively.

Figure 5J:
Figure 5K:
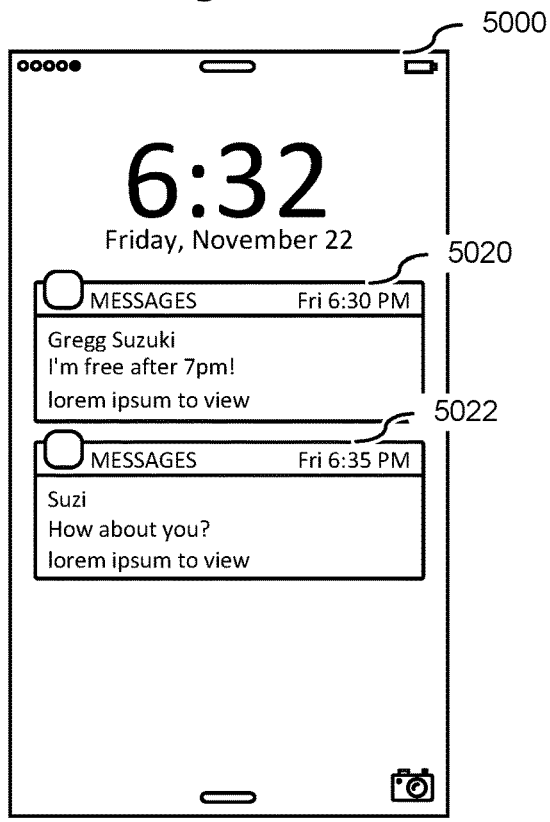
Figure 5L:
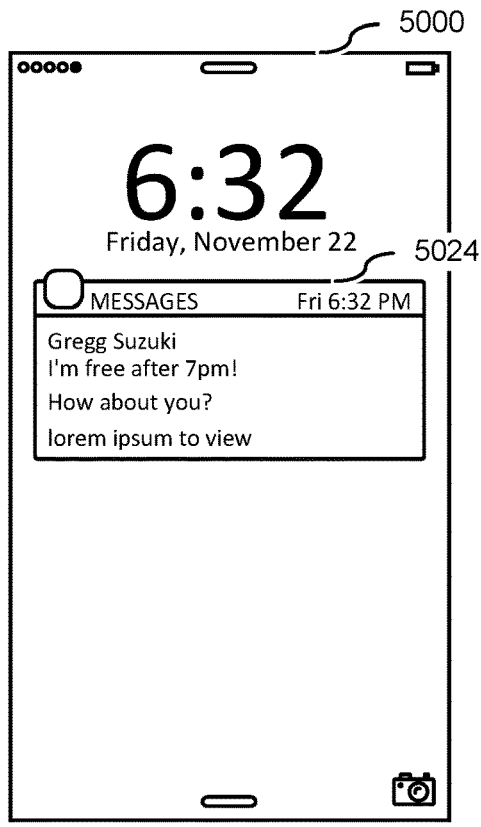
Figure 5M:
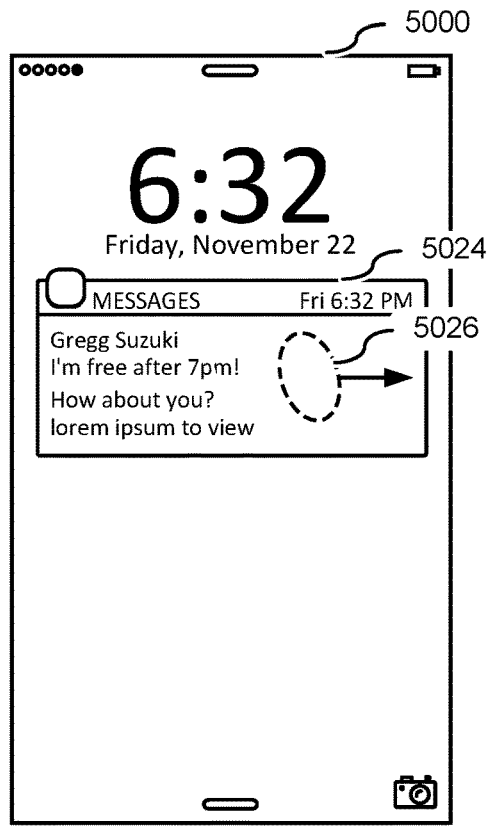
Figure 5N:
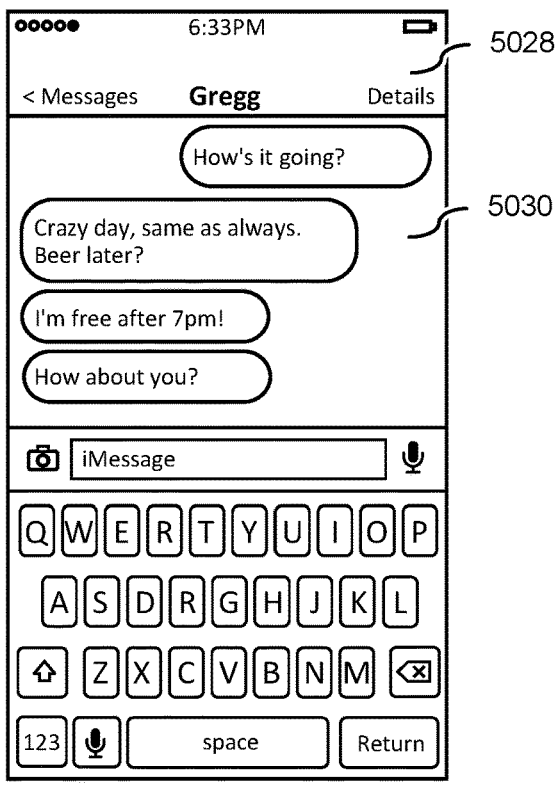

FIG. 5L illustrates an updated notification 5024, including content from a first received communication and a second received communication. In FIG. 5M, detection of a user input 5026 directed to updated notification 5024 is shown. In some embodiments, user input 5026 is a gesture detected on a touch-sensitive surface, such as a drag, tap, press or swipe. FIG. 5N illustrates an exemplary response to detecting user input 5026, where an application associated with the first and second received communications is activated. In this example, a user interface 5028 for the activated application is displayed, and the content of at least the first and second received communications is displayed in a portion 5030 of user interface 5028. For example, the first and second received communications are instant messages, initially displayed in a single notification on a lock screen, and associated with an instant messaging program on the device. In this example, a rightward swipe gesture is detected on the notification and an instant messaging application is launched and displayed. In this example, the first and second received communications are each displayed as distinct messages in the messaging application, along with at least one more message in the conversation (if one exists), to provide context.

Figure 5O:
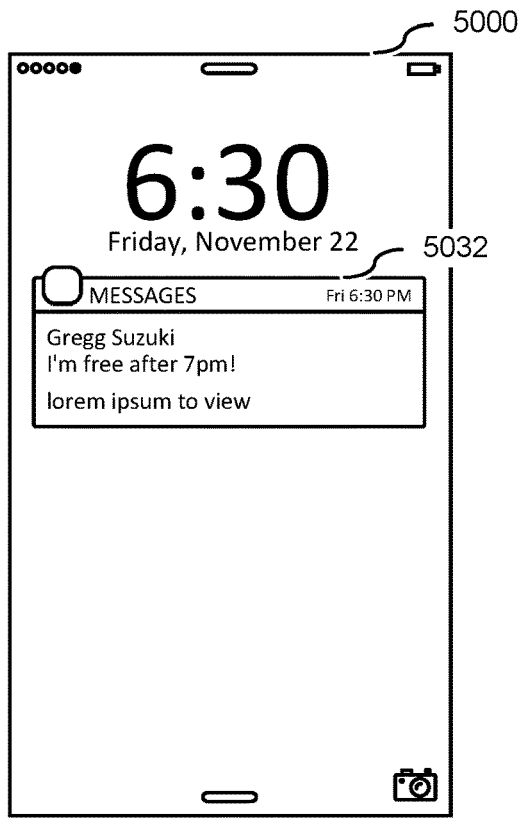
Figure 5P:
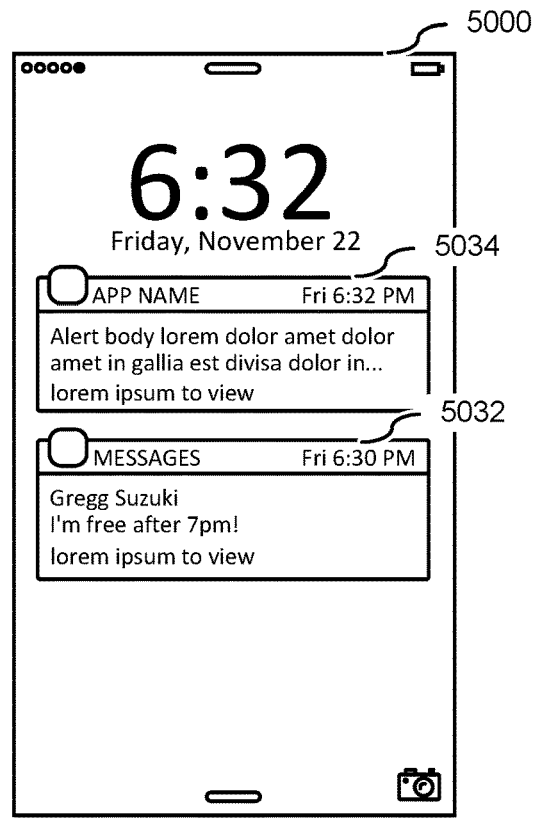

FIG. 5O illustrates receipt of a first communication (e.g., at 6:30 PM), and the subsequent generation and display of corresponding notification 5032. Notification 5032 has a timestamp, indicating the time the most recent communication associated with notification 5032 (e.g., a communication from the same sender, and/or for the same application), was received. FIG. 5P illustrates receipt of a second communication (e.g., at 6:32 PM), associated with notification 5034, distinct from notification 5032. In some embodiments, the second communication is determined to correspond to a distinct notification (e.g., notification 5034) from the notification (e.g., notification 5032) corresponding to the first communication, based on one or more notification update criteria such as the sender and associated application for each communication. For example, the first communication received at the device and associated with notification 5032, corresponds to an instant messaging application, and an instant message received from Greg Suzuki. The second communication received at the device corresponds to another application, and consequently results in the generation and display of another notification, notification 5034. Notification 5034 has a timestamp, indicating that the most recent communication associated with the notification was received at 6:32 PM. FIG. 5P illustrates display of notification 5034 at the top of a list of notifications, on the basis of the timestamps of the notifications. For example, notification 5034 was generated or modified after notification 5032 was, and is correspondingly displayed at the top of the list.

Figure 5Q:
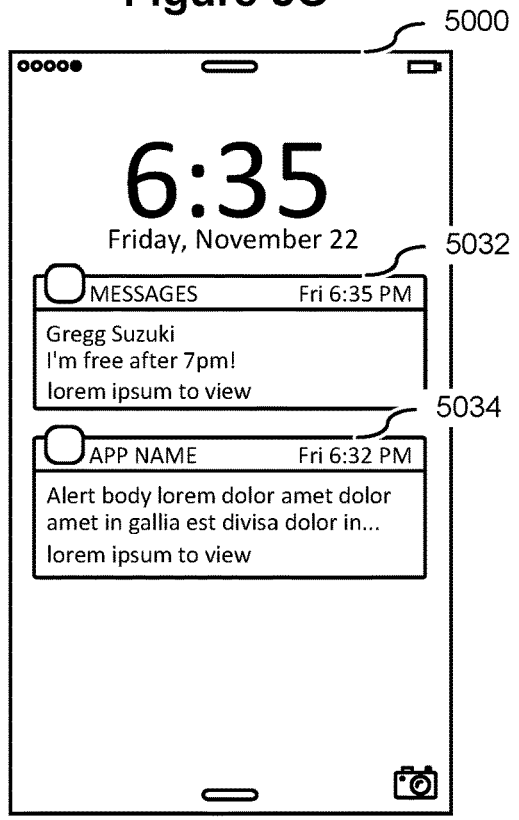

FIG. 5Q illustrates an exemplary response to receipt of a third communication (e.g., at 6:35 PM), associated with notification 5032 (e.g., an instant message received from the same sender as the first communication). In this example, the timestamp for notification 5032 is updated to reflect the time the third communication was received, and the list of notifications is re-ordered on the basis of the timestamps of the notifications (e.g., most recently generated or updated notification is displayed at the top of the list). In some embodiments, a listing of notifications is re-ordered on the basis of one or more factors, such as the associated application for a respective notification (e.g., instant message applications have a higher priority than news applications), or a person or entity associated with the notification (e.g., communications associated with favorite contacts are prioritized over others).

Figure 5R:
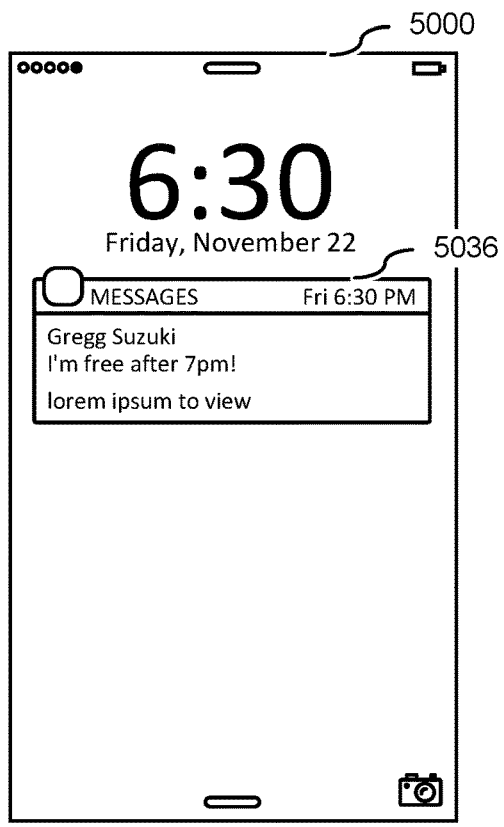
Figure 5S:
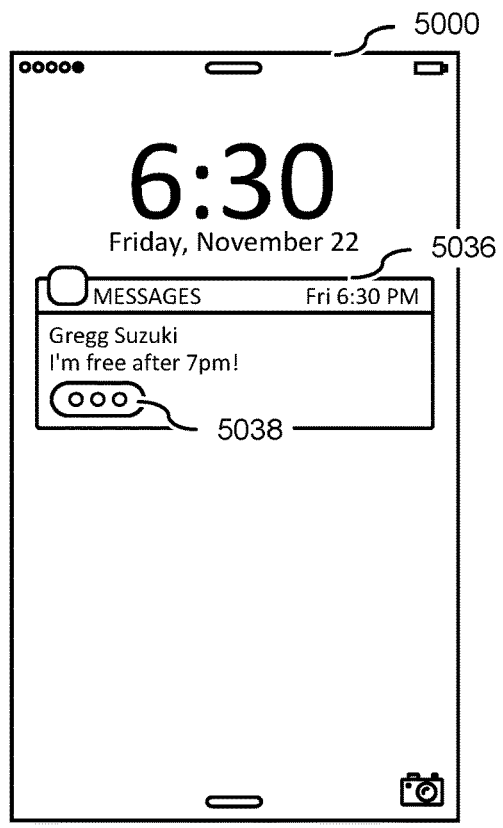
Figure 5T:
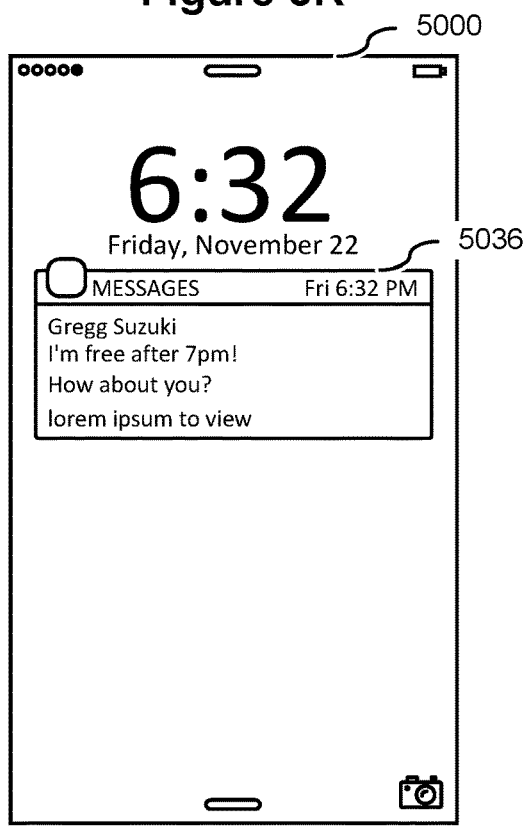

FIG. 5R illustrates display of notification 5036, in accordance with a first received communication. FIG. 5S illustrates an exemplary behavior of notification 5036, in response to the device receiving information indicating that the sender of the first communication is preparing another communication. In FIG. 5S, a communication-preparation indicator 5038, is displayed in notification 5036 (e.g., under the content of the first communication), to indicate that the sender of the first communication is preparing another communication (e.g., another message). FIG. 5T illustrates receipt of a second communication, and updating notification 5036 to display the content of the second communication and cease to display the communication-preparation indicator 5038.

Figure 5U:

FIG. 5U illustrates receipt of a communication and display of a corresponding notification 5040. In FIG. 5U, notification 5040 is generated and displayed in a short version, or short look. In some embodiments, a short version notification provides a subset of available information for a corresponding communication. In some embodiments, a short version notification provides a subset of functionality for a corresponding communication (e.g., fewer than all the options available for the communication in an associated application). In this example, the received communication is an instant message, and notification 5040 is a short version of the notification, with no capability to reply to the sender. FIG. 5U also illustrates detection of user input 5042 directed to notification 5040 in the short version.

Figure 5V:

In some embodiments, in response to detecting user input 5042, a corresponding long version notification 5044 is generated and displayed as shown in FIG. 5V. In some embodiments, the input invoking the corresponding long version of the notification is a downward swipe directed to the short version of the notification. In some embodiments, the input invoking the corresponding long version of the notification is a tap directed to the short version of the notification. In some embodiments, two distinct input types (e.g., a downward swipe versus a tap or rightward swipe) are used to invoke the corresponding long version of the notification or to invoke an application associated with the notification.

In some embodiments, a determination is made regarding whether a user input directed at a short version notification is detected while the device is in a locked state or an unlocked state. FIGS. 5U and 5V illustrate an exemplary response to detection of user input 5042 while the device is in a locked state. In FIG. 5V, additional functionality is provided (e.g., a keyboard and input field to reply to the received instant message), and in some embodiments long version notification 5044 displays additional information or displays the same information of short version notification 5040 in a different way (e.g., to clearly display portions of the corresponding conversation received while the device has been locked).

Figure 5W:
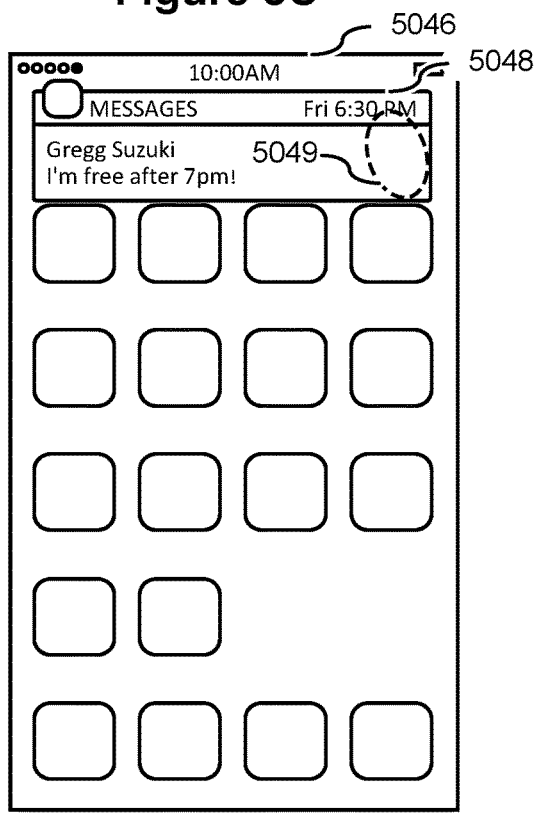
Figure 5X:

FIG. 5W illustrates display and generation of short version notification 5048 while the device is in an unlocked state. In FIG. 5W, user input 5049, directed to short version notification 5048, is detected. In some embodiments, in response to detecting user input 5049, long version notification 5050 is generated and displayed as shown in FIG. 5X. In some embodiments, long version notification 5044 (FIG. 5V) on a lock state user interface 5000 differs from long version notification 5050 (FIG. 5X) on unlocked state user interface 5046. In this example, long version notification 5050 includes additional communication information (e.g., earlier messages in the same conversation with the same user), and in some embodiments, long version notification 5050 provides additional functionality as well (e.g., the ability to include photos in a reply message).

Figure 5Y:
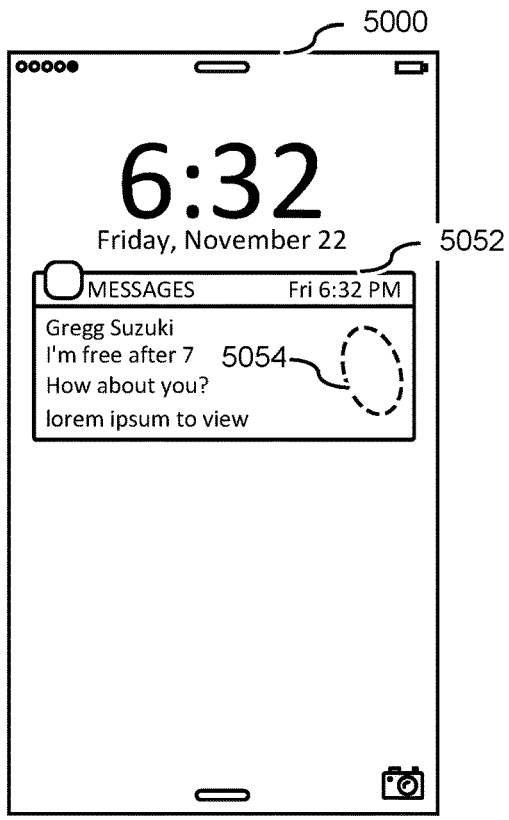
Figure 5Z:
Figure 5A:
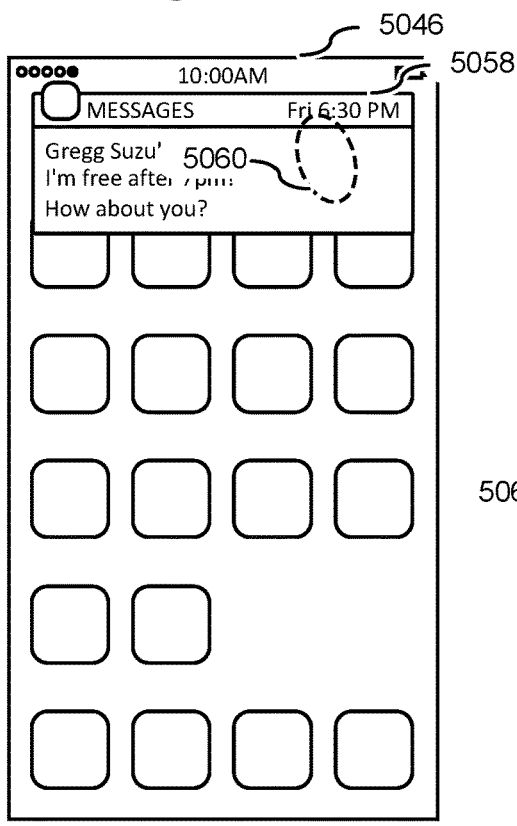
Figure 5B:
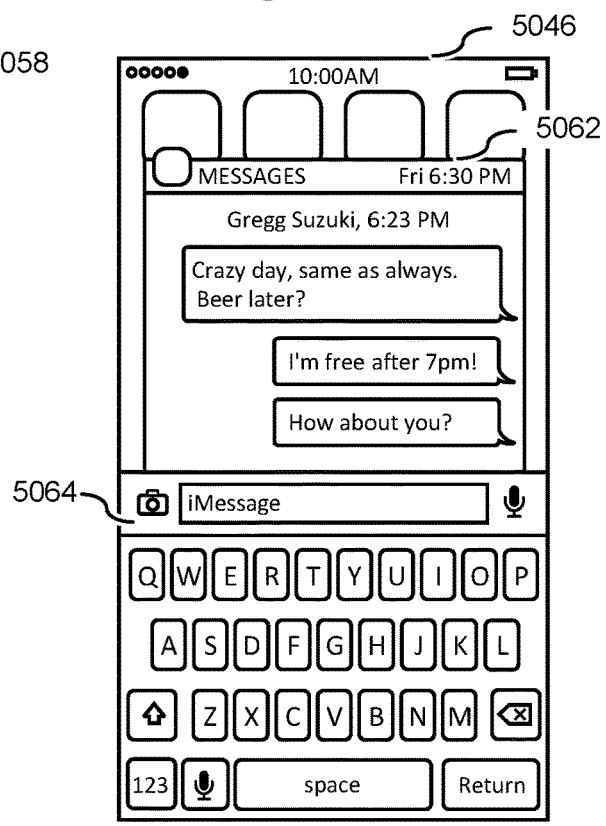
Figure 5D:
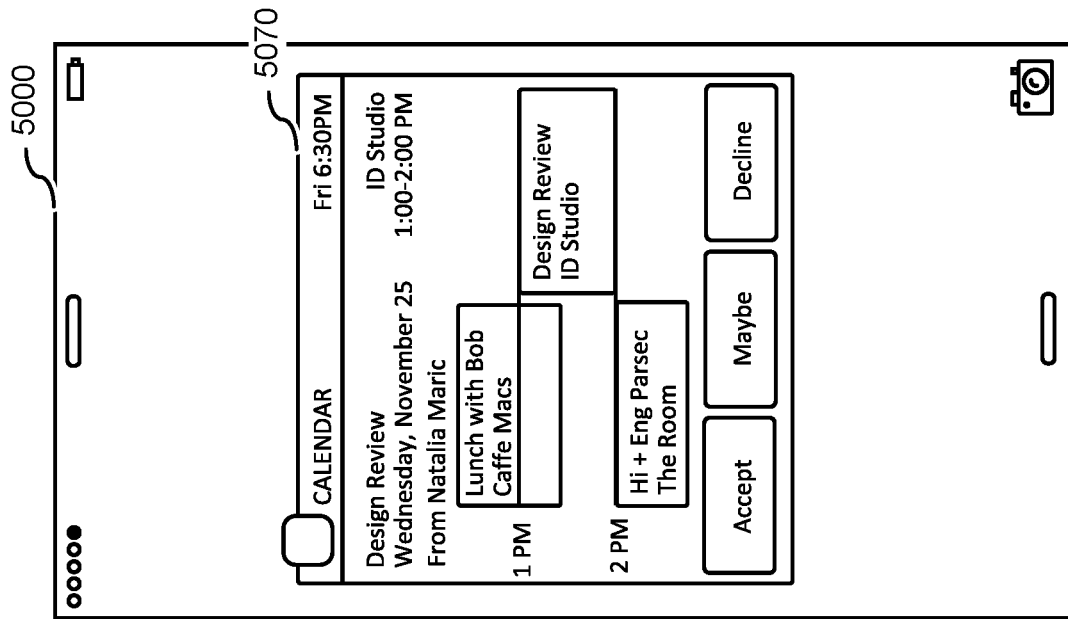
Figure 5C:
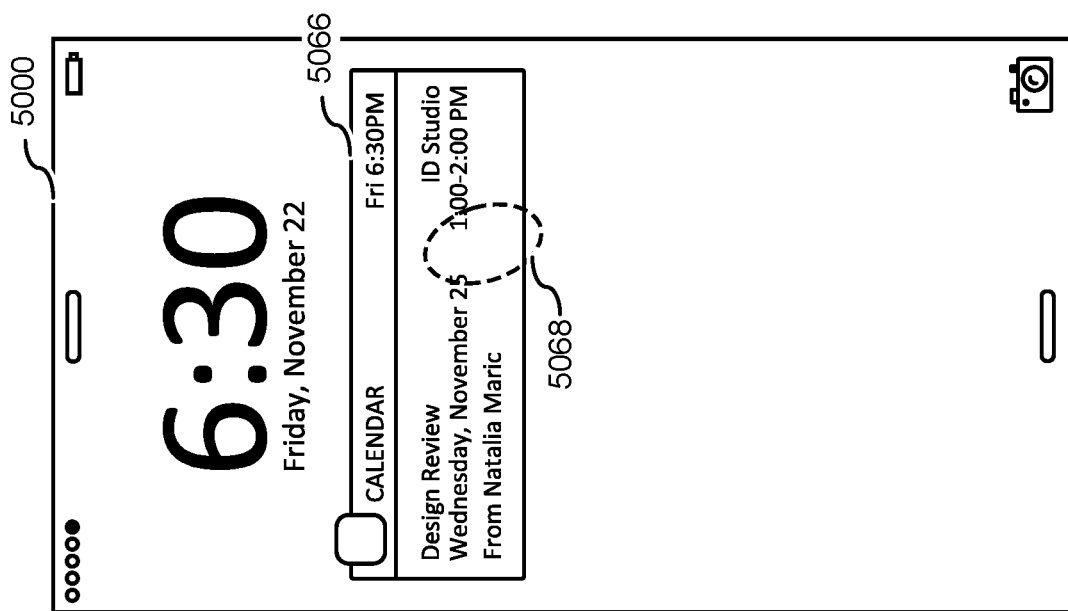
Figure 5G:
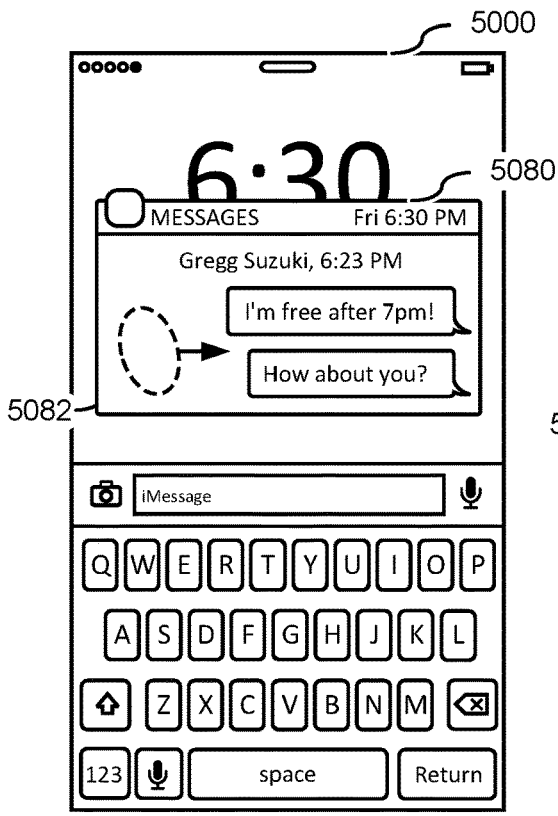
Figure 5H:
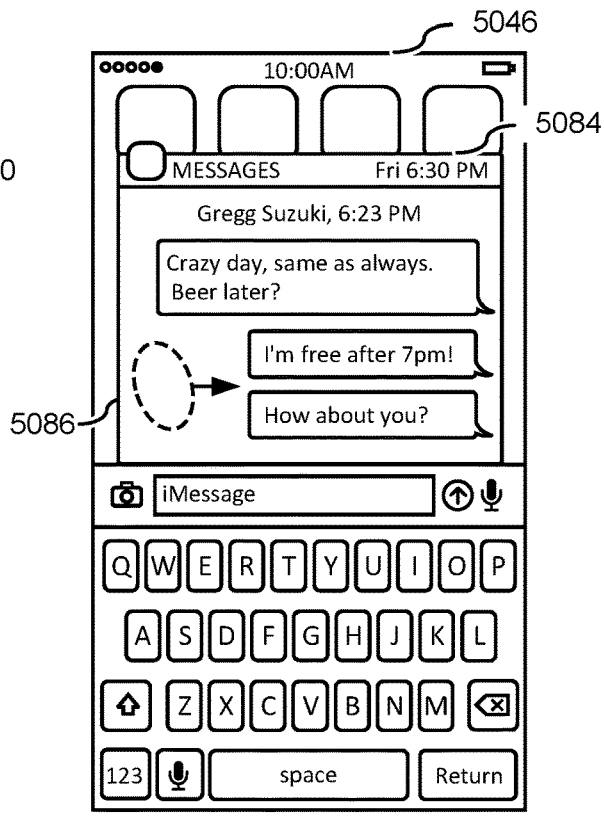
Figure 5I:
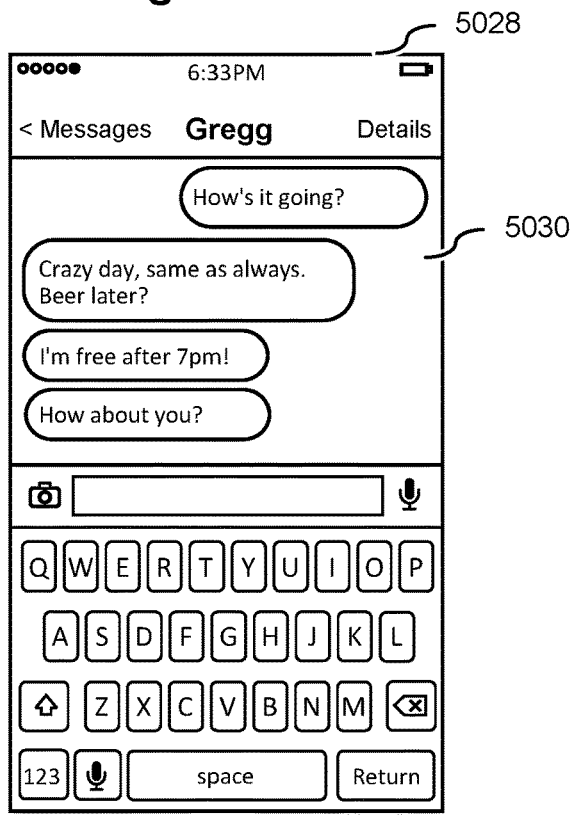
Figure 5K:
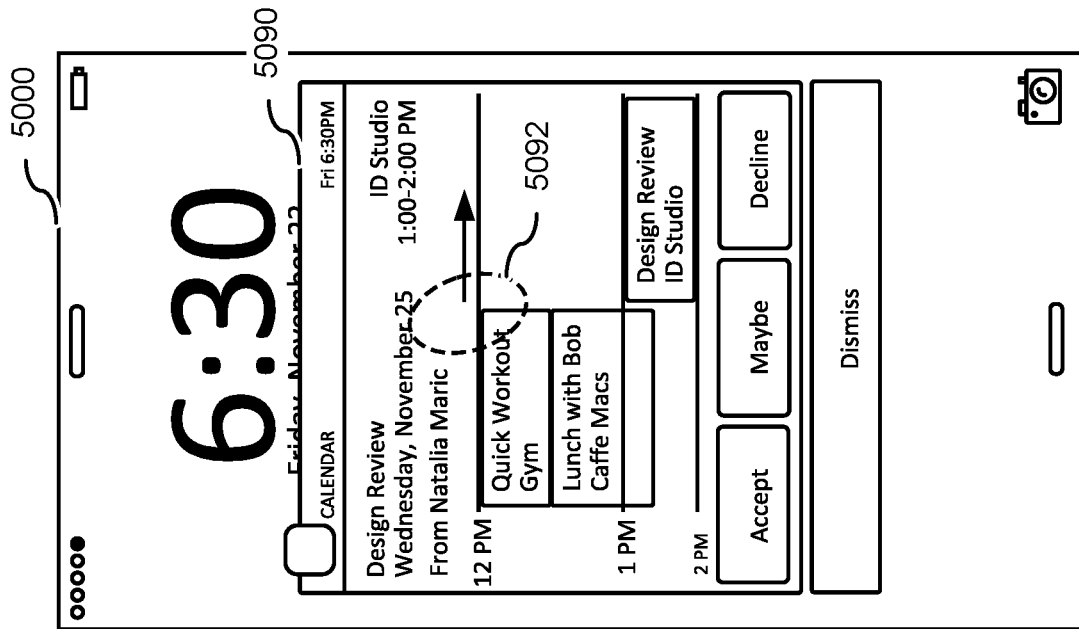
Figure 5J:
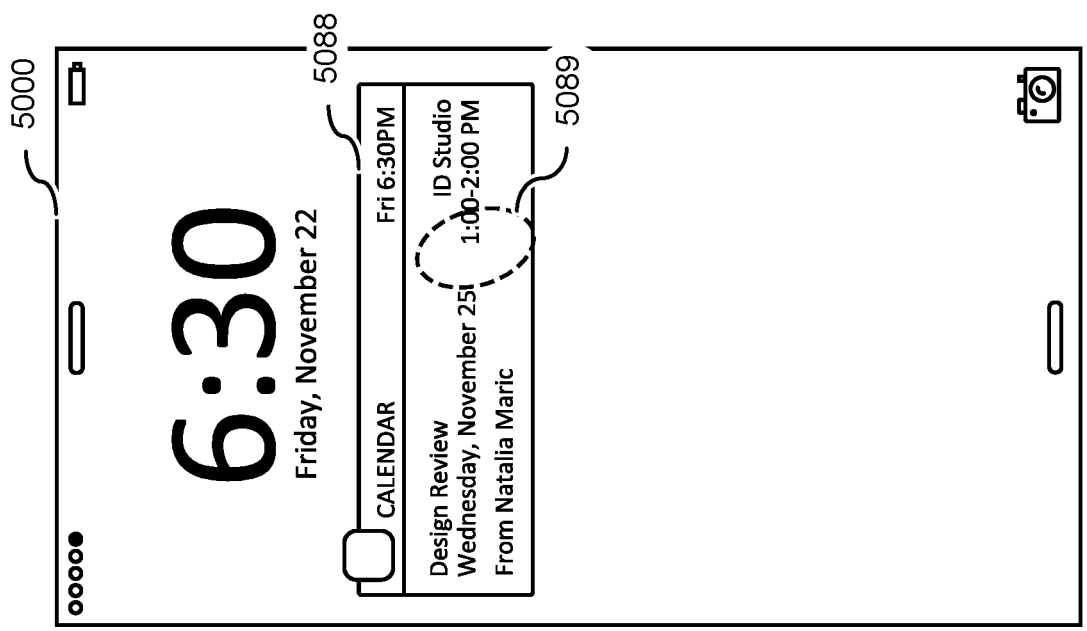
Figure 5M:
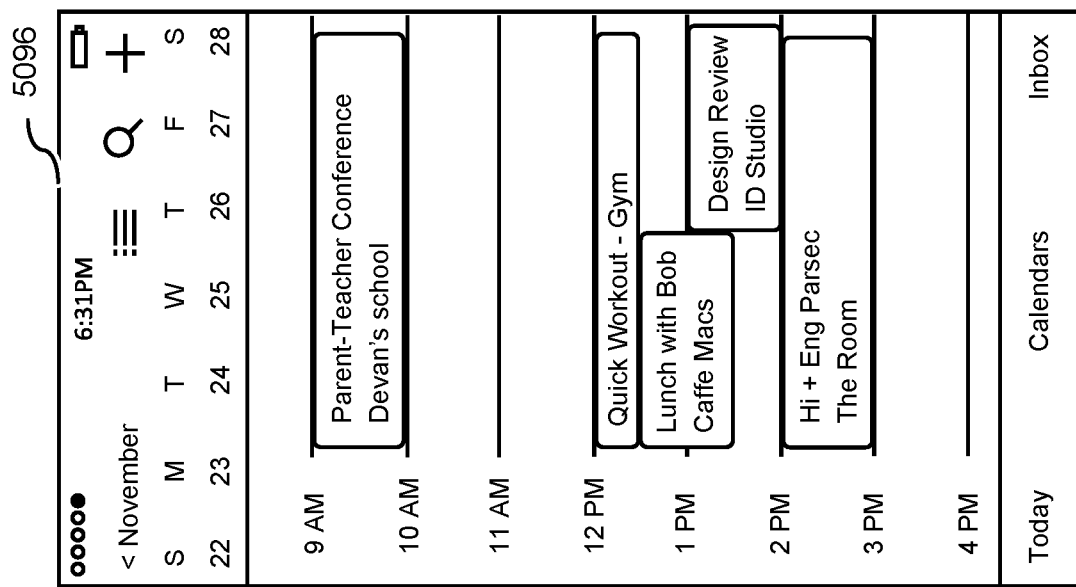
Figure 5L:
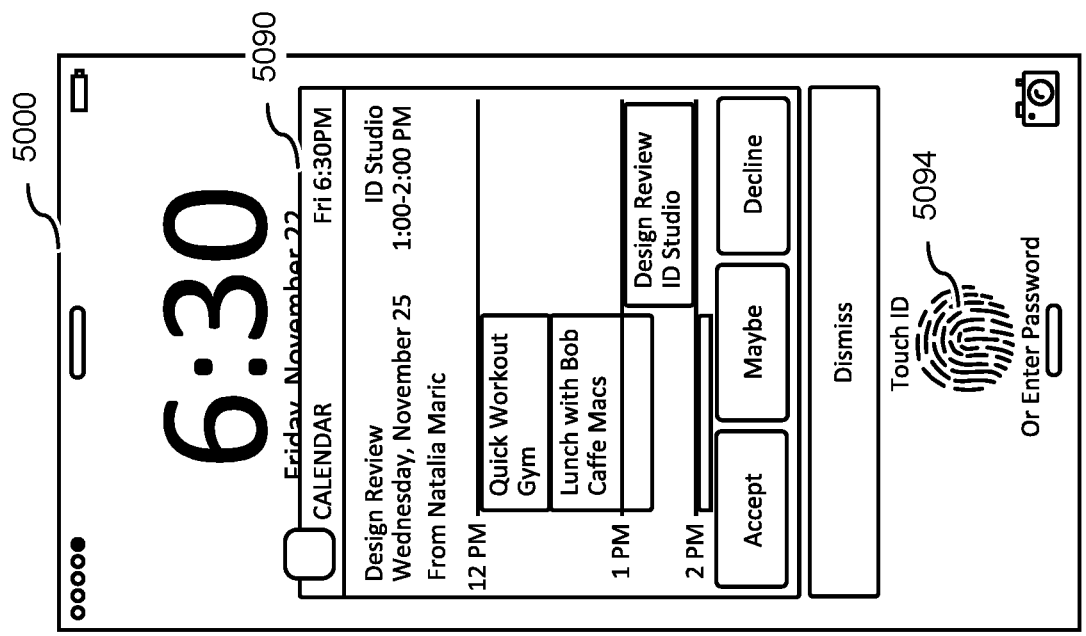
Figure 5N:
Figure 5O:
Figure 5P:
Figure 5Q:
Figure 5R:
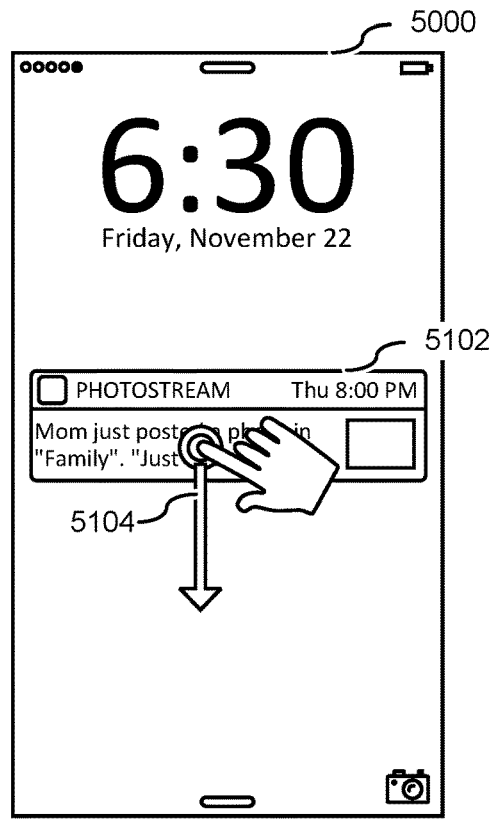
Figure 5S:
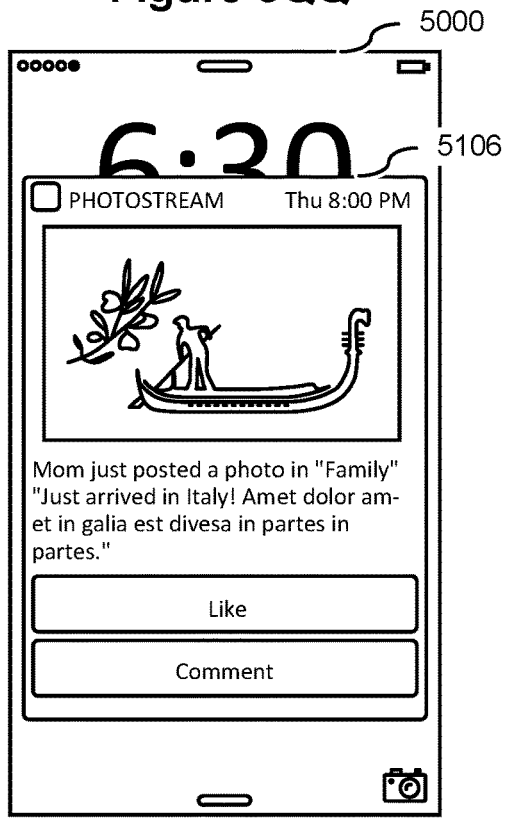
Figure 5T:
Figure 5U:
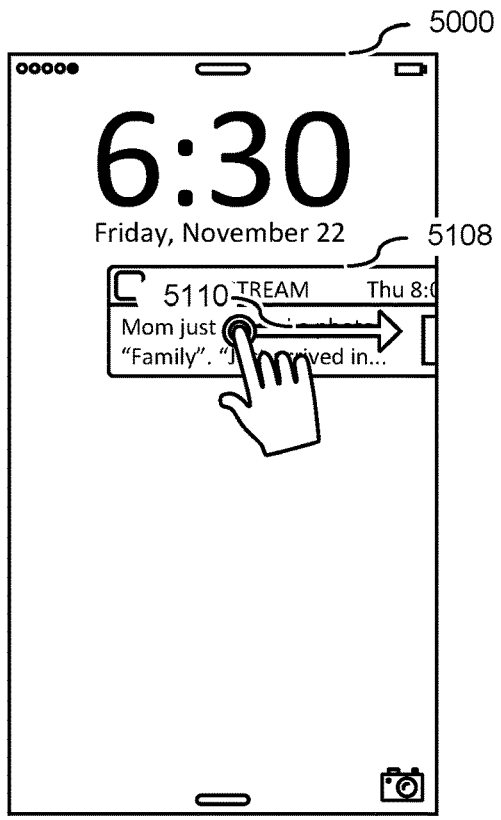
Figure 5V:
Figure 5W:
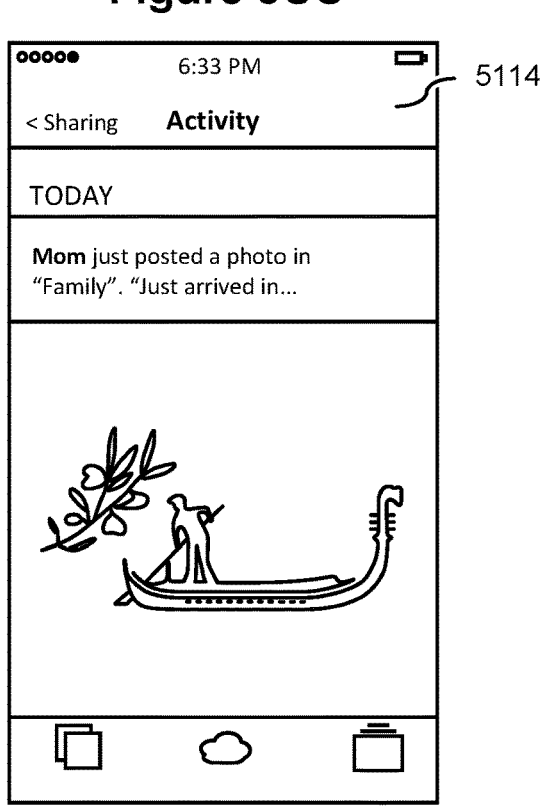
Figure 5X:
Figure 5Y:
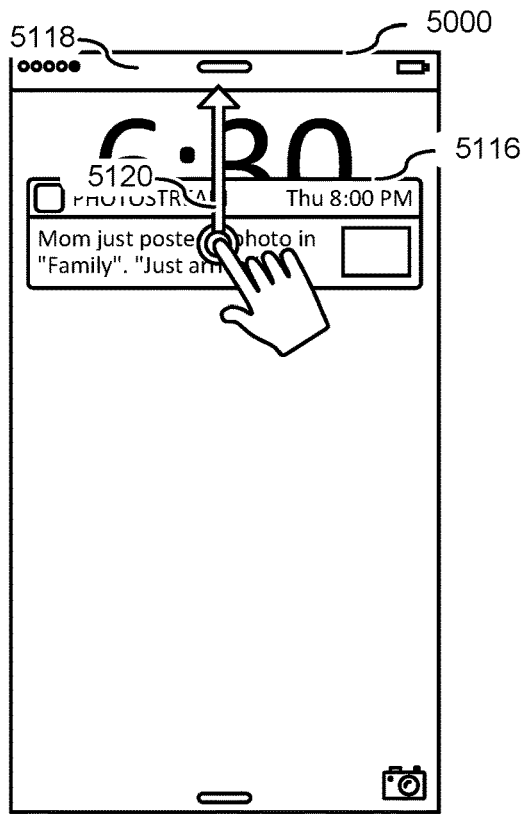
Figure 5Z:
Figure 6B:
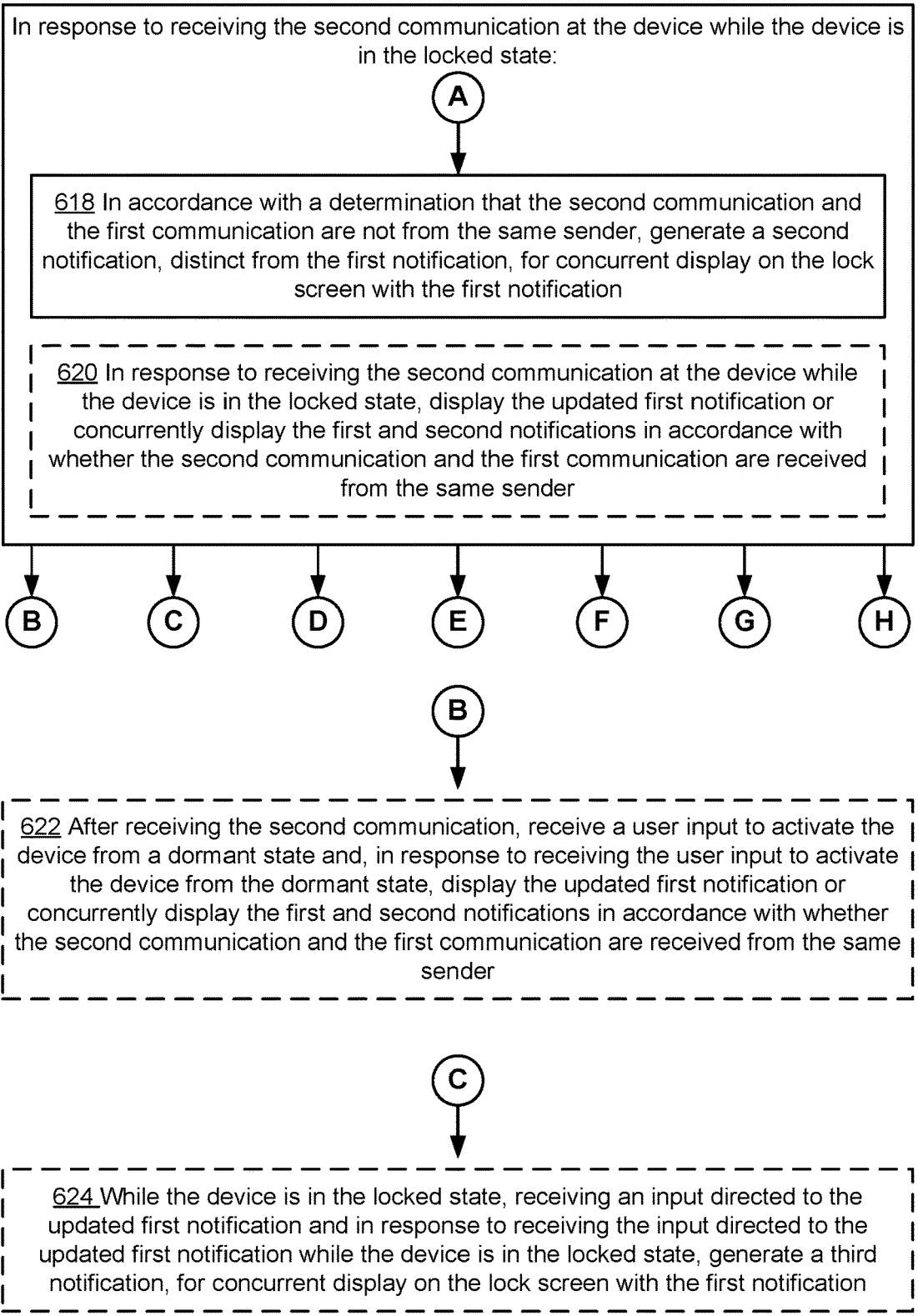

FIG. 5Y illustrates short version notification 5052 on a locked state user interface 5000, after a second communication (e.g., with content "How about you?") is received at the device. User input 5054 is detected, directed to short version notification 5052, and exemplary long version notification 5056 is displayed in response, as shown in FIG. 5Z. In some embodiments, long version notification 5056 is displayed on a lock state user interface 5000, and includes content from the first received communication (e.g., "I'm free after 7 pm!") and the second received communication (e.g., "How about you?").

FIG. 5AA illustrates short version notification 5058 after receipt of a second communication (e.g., having content "How about you?"), while the device is in an unlocked state and displaying unlocked state user interface 5046. In some embodiments, user input 5060, directed to short version notification 5058, is detected. In some embodiments, in response to detecting user input 5060, long version notification 5062 is displayed while the device is in an unlocked state, as shown in FIG. 5BB. In some embodiments, long version notification 5062 includes additional information (e.g., additional conversation text or content of an additional communication) and/or additional functionality (e.g., camera tool 5064) than long version notification 5056. In some embodiments, both long version notification 5056 and long version notification 5062 include a subset of all functions available in an application associated with the notification (e.g., an instant messaging application).

FIG. 5CC illustrates generation and display of another exemplary short version notification 5066 while the device is in a locked state. In this example, short version notification 5066 corresponds to a calendar application, and includes a meeting request received from a sender. In this example, short version notification 5066 includes a subset of available information for the corresponding communication (e.g., it includes the time, date, place and title of the meeting request). FIG. 5CC also illustrates detection of user input 5068 directed to short version notification 5066, and an exemplary response to detection of user input 5068 in FIG. 5DD. In FIG. 5DD, a long version notification 5070 is displayed while the device is in a locked state and displaying locked state user interface 5000. Long version notification 5070 illustrates additional information and functionality over short version notification 5066, such as additional calendaring content (e.g., meeting information for half an hour before and half an hour after the received meeting request), and additional functionality (e.g., control objects to allow the user to accept, tentatively accept or decline to accept the meeting the request).

Figure 5EE illustrates generation and display of exemplary short version notification 5072 while the device is in an unlocked state and displaying unlocked state user interface 5046. User input 5074, directed to short version notification 5072, is detected, and an exemplary response is shown in FIG. 5FF. In FIG. 5FF, corresponding long version notification 5076 is displayed, while the device is in an unlocked state. In some embodiments, long version notification 5076 includes additional information and/or functionality from long version notification 5070 displayed while the device is in a locked state. For example, long version notification 5076 includes calendar information for one hour before the meeting request, and user interface object 5078 to dismiss the notification and/or meeting request.

FIG. 5GG illustrates a first long version notification 5080 displayed while the device is in a locked state and locked state user interface 5000 is displayed. Figure 5HE illustrates a second long version notification 5084 displayed while the device is in an unlocked state and unlocked state user interface 5046 is displayed. In some embodiments, a user input directed at a long version notification is detected. For example, user input 5082 is detected while the device is in a locked state, and user input 5086 is detected while the device is in an unlocked state. In some embodiments, in response to detecting a user input directed to either the first long version notification 5080 or the second long version notification 5084, user interface 5028 for an application corresponding to either long version notification is displayed, as shown in FIG. 5II. For example, first long version notification 5080 and second long version notification 5084 correspond to received instant messages, and in response to detecting either user input 5082 or user input 5086, an instant messaging application is launched, as shown in FIG. 5II. FIG. 5II also illustrates that in some embodiments, user interface 5028 for the launched application provides additional content and/or functionality over either the first long version notification 5080 or second long version notification 5084. For example, in section 5030 of user interface 5028 of the instant messaging application shown in FIG. 5II, the content of at least one additional received communication is displayed. In user interface 5028, additional functionality is also provided, such as a control object allowing for access to other instant message conversations, and a control object providing details of the current instant message conversation displayed in user interface 5028.

FIG. 5JJ illustrates detection of a first user input 5089 detected on short version notification 5088. FIG. 5KK illustrates generation and display of corresponding long version notification 5090 in response to detecting user input 5089. In FIG. 5KK, second user input 5092 is detected, directed to long version notification 5090. In some embodiments, long version notification 5090 is displayed while the device is in a locked state. In some embodiments, in response to detecting user input 5092, an application associated with the long version notification 5090, is launched. FIG. 5MM illustrates an exemplary user interface 5096 corresponding to the launched application. In some embodiments, in response to detecting user input 5092, an authentication mode is initiated on the device. FIG. 5LL illustrates an exemplary representation of an authentication mode, including an authentication prompt 5094. In some embodiments, authentication prompt 5094 includes text and/or graphics to instruct the user how to provide authentication information in order to unlock the device (e.g., biometric data or password entry). In some embodiments, in response to successful authentication of the device user's registered identity, the application corresponding to long version notification 5090 is launched, as shown in FIG. 5MM.

FIG. 5NN illustrates display of an exemplary short version notification 5098 displayed while the device is in a locked state and displaying locked-state user interface 5000. FIG. 5OO illustrates an exemplary user input 5100 directed to short version notification 5098. For example, user input 5100 is a leftward drag or swipe gesture detected on short version notification 5098. In some embodiments, notification 5098 correspondingly moves with user input 5100. In some embodiments, as notification 5098 moves past a predefined distance-based threshold, it ceases being displayed, as shown in FIG. 5PP. In some embodiments, in response to detecting user input 5100, or in response to detecting successfully exceeding the predefined distance-based threshold, notification 5098 is cleared or considered to have been read.

FIG. 5QQ illustrates display of an exemplary short version notification 5102 displayed while the device is in a locked state and displaying locked-state user interface 5000. FIG. 5RR illustrates an exemplary user input 5104 directed to short version notification 5102. For example, user input 5104 is a downward drag or swipe gesture detected on short version notification 5102. In some embodiments, notification 5102 correspondingly moves with user input 5104. In some embodiments, as notification 5102 moves past a predefined distance-based threshold, it ceases being displayed, as shown in FIG. 5SS, and is replaced with display of a corresponding long version notification 5106. In some embodiments, in response to detecting user input 5104, or in response to detecting successfully exceeding the predefined distance-based threshold, notification 5102 is cleared or considered to have been read. In some embodiments, corresponding long version notification 5106 includes content of short version notification 5102, and additional information such as images, video, text, user interface control objects and/or audio playback.

FIG. 5TT illustrates display of an exemplary short version notification 5108 displayed while the device is in a locked state and displaying locked-state user interface 5000. FIG. 5UU illustrates an exemplary user input 5110 directed to short version notification 5108. For example, user input 5110 is a rightward drag or swipe gesture detected on short version notification 5108. In some embodiments, notification 5108 correspondingly moves with user input 5110. In some embodiments, as notification 5108 moves past a predefined distance-based threshold, it ceases being displayed, as shown in FIG. 5VV. In some embodiments, in response to detecting user input 5110, or in response to detecting successfully exceeding the predefined distance-based threshold, notification 5108 is cleared or considered to have been read. In some embodiments, in response to detecting user input 5110, or in response to detecting successfully exceeding the predefined distance-based threshold, the device enters an authentication mode to authenticate the identity of a registered user of the device. In some embodiments, an authentication prompt 5112 is displayed. In some embodiments, in response to detecting user input 5110, or in response to detecting successfully exceeding the predefined distance-based threshold, or in response to detecting successful authentication of the identity of a registered user of the device, an application corresponding to notification 5108 is launched. FIG. 5WW illustrates an exemplary user interface 5114 for the corresponding launched application. In some embodiments, the corresponding launched application includes additional content and/or functionality from that in notification 5108.

FIG. 5XX illustrates display of an exemplary short version notification 5116 displayed while the device is in a locked state and displaying locked-state user interface 5000. FIG. 5XX illustrates an exemplary user input 5120 directed to short version notification 5116. For example, user input 5120 is an upward drag or swipe gesture detected on short version notification 5116. In some embodiments, notification 5116 correspondingly moves with user input 5120. In some embodiments, as notification 5116 moves past a predefined distance-based threshold, it ceases being displayed, as shown in FIG. 5ZZ. In some embodiments, in response to detecting user input 5120, or in response to detecting successfully exceeding the predefined distance-based threshold, notification 5116 is cleared or considered to have been read. In some embodiments, in response to detecting user input 5120, or in response to detecting successfully exceeding the predefined distance-based threshold, notification 5116 is stored for later review. In some embodiments, notification 5116 is stored in a notification center 5118. In some embodiments, a portion of notification center 5118 appears (e.g., from the top of the display), as notification 5116 is stored in it, to indicate that notification 5116 is stored in notification center 5118. FIG. 5ZZ illustrates that in some embodiments, after notification 5116 is stored for later review, it ceases to be displayed.

FIG. 5AAA illustrates exemplary receipt of one or more communications while the device is in a locked state and is displaying locked-state user interface 5000. In this example, three notifications (e.g., short version notification 5122, short version notification 5126 and short version notification 5128) are generated and displayed on lock-state user interface 5000, in accordance with three received communications. In some embodiments, a user input 5124 is detected, directed to a displayed notification (e.g., notification 5122). In some embodiments, in response to detecting user input 5124, an application corresponding to notification 5122 is invoked, or launched, as shown in FIG. 5DDD. In some embodiments, in response to detecting user input 5124, the device displays a blurred or partially blurred user interface 5130 for the application corresponding to notification 5122. In some embodiments, to generate the blurred user interface, some information (e.g., personal, private, and/or confidential information) in user interface 5130 is obscured by blurring, shading, or the like, and other information (e.g., general, public, and/or non-confidential information) in the first user interface is not obscured). In some embodiments, as shown in FIG. 5BBB, the blurred or partially blurred user interface 5130 is displayed while the device enters an authentication mode to authenticate the identity of a registered user of the device. In some embodiments, an authentication prompt 5132 is generated and displayed while the device is operating in the authentication mode.

In some embodiments, in response to detecting user input 5124 on a notification 5122, an animated transition to user interface 5130 of an application corresponding to notification 5122, is displayed as shown in FIG. 5CCC. In some embodiments, in response to detecting successful authentication of the device while operating in an authentication mode, the animated transition to user interface 5130 of an application corresponding to notification 5122, is displayed as shown in FIG. 5CCC. In some embodiments, the animation includes a transition from a blurred view of user interface 5130 to an unblurred view of user interface 5130 (e.g., an unblurring effect). In some embodiments, the blurred view of user interface 5130 includes portions of unblurred images, videos and/or text. In some embodiments, the animation includes a distortion effect, a fading effect and/or a wash effect from displaying one user interface to another user interface. In some embodiments, whether or not an application user interface is blurred depends on one or more privacy factors, such as the type of application (e.g., instant messaging), the time since the device was unlocked, if the device has authentication procedures in place (e.g., if the user has set up a password), and/or environmental factors such as the location of the device (e.g., at the user's home) and/or time of day.

FIG. 5EEE illustrates exemplary receipt of communications while the device is in a locked state and is displaying locked-state user interface 5000. In this example, three notifications (e.g., short version notification 5122, short version notification 5126 and short version notification 5128) are generated and displayed on lock-state user interface 5000, in accordance with three received communications. In some embodiments, one or more of the received notifications are part of a notification cluster. In some embodiments, a user input 5124 is detected, directed to a displayed notification (e.g., notification 5122). In some embodiments, as shown in FIG. 5FFF, in response to detecting user input 5124, a blurred or partially blurred user interface 5130 for an invoked application corresponding to notification 5122 is displayed. In some embodiments, the blurred view of user interface 5130 includes portions of unblurred images, videos and/or text. In some embodiments, as shown in FIG. 5FFF, one or more notifications that are not associated with the invoked application remain displayed (e.g., one or more notifications of a notification cluster). In some embodiments, as shown in FIG. 5FFF, the blurred or partially blurred user interface 5130 is displayed while the device enters an authentication mode to authenticate the identity of a registered user of the device. In some embodiments, an authentication prompt 5132 is generated and displayed while the device is operating in the authentication mode.

FIG. 5GGG illustrates an exemplary response to successful authentication of the identity of a registered user of the device, or an exemplary response to detection of user input 5124. In some embodiments, an unobscured or unblurred view of user interface 5130 is displayed, with the one or more notifications not associated with the invoked application also displayed for a predetermined amount of time (e.g., notification 5126 and notification 5128). FIG. 5HHH illustrates an unobscured or unblurred view of user interface 5130, for example, after a predetermined amount of time has passed for displaying notifications 5126 and 5128.

FIG. 5III illustrates one or more notifications (e.g., short version notification 5132, short version notification 5134 and short version notification 5136) generated and displayed over lock-screen user interface 5000, while the device is in a locked state. The one or more notifications correspond to one or more received communications, and one or more applications. In some embodiments, while the one or more notifications are displayed while the device is in a locked state, a user input is detected to unlock the device. In some embodiments, unlocking the device requires successful authentication of the identity of a registered user of the device, and in response to detecting the user input to unlock the device, the device enters an authentication mode. In some embodiments, as shown in FIG. 5JJJ, authentication prompt 5137 is provided, while the device is in an authentication mode.

In some embodiments, in response to the user input to unlock the device, or in response to successful authentication of the identity of a registered user of the device, unlocked-state user interface 5046 is displayed and the one or more notifications are arranged into a cluster 5138 of notifications and overlaid on user interface 5046, as shown in FIG. 5KKK. In some embodiments, the cluster 5138 is displayed at the top or bottom of user interface 5046. In some embodiments, cluster 5138 is displayed for a predetermined amount of time before ceasing to be displayed. In some embodiments cluster 5138 remains displayed until a user input such as user input 5140 is detected, directed to cluster 5138. FIG. 5LLL illustrates an exemplary response to user input 5140 directed to cluster 5138. FIG. 5LLL illustrates that in response to receiving the user input directed to the cluster, it is determined whether the user input 5140 satisfies at least a first criterion. In some embodiments, if user input 5140 satisfies at least the first criterion, cluster 5138 is expanded to show the plurality of notifications (e.g., notification 5132, notification 5134 and notification 5136). In some embodiments, the one or more notifications of cluster 5138 are displayed in the same format as they were displayed over lock-state user interface 5000 (e.g., as shown in FIG. 5III), and in some embodiments, the one or more notifications of cluster 5138 are displayed in an alternative format over unlocked-state user interface 5046 (e.g., a long version notification).

In some embodiments, if a downward swipe is associated with the command for un-clustering the notifications, then the first criterion is that the user input is a downward swipe across the cluster. In some embodiments, if a deep press input is associated with the un-clustering of the notifications, the first criterion is an intensity threshold associated with fully expanding the notification cluster into individual notifications. In some embodiments, a light press below the required intensity to fully expand the notification cluster causes the cluster to expand in accordance with the intensity of the light press, and retract into the cluster upon lift-off of the light press input.

FIG. 5MMM illustrates a cluster 5138 of notifications displayed over exemplary unlocked-state user interface 5046, while the device is in an unlocked state. FIG. 5MMM also illustrates detection of user input 5142 (e.g., an upward swipe or a left or right swipe), directed to the cluster 5138 of notifications overlaid on user interface 5046. In some embodiments, in response to receiving user input 5142 directed to the cluster, the device determines whether user input 5142 satisfies a second criterion. In some embodiments, the second criterion may be met by any input that is different from the input that causes the un-clustering of the notifications. In response to detecting that user input 5142 satisfies the second criterion, cluster 5138 ceases to be displayed, as shown in FIG. 5NNN. In some embodiments, this includes clearing the one or more notifications of cluster 5138 after ceasing to display the cluster. In some embodiments, a cleared notification is not displayed as a notification again. In some embodiments, clearing a notification deletes the notification from the device. In some embodiments, clearing a notification marks the event or communication associated with the notification as read or reviewed in an application associated with the notification. In some embodiments, the one or more notifications of cluster 5138 are stored (e.g., in a notification center) after ceasing to be displayed by the device.

FIG. 5OOO also illustrates a cluster 5138 of notifications displayed over exemplary unlocked-state user interface 5046, while the device is in an unlocked state. In FIG. 5OOO, however, the device determines whether a user input directed to the cluster has been received during a predetermined time window (e.g., 5, 10, or 15 seconds) since the cluster was overlaid on user interface 5046. In accordance with a determination that no user input directed to cluster 5138 has been received during the predetermined time window since cluster 5138 was overlaid on user interface 5046, cluster 5138 ceases to be displayed. In some embodiments, this includes clearing the one or more notifications of cluster 5138 after ceasing to display the cluster. In some embodiments, a cleared notification is not displayed as a notification again. In some embodiments, clearing a notification deletes the notification from the device. In some embodiments, clearing a notification marks the event or communication associated with the notification as read or reviewed in an application associated with the notification. In some embodiments, the one or more notifications of cluster 5138 are stored (e.g., in a notification center) after ceasing to be displayed by the device.

FIG. 5QQQ illustrates an example of the device receiving a communication associated with an application (e.g., receiving an instant message associated with an instant messaging application, or receiving a calendar invitation associated with a calendar application). FIG. 5QQQ also illustrates that in some embodiments, the device displays a notification 5144 that corresponds to the received communication, where the displayed notification 5144 includes a user interface that provides a subset (less than all) of functionalities available in the application. For example, the notification 5144 is for an instant message, and includes the message sender and message text of the instant message, a textual reply input box for receiving textual input from the user, and a send button for sending the textual reply once the reply is completed by the user. In another example, a notification for a calendar invitation includes a daily event view showing a portion of the user's calendar (including any existing scheduled events) on the day of the event specified in the calendar invitation. The user optionally interacts with the notification interface to bring up a weekly event view showing a larger portion of the user's calendar (including any existing scheduled events) during the week of the event specified in the calendar invitation. The user also optionally interacts with the notification interface to browse to one or more adjacent days in the calendar to see what's been scheduled in those day(s).

FIG. 5RRR illustrates that while displaying the notification 5144, the device detects user interaction (e.g., text entry in field 5146) with the user interface of the notification 5144, where the user interaction causes changes to an initial local state of the user interface of notification 5144 (e.g., changes to the UI appearance by browsing to a different part of the UI or inputting information). In response to detecting the user interaction with the user interface of the notification 5144, the device displays a current local state of the user interface of notification 5144 that is different from the initial local state of the user interface of notification 5144. For example, the user starts entering part of a textual message in the textual reply input box in notification 5144 for an instant message. In some embodiments, as shown in FIG. 5RRR, the communication is an instant message associated with an instant messaging application, the initial local state of the user interface includes a reply input field 5146 configured to receive a reply message input, the current local state of the user interface includes the reply input field 5146 and first message input (e.g. "Sounds good, but") provided in the reply input field 5146 by a user, and starting the application in the modified state includes displaying the first message input in the user interface of the instant messaging application In some embodiments, the initial local state of the user interface refers to the initial appearance, setup, content, and/or component of the user interface in the notification, and the current local state of the user interface refers to the current/altered appearance, setup, content, and/or component of the user interface in the notification as a result of the user's interaction with the user interface of the notification. In another example, the user changes a displayed calendar view from a daily view to a weekly view in a notification for a calendar invitation.

FIG. 5SSS illustrates that while the device displays the current local state of the user interface of notification 5144, the device receives or detects a user input 5148 directed to the user interface of the notification 5144 (e.g., the user input is a swipe to the right across the notification or activation of a link to the full app in the user interface). In some embodiments, the device determines if user input 5148 satisfies one or more application-invocation criteria, and in accordance with a determination that it does, in response to receiving user input 5148, an application associated with notification 5144 is invoked. FIG. 5TTT illustrates user interface 5028 of the application (e.g., an instant messaging application) associated with notification 5144. FIG. 5TTT also illustrates starting the application in a modified state (e.g., with "Sounds good, but" in field 5146), different from a default initial state of the application, where the modified state is generated based on the current local state of the user interface of the notification. In some embodiments, the default initial state of the application for when the user invokes the application from the notification is based on the initial local state shown in the notification, rather than the current local state.

FIG. 5UUU illustrates another exemplary notification 5148 for a calendar invitation. In some embodiments, a notification 5148 associated with a calendar application displays a default initial view for a received communication (e.g., a long version notification for a calendar invitation displays a day-view with 0.5 hours before and 0.5 hours after the received invitation communication). FIG. 5VVV illustrates detection and receipt of a user input 5150 directed at notification 5148. In some embodiments, in response to detecting user input 5150, the device determines if user input 5150 satisfies one or more user interface modification criteria (e.g., detecting a downward swipe or drag or upward swipe or drag, a light press or scroll of a physical wheel). In response to determining that user input 5150 satisfies one or more user interface modification criteria, a change in the user interface of notification 5148 is displayed (e.g., the displayed calendar is scrolled down to reveal more events before the received calendar invitation). In some embodiments, the change in the user interface configuration is directly proportional to a detected component of user input 5150 (e.g., directly proportional to the distance moved by a drag gesture, or to detected pressure of a press gesture).

FIG. 5WWW illustrates detection of user input 5152 directed to notification 5148 after the user interface of notification 5148 has been re-configured (e.g., is in a current local state, different from an initial local state shown in FIG. 5UUU). In some embodiments, the device determines if user input 5152 satisfies one or more application invocation criteria (e.g., detecting a rightward swipe or drag or a deep press gesture). In response to determining that user input 5152 satisfies one or more application invocation criteria, and in response to receiving user input 5152, an application associated with notification 5148 is invoked. FIG. 5XXX illustrates user interface 5096 of the application (e.g., a calendar application) associated with notification 5148. FIG. 5XXX also illustrates starting the application in a modified state (e.g., with more events displayed before the received calendar invitation), different from a default initial state of the application (e.g., showing an equal time span before and after the received invitation), where the modified state is generated based on the current local state of the user interface of the notification. In some embodiments, the default initial state of the application for when the user invokes the application from the notification is based on the initial local state shown in the notification, rather than the current local state.

FIG. 5YYY illustrates display of notification 5148 while the device is in a locked state, overlaid on locked-state user interface 5000, for example. In some embodiments, user input 5152 is detected, directed to notification 5148. In response to determining that user input 5152 satisfies one or more application invocation criteria, and in response to receiving user input 5152, the device enters an authentication mode. In some embodiments, while the device is in an authentication mode, an authentication prompt 5154 is displayed, to request identity authentication information (e.g., a passcode or biometric date). In some embodiments, in response to successful receipt of identity authentication data, an application associated with notification 5148 is invoked. FIG. 5AAAA illustrates user interface 5096 of the application (e.g., a calendar application) associated with notification 5148.

5BBBB illustrates exemplary short version notifications, with various multimedia components. For example, notification 5156 illustrates an exemplary short version notification with an embedded image or thumbnail of a larger image. In some embodiments, a corresponding long version notification to notification 5156 includes a larger version of the embedded image. Short version notification 5158 illustrates an embedded video clip or gif. In some embodiments, a corresponding long version notification to notification 5158 includes a larger version of the embedded video or gif. Short version notification 5160 illustrates an embedded audio clip or portion of an audio clip. In some embodiments, a corresponding long version notification to notification 5160 includes a longer portion of the embedded audio clip, or the entire audio clip. Short version notification 5162 illustrates an embedded video clip, audio clip or gif, in an alternative portrayal. Short version notification 5164 illustrates an embedded profile image corresponding to a sender of a communication associated with notification 5164. In some embodiments, a corresponding long version notification to notification 5164 includes a larger version of the embedded profile picture.

FIG. 5CCCC illustrates exemplary treatment in long version notifications, for displaying large amounts of content (e.g., text or images). In some embodiments, as shown in notification 5166, the content is truncated when the entire notification reaches a predefined size (e.g., fills the display). In some embodiments, as shown by notification 5168, the content is displayed in a scrollable fashion. In some embodiments, as shown by notification 5170, the content is fully displayed and the entire notification is scrollable (e.g., the action items are initially displayed off-screen).

FIG. 5DDDD illustrates two exemplary notification formats for displaying action items. For example, in notification 5172, action items are displayed in a vertical stack, while in notification 5174, action items are displayed side-by-side in a single row. In some embodiments, the format for displaying action items depends on one or more criteria, such as the overall size of the notification, the number of action items, whether the notification is a long version or short version, and the amount of content in the notification.

FIG. 5EEEE illustrates three exemplary long version notifications, with various multimedia components. For example, notification 5176 illustrates an exemplary long version notification with an embedded image. Long version notification 5178 illustrates an embedded video clip or gif. Long version notification 5180 illustrates an embedded audio clip or portion of an audio clip.

FIG. 5FFFF-5HHHH illustrate an exemplary behavior of one or more notifications displayed while the device is in a locked state (as shown), or an unlocked state. FIG. 5FFFF illustrates three exemplary short version notifications 5182, 5184 and 5186. In FIG. 5FFFF, user input 5188 is detected, directed to notification 5184, and in response to detecting user input 5188, long version notification 5190 is displayed, as shown in FIG. 5GGGG. FIG. 5GGGG illustrates detection of user input 5192 directed to anywhere on the display outside of long version notification 5190 (e.g., another location on user interface 5000). FIG. 5HHHH illustrates an exemplary response to detecting user input 5192 outside of notification 5190, where a listing of short version notifications (e.g., notification 5182 and notification 5186) is shown again, but the short version notification corresponding to the recently-displayed long version notification (e.g., short version notification 5184) is not displayed again.

In some embodiments, a notification (e.g., either a short version or long version notification), operates as a stand-alone application residing in memory of the device, distinct from an associated application also residing in the memory of the device. For example, a notification corresponding to a social networking application operates as a single-purpose or streamlined application, but is associated with the full-featured social networking application. In this example, the notification application operated independently of the social networking application, and in a scenario where the social networking application is not running, the notification application continues to operate.

In some embodiments, a notification operates as an extension or component of an associated application on the device. For example, a notification for a calendar application is a single feature or operational component of the full-featured calendar application. In this example, if the calendar application is not running, the calendar notification component does not operate either.

In some embodiments, a notification application or extension has a dedicated memory portion for temporary storage of information. In some embodiments, this memory portion can be accessed by the corresponding full-featured application. For example, a notification for an instant messaging application has a memory portion for temporary storage of partially written reply messages. In this example, if the user opens the corresponding application in the middle of writing a reply message, the contents of the reply message are retrieved from the temporary storage location and used by the full-featured application to allow the user to complete his reply message.

FIGS. 6A-6D illustrate a flow diagram of a method 600 of coalescing notifications in accordance with some embodiments. The method 600 is performed at an electronic device (e.g., device 300, FIG. 3, or portable multifunction device 100, FIG. 1A) with a display, and a touch-sensitive surface. In some embodiments, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

As described below, the method 600 provides an intuitive way to coalesce notifications. The method reduces the number, extent, and/or nature of the inputs from a user when viewing multiple notifications on a display, thereby creating a more efficient human-machine interface. For battery-operated electronic devices, enabling a user to view multiple notifications on a display faster and more efficiently conserves power and increases the time between battery charges.

The device receives (602) a first communication at the device while the device is in a locked state. In response to receiving the first communication at the device while the device is in the locked state, the device generates (604), for display on a lock screen, a first notification for the first communication received at the device, wherein the first notification includes content of the first communication. For example, as shown in FIG. 5A, notification 5002 is generated and displayed on lock state user interface 5000, in response to receiving a first communication (e.g., an instant message from Gregg).

The device receives (606) a second communication at the device while it is in the locked state. In response to receiving the second communication at the device while the device is in the locked state, the device determines (608) whether the second communication and the first communication are received from the same sender. In some embodiments, the device compares the first communication to the second communication on additional factors, such as any associated application with a communication, duration of time between the communications and/or embedded data within a communication.

In accordance with a determination that the second communication and the first communication are from the same sender, the device updates (610) the first notification for display on the lock screen such that the updated first notification concurrently includes the content of the first communication and content of the second communication. For example, as shown in FIG. 5B, the first communication and the second communication are from Gregg, therefore the device updates notification 5002 to concurrently include the content of the first communication (e.g., "I'm free after 7 pm!") and the content of the second communication (e.g., "How about you?").

In some embodiments, the first communication and the second communication are (612) instant messages, as shown in the examples portrayed in FIG. 5B and FIG. 5D. In some embodiments, the instant messages are messages sent via a telephony SMS platform. In some embodiments, the instant messages are messages sent via an application-based instant message platform, such as WeChat, QQ, Whatsapp, etc. In some embodiments, the instant messages include posts on a social networking website for which the user has subscribed instant update notifications. In some embodiments, the instant messages include text only. In some embodiments, the instant messages include rich media, such as images, video, hyperlinks, sound, etc.

In some embodiments, in accordance with the determination that the second communication and the first communication are from the same sender, the updated first notification sequentially includes (614) a message body from the first communication and a message body from the second communication. For example, as shown in FIG. 5B, the updated first notification includes message text from the first instant message followed immediately by message text from the second instant message without any visual divider in between, and the message text is listed under the same sender in the same notification bubble.

In some embodiments, the first notification displays a timestamp with a receipt time of the first communication, and updating the first notification for display on the lock screen includes updating (616) the timestamp to display a receipt time of the second communication. For example, as shown in FIGS. 5A and 5B, notification 5002 has a timestamp in the top right corner. In FIG. 5A, the timestamp reads Fri 6:30 PM, corresponding to the time the first communication was received at the device. In FIG. 5B, the timestamp reads Fri 6:32 PM, corresponding to the time the second communication was received at the device.

In response to receiving the second communication at the device while the device is in the locked state, and in accordance with a determination that the second communication and the first communication are not from the same sender, the device generates (618) a second notification, distinct from the first notification, for concurrent display on the lock screen with the first notification. For example, as shown in FIG. 5D, a second communication is received from a sender named Suzi, and the second communication corresponds to notification 5004, a second and distinct notification from notification 5002.

In some embodiments, in response to receiving the second communication at the device while the device is in the locked state, the device displays (620) the updated first notification or concurrently displays the first and second notifications in accordance with whether the second communication and the first communication are received from the same sender. FIGS. 5B and 5D illustrate displayed notifications from one or more senders.

In some embodiments, after receiving the second communication, the device receives (622) a user input to activate the device from a dormant state and, in response to receiving the user input to activate the device from the dormant state, the device displays the updated first notification or concurrently displays the first and second notifications in accordance with whether the second communication and the first communication are received from the same sender. For example, the device is in a state where the display is turned off and a button press on the device is detected. In response to detecting the button press, the display is turned on and the device displays either the updated notification 5002 as shown in FIG. 5B, or notification 5002 and 5004 as shown in FIG. 5D.

In some embodiments, the notification(s) are displayed once when the second communication is first received at the device. In some embodiments, the notification(s) are displayed again when the device is activated from a dormant state (e.g., when the display is woken up from a deactivated state in response to manual activation input). In some embodiments, the notification(s) are displayed again when the device is activated from a dormant state for other reasons, such as in response to the arrival of a new notification, or the update of an existing notification on the lock screen due to arrival of a new communication from the same sender).

In some embodiments, while the device is in the locked state, the device receives (624) an input directed to the updated first notification and in response to receiving the input directed to the updated first notification while the device is in the locked state, it generates a third notification, for concurrent display on the lock screen with the first notification. For example, as shown in FIG. 5J, user input 5018 directed to notification 5016 is detected, and in response, notification 5016 ceases to be displayed and is replaced with notification 5020 and notification 5022. In this example, it can also be said that notification 5016 is updated to only include content from the first communication.

In some embodiments, the input directed to the updated first notification is a selection input (e.g., a tap input or a downward swipe) that would normally open a long version of the notification if the notification is for a single communication. In this example, where the updated first notification is a notification for multiple communications, the selection input simply separates the coalesced notification (e.g., the updated first notification) into multiple separate short version notifications, one for each of the communications. If the user wishes to invoke the long version of one of the multiple separate short version notifications, the user may repeat the selection input on the short version notification of his/her interest. In some embodiments, a different input is used to open a long version of a notification (e.g., a downward swipe) from the input used to un-coalesce a coalesced notification (e.g., a tap), however, it is sometimes advantageous to use the same input for both purposes because it is not immediately apparent to the user whether a notification is a coalesced notification for multiple communications from the same sender or a notification for a single communication that is relatively long or has multiple line breaks.

In some embodiments, while the device is in the locked state, the device receives (626) an input directed to the updated first notification and, in response to receiving the input directed to the updated first notification while the device is in the locked state, the device generates, for display on the lock screen, an alternative version of the updated first notification. For example, as shown in FIG. 5F, user input 5008 directed to notification 5006 is detected while the device is in a locked state, and an alternative version of notification 5006 is shown in either FIG. 5G or FIG. 5H. In these embodiments, the alternative version of the updated first notification includes a first set of action controls for content in the updated first notification that corresponds to the first communication, and a second set of action controls for content in the updated first notification that corresponds to the second communication, distinct from the first set of action controls for content in the updated first notification that corresponds to the first communication. For example, FIG. 5G and FIG. 5H illustrate a first set of action controls 5010-a and 5012-a (e.g., a reply button and a delete button) for the first received communication (e.g., with content 5014-a), and a second set of action controls 5010-b and 5012-b (e.g., a reply button and a delete button) for the second received communication (e.g., with content 5014-b).

In some embodiments, different types of user input directed to a notification displayed on the lock screen will cause different outcomes. Sometimes, the same user input may produce different outcomes in different embodiments. For example, in some embodiments, a tap on the notification may cause a long version of the notification to be opened up. Alternatively, the tap input may cause an application associated with the communication to open up. In some embodiments, a swipe input may cause the notification to be removed from the lock screen. In some embodiments, a swipe in different directions may cause the notification to be disposed of in different manners (e.g., saved in the notification center for later review, permanently deleted from the device, replaced by a longer-version of the notification, or replaced by an application associated with the notification). In some embodiments, when a user input is directed to a notification containing two or more communications from the same sender, the response of the user input may be slightly different from the response of the user input if the notification contains only a single communication. In some embodiments, when a user input is directed to a notification containing two or more communications from the same sender, the response of the user input (e.g., expanding the single short version coalesced notification into multiple long version notifications) may be different and may not be achievable by providing two or more user inputs of the same type on two or more separate notifications displayed on the lock screen.

In some embodiments, the input directed to the updated first notification includes a selection input selecting the updated notification (e.g., the selection input can be a tap on the updated first notification). In some embodiments, the same selection input on a displayed notification would cause a long version of the displayed notification to appear if the displayed notification were a notification for a single communication rather than a coalesced notification for multiple communications from the same sender. When the same selection input is directed to a coalesced notification (e.g., the updated first notification) for multiple communications from the same sender, the selection input causes the coalesced notification to un-coalesce into separate notifications, one for each of the communications. In some embodiments, instead of causing a single long version of the selected notification to appear, the selection input causes an alternative version of the updated first notification to appear, where the alternative version of the updated first notification includes two short version notifications, one for each of the two communications. In some embodiments, the alternative version of the updated first notification includes the long version of the notification for the first communication and the long version of the notification for the second communication presented separately, as if the user had opened the long versions of two separate notifications using the same selection input.

In some embodiments, when the user enters an input to remove the updated first notification from the lock screen (e.g., sending the updated first notification to the notification center for later review), the notifications stored in the notification center are optionally separate notifications, each for a respective communication (e.g., the first communication and the second communication). In some embodiments, if the notifications for the first and the second communications are to be stored as separate notifications in the notification center, the updated notification showing the content of both communications is optionally shown as two separate notifications (e.g., a short version notification for each communication) briefly before the two separate notifications are removed from the display and stored in the notification center.

In some embodiments, the first set of action controls and the second set of action controls are different instances of the same set of control types. In some embodiments, the first set of action controls and the second set of action controls may be of different sets of control types selected based on the communication content types and/or other relevant factors (e.g., message length). For example, if the first communication is a text message and the second communication is an audio message, the first set of action controls may include a text input box and a send button, while the second set of action controls may include a play button, a record button, and a send button. In another example, if the second communication is much longer than the first communication, the second set of action controls may include a scroll bar for revealing additional message content not shown in the coalesced notification.

In some embodiments, the device receives (628) an input directed to the updated first notification, and in response to receiving the input directed to the updated first notification, the device activates an application associated with the first and second communications. In some embodiments, the application displays the first communication and the second communication in context with a previous communication session with the same user. For example, as shown in FIG. 5M, user input 5026 directed at updated notification 5024, is detected. In response to detecting user input 5026, an instant messaging application is launched, and a user interface 5028 is displayed for the launched messaging application, as shown in FIG. 5N. In FIG. 5N, the first and second communications are displayed in context with two previous communications (e.g., instant messages), in the same communication session (e.g., conversation) with the same user, Gregg.

In some embodiments, the input directed to the updated first notification is a swipe to the right. In some embodiments, the same input directed to a notification for a single communication would activate the application associated with the single communication and display the communication in context with a previous communication session with the same sender (if such a previous communication session exists). Here, the swipe to the right causes the first communication and the second communication to be displayed as separate communications in the application interface in context with a previous communication session with the same sender. In some embodiments, the first communication and the second communication would appear as separate communications (e.g., with different message bubbles and timestamps) in the application interface, even though they have appeared to be no different than a single communication with merged content from the first and second communications when presented in the updated first notification.

In some embodiments, the device receives (630) a dismissal input directed to the updated first notification, and in response to receiving the dismissal input directed to the updated first notification, updates respective read/unread statuses of the first communication and the second communication in accordance with the dismissal input. For example, as shown in FIG. 5OO, user input 5100 directed at notification 5098 is detected, to dismiss the notification. In response to detecting user input 5100, notification 5098 is removed from display on lock state user interface 5000, as shown in FIG. 5PP, and a read/unread status corresponding to notification 5098 is set to read.

In some embodiments, a dismissal input is an input that causes removal of the notification from the lock screen without a replacement item (e.g., without a long version of the notification or an application interface associated with the notification) taking its place on the screen. In some embodiments, when a notification is removed from the lock screen, it may be stored in a notification center for later review, or it may be permanently deleted from the device. In some embodiments, the dismissal input is a swipe in a predetermined direction (e.g., upward) associated with the notification center, and the dismissal input causes the notification to be stored in the notification center for later review. In some embodiments, the dismissal input is a swipe in another predetermined direction (e.g., leftward), and the dismissal input causes the notification to be permanently deleted from the device.

In some embodiments, when the dismissal input is directed to a coalesced notification, the read/unread status of all of the communications represented in the coalesced notification are updated to "read" and the associated notification(s) are optionally deleted from the device. In some embodiments, when the dismissal input is directed to a coalesced notification, the read/unread status of all of the communications represented in the coalesced notification remain as "unread" and the associated notification(s) are optionally stored in the notification center for later review. In some embodiments, whether the read/unread statuses of the communications are updated or not depend on the type of swipe gesture that was used to dismiss the coalesced notification from the screen.

In some embodiments, at a first time after receiving the first communication and prior to receiving the second communication, the device displays (632) the first notification and a third notification in accordance with a first display order, and at a second time after receiving the second communication, displays the updated first notification and the third notification in accordance with a second display order that is different from the first display order, wherein the second display order is generated based on the updated timestamp in the updated first notification. For example, in the first display order, the third notification is displayed above the first notification because the third notification was received more recently than the first notification. And, in the second display order, the third notification is displayed below the updated first notification because the third notification was received after the second communication, whose content is now included in the updated first notification. For example, as shown in FIG. 5P and FIG. 5Q, notifications 5032 and 5034 are reordered on the basis of their respective timestamps. The timestamp for notification 5032 is updated in response to receiving the second communication (e.g., at 6:35 PM).

In some embodiments, after receiving the first communication and before receiving the second communication, the device displays (634) the first notification on the lock screen, wherein the first notification includes content in the first communication, and while displaying the first notification on the lock screen and before receiving the second communication, and receives information (e.g., a live status report or other signal) that indicates a sender of the first communication is preparing another communication (e.g., the second communication). In response to receiving the information that indicates the sender of the first communication is preparing another communication, the device updates the displayed first notification on the lock screen to concurrently display content in the first communication, and a communication-preparation indicator that indicates preparation of another communication by the sender of the first communication. For example, in FIG. 5S, a communication-preparation indicator 5038, is displayed in notification 5036 (e.g., under the content of the first communication), to indicate that the sender of the first communication is preparing another communication (e.g., another message). In some embodiments, the communication-preparation indicator is a blinking ellipsis in a text bubble.

In some embodiments, the second communication is received while the first notification concurrently displays content in the first communication and the communication-preparation indicator on the lock screen, and in accordance with the determination that the second communication and the first communication are from the same sender, the device updates (636) the displayed first notification on the lock screen to concurrently display content in the first communication and content in the second communication, and ceases to display the communication-preparation indicator. In some embodiments, the content in the second communication replaces the communication-preparation indicator. For example, FIG. 5T illustrates receipt of a second communication, and updating notification 5036 to display the content of the second communication and cease to display the communication-preparation indicator 5038.

Figure 7:
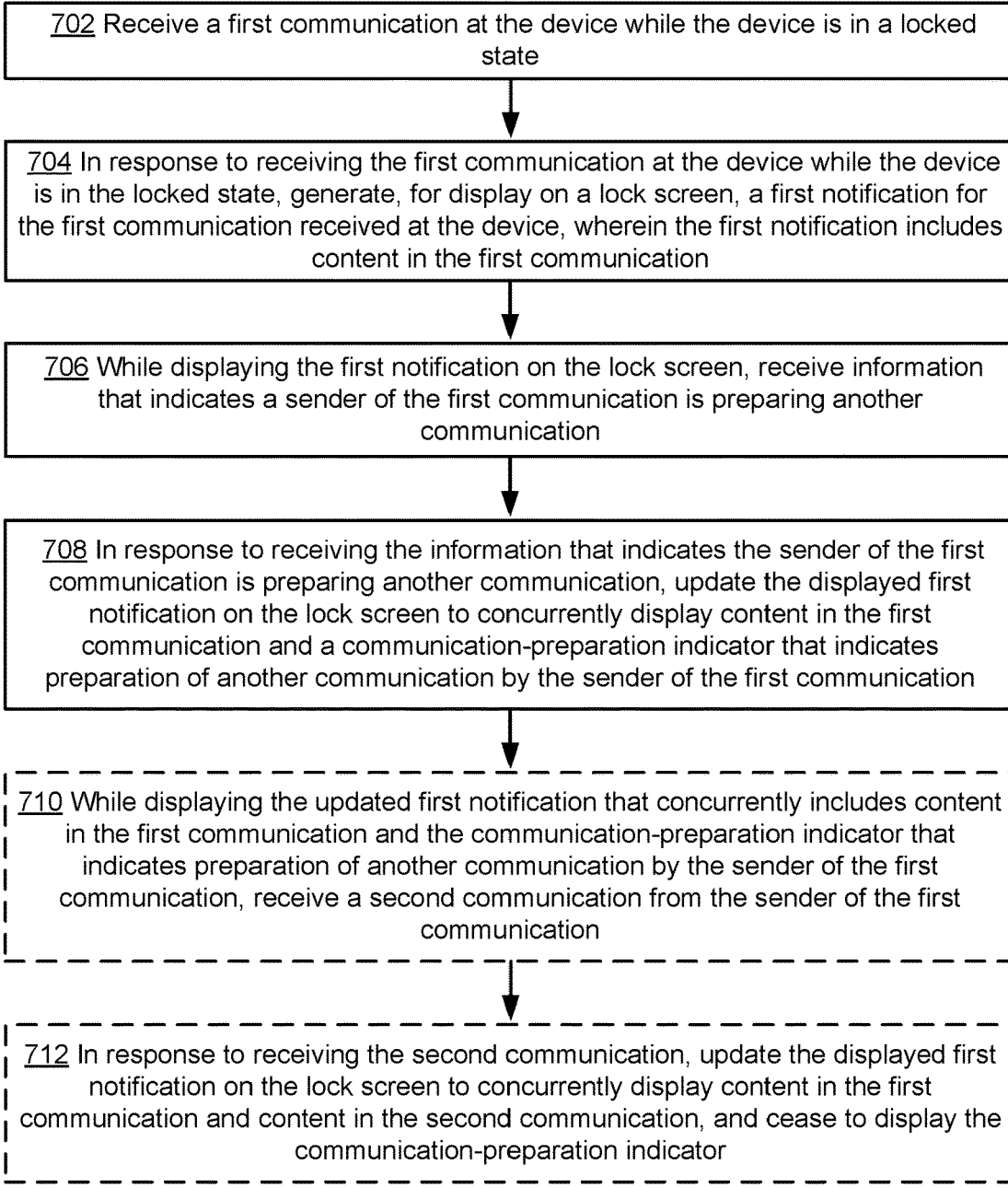
FIG. 7 is a flow diagram illustrating a method of coalescing notifications in accordance with some embodiments.

FIG. 7 illustrates a flow diagram of a method 700 of coalescing notifications in accordance with some embodiments. The method 700 is performed at an electronic device (e.g., device 300, FIG. 3, or portable multifunction device 100, FIG. 1A) with a display, and a touch-sensitive surface. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, the method 700 also provides an intuitive way to coalesce notifications. The method reduces the number, extent, and/or nature of the inputs from a user when viewing multiple notifications on a display, thereby creating a more efficient human-machine interface. For battery-operated electronic devices, enabling a user to view multiple notifications on a display faster and more efficiently conserves power and increases the time between battery charges.

The device receives (702) a first communication at the device while the device is in a locked state. In response to receiving the first communication at the device while the device is in the locked state, the device generates (704), for display on a lock screen, a first notification for the first communication received at the device, wherein the first notification includes content in the first communication. For example, FIG. 5R illustrates display of notification 5036, in accordance with a first received communication. While displaying the first notification on the lock screen, the device receives (706) information that indicates a sender of the first communication is preparing another communication. In response to receiving the information that indicates the sender of the first communication is preparing another communication, the device updates (708) the displayed first notification on the lock screen to concurrently display content in the first communication and a communication-preparation indicator that indicates preparation of another communication by the sender of the first communication. For example, in FIG. 5S, a communication-preparation indicator 5038, is displayed in notification 5036 (e.g., under the content of the first communication), to indicate that the sender of the first communication is preparing another communication (e.g., another message).

In some embodiments, while displaying the updated first notification that concurrently includes content in the first communication and the communication-preparation indicator that indicates preparation of another communication by the sender of the first communication, the device receives (710) a second communication from the sender of the first communication. In some embodiments, in response to receiving the second communication, the device updates (712) the displayed first notification on the lock screen to concurrently display content in the first communication and content in the second communication, and cease to display the communication-preparation indicator. For example, FIG. 5T illustrates receipt of a second communication, and updating notification 5036 to display the content of the second communication and cease to display the communication-preparation indicator 5038.

Although the notifications described with respect to method 600 and method 700 are displayed on a lock screen in the above examples, in some embodiments, the same type of coalesced notifications can be displayed on a regular unlocked screen as well. For example, when the notification for the first communication is displayed on an unlocked screen, if a second communication from the same sender is received before the notification for the first communication is removed from the unlocked screen (e.g., before the notification is automatically faded away or translated off screen after a timeout period), the notification of the first communication can be updated to include the content of the second communication as well (and the timeout period for removing the notification can be reset).

It should be understood that the particular order in which the operations in FIGS. 6A-6D and 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, 1100, 1200 and 1300) are also applicable in an analogous manner to methods 600 and 700 described above with respect to FIGS. 6A-6D and 7. For example, the notifications, communications, communication-preparation indicators, user inputs and user interfaces described above with reference to methods 600 and 700 optionally have one or more of the characteristics of the notifications, communications, communication-preparation indicators, user inputs and user interfaces described herein with reference to other methods described herein (e.g., methods 800, 900, 1000, 1100, 1200 and 1300). For brevity, these details are not repeated here.

Figure 8A:
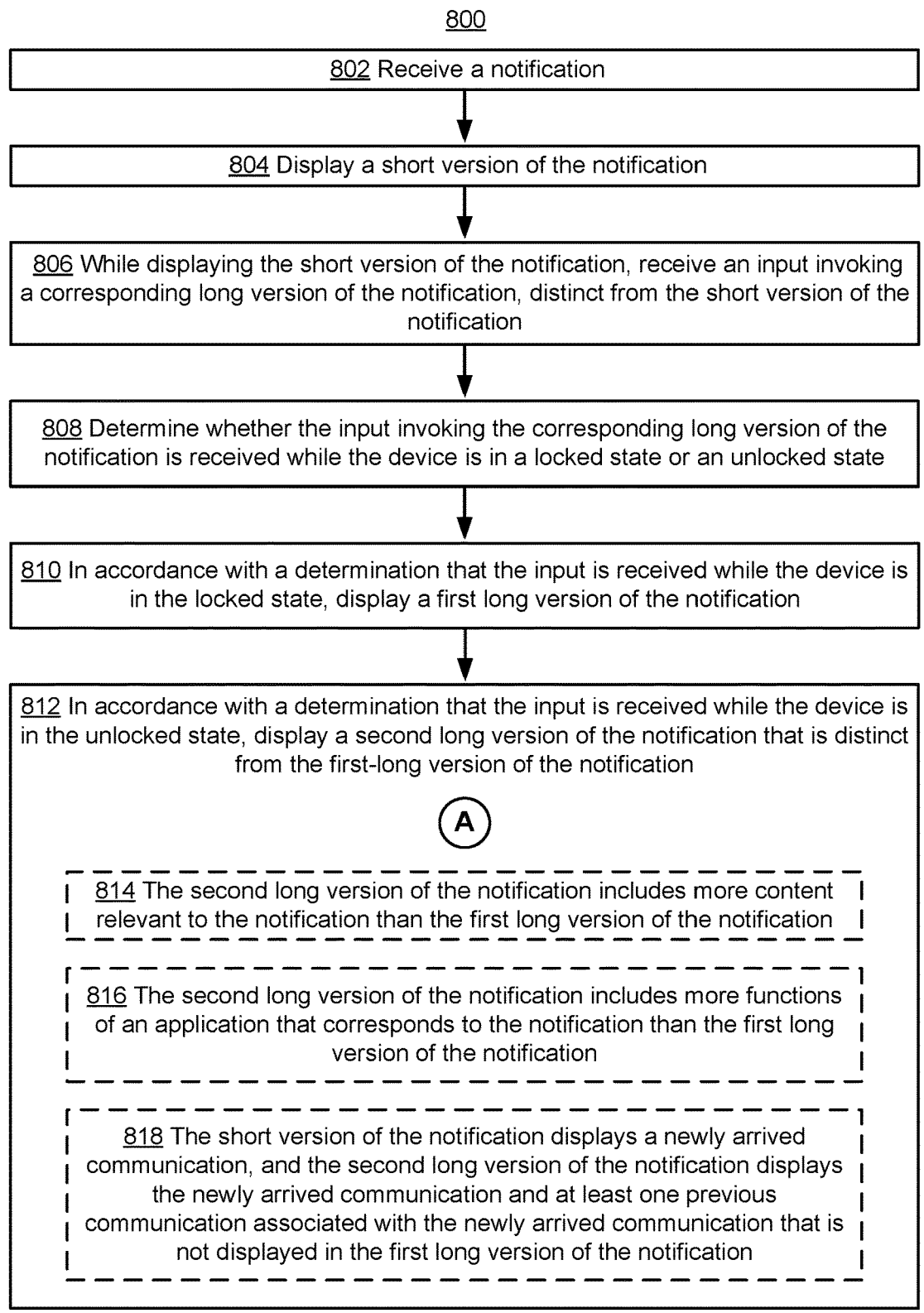

FIGS. 8A-8B illustrate a flow diagram of a method 800 of displaying notifications of varying lengths in accordance with some embodiments. The method 800 is performed at an electronic device (e.g., device 300, FIG. 3, or portable multifunction device 100, FIG. 1A) with a display, and a touch-sensitive surface. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, the method 800 provides an intuitive way to display and interact with notifications of varying lengths. The method reduces the number, extent, and/or nature of the inputs from a user when viewing notifications, thereby creating a more efficient human-machine interface. For battery-operated electronic devices, enabling a user to view notifications faster and more efficiently conserves power and increases the time between battery charges.

The device receives (802) a notification. In some embodiments, a notification is a data object that is issued by an application (or a server associated with the application) for display outside of the normal user interface of the application by the operating system (or a notification management module of the operating system). The notification may include data retrieved from a data store that is accessible by both the notification and the application associated with the notification. In some embodiments, a notification may include programmable components (e.g., widgets or extensions) that dynamically load or generate data for display on the device. In some embodiments, a notification received from an application (or a server associated with the application) includes data for generating both a short, more abbreviated displayable version and a long, more complex displayable version of the notification for display on the device.

FIGS. 5U-5LL include many examples of corresponding short versions and long versions of different types of notifications. In some embodiments, the short version of a notification and the long version of the notification are two distinct displayable objects, rather than a resizable or expandable object that has been resized or expanded from a smaller size or a larger size. Even though in some embodiments, an animation may be played to smooth out the transition between the display of the short version and the long version of the notification, the two versions of the notifications are distinct user interface objects. In some embodiments, the short version and the long version of the notification are two distinct displayable states associated with the same displayable object, with discrete, unidirectional (from short to long) transition between the states. Furthermore, the long version of the notification is also distinct from a user interface of an application associated with the notification. Specifically, the long version and the short version of the notification exist outside of the application, and can provide user interaction and data input and output functions while the application is completely dormant or inactive.

In some embodiments, the notification is hosted by and directly communicates with the operating system rather than the application while the application is dormant or inactive. In addition, the notification (both the long version and the short version) only provide a subset of the functionalities and data available in the full application. In general, the short version of the notification is presented first, and the long version and the application interface can be invoked by the user by interacting with the short version of the notification. Typically, the user can also invoke the application interface by interacting with the long version of the notification after the long version of the notification has been presented (e.g., through prior user interaction with the short version of the notification). Typically, the user cannot revert back to the short version of the notification through interaction with the long version of the notification or the application interface. Similarly, the user cannot revert back to the long version of the notification through interaction with the application interface.

The device displays (804) a short version of the notification. For example, the short version of the notification for an instant message includes the message body, and optionally, a reply button. In another example, the short version of the notification for a calendar invitation includes the invitation (e.g., the subject, organizer, and event time). FIG. 5U illustrates an exemplary short version notification 5040 corresponding to an instant messaging application.

While displaying the short version of the notification, the device receives (806) an input invoking a corresponding long version of the notification, distinct from the short version of the notification. In some embodiments, the corresponding long version is displayed in response to receiving the input. In some embodiments, the input invoking the corresponding long version of the notification is a downward swipe directed to the short version of the notification. In some embodiments, the input invoking the corresponding long version of the notification is a tap directed to the short version of the notification. In some embodiments, two distinct input types (e.g., a downward swipe versus a tap or rightward swipe) are used to invoke the corresponding long version of the notification or to invoke an application associated with the notification. FIG. 5U illustrates detection of user input 5042 directed to short version notification 5040.

The device determines (808) whether the input invoking the corresponding long version of the notification is received while the device is in a locked state or an unlocked state, and in accordance with a determination that the input is received while the device is in the locked state, the device displays (810) a first long version of the notification (e.g., the long version 5042 of the notification shown in FIG. 5V). In accordance with a determination that the input is received while the device is in the unlocked state, the device displays (812) a second long version of the notification that is distinct from the first-long version of the notification (e.g., the long version 5050 of the notification shown in FIG. 5X).

In some embodiments, the second long version of the notification includes (814) more content relevant to the notification than the first long version of the notification (e.g., long version notification 5050 in FIG. 5X includes more content than long version 5044 in FIG. 5V). In some embodiments, the content relevant to the notification includes data that is previously stored by an application associated with the notification (e.g., in a data store accessible by both the application and the notification) and that is relevant to the notification. The content relevant to the notification can help the user better understand or assess the notification and determine a suitable action without activating the application associated with the notification.

In some embodiments, some of the content relevant to the notification is more sensitive (e.g., more private) than others. Therefore, if the long version of the notification is invoked when the device is in a locked state (e.g., when the user input is received from the lock screen), only the less sensitive content is provided in the long version of the notification along with the original content shown in the short version of the notification. In contrast, if the long version of the notification is invoked when the device is in an unlocked state (e.g., when the user input is received from the unlocked screen), all relevant content regardless of sensitivity may be provided in the long version of the notification along with the original content shown in the short version of the notification. In some embodiments, the device allows the user to use the application's settings to establish which types of information may be shown as the additional relevant content in a notification on a locked screen and an unlocked screen, and which additional types of information may be shown as the additional relevant content for the notification only on an unlocked screen. In some embodiments, some of the content relevant to the notification may be retrieved from third-party sources (e.g., from the Internet, the operating system, and/or other applications not associated with the notification).

In some embodiments, the second long version of the notification includes (816) more functions of an application that corresponds to the notification than the first long version of the notification (e.g., long version notification 5050 in FIG. 5X includes more functionality than long version 5044 in FIG. 5V). In some embodiments, some functions of an application that corresponds to a notification are more restricted than others. For example, a camera function may be available regardless of whether the device is in a locked state or an unlocked state, while a GPS location function and a voice recording function may be available only when the device is in an unlocked state. Sometimes, a data entry function is available when the device is in a locked state, while a data deletion or data modification function is only available when the device is in an unlocked state. Similarly, in some embodiments, the long version notification generated for display while the device is in the locked state includes a more restricted set of functions than the long version notification generated for display while the device is in an unlocked state.

In some embodiments, the short version of the notification displays (818) a newly arrived communication (e.g., an instant message), and the second long version of the notification displays the newly arrived communication (e.g., the instant message) and at least one previous communication associated with the newly arrived communication (e.g., a previous instant message from the same sender) that is not displayed in the first long version of the notification (e.g., long version notification 5050 in FIG. 5X includes two additional communications in the same instant messaging conversation than long version 5044 in FIG. 5V).

In some embodiments, the short version of the notification displays (820) a calendar invitation, and the second long version of the notification displays at least one previously scheduled event relevant to the calendar invitation that is not displayed in the first long version of the notification (e.g., long version notification 5076 in FIG. 5FF includes an additional scheduled event than long version 5070 in FIG. 5DD). In some embodiments, the first long version of the notification includes a portion of the calendar which shows a predefined time window (e.g., from one hour before to one hour after the event in the calendar invitation), and the second long version of the notification includes a larger portion of the calendar (e.g., shows the whole day) of the date for the event in the calendar invitation. As a result, the user can see more previously scheduled events near the event in the calendar invitation (e.g., as can be seen by long version notification 5076 in FIG. 5FF).

In some embodiments, the short version of the notification displays (822) a calendar invitation, and the second long version of the notification displays at least one portion of a calendar that is not displayed in the first long version of the notification. For example, in some embodiments, the first long version of the notification includes a portion of the calendar showing the whole day of the date for the event in the calendar invitation in a day view that is not browsable or scrollable (e.g., a static view). In this example, the second long version of the notification includes a portion of the calendar that shows the whole week including the date of the event in the calendar invitation in a week view that is browsable (e.g., into adjacent weeks or down into particular days in the displayed week).

In some embodiments, the second long version of the notification includes (824) at least one user interface control not available in the first long version of the notification (e.g., long version notification 5076 in FIG. 5FF provides a dismiss affordance 5078 to dismiss the notification, while long version notification 5070 in FIG. 5DD does not). For example, in some embodiments, if the short version of the notification displays a voice message, the first long version of the notification includes a message playback button and a text input box for replying with a text message, and the second long version of the notification includes a message playback button, a text input box for replying with a text message, as well as a recording button for recording an audio reply message.

In some embodiments, while displaying either the first long version of the notification or the second long version of the notification, the device receives (826) a second input invoking an application that corresponds to the notification, and in response to receiving the input invoking the application that corresponds to the notification, the device displays a user interface of the application, where the user interface of the application provides more content than the first long version of the notification and the user interface of the application provides more content than the second long version of the notification. For example, as shown in FIG. 5GG-5II, in response to detecting user input 5082 directed to notification 5080, or user input 5086 directed to notification 5084, a corresponding instant messaging application is launched.

In some embodiments, while displaying either the first long version of the notification or the second long version of the notification, the device receives (828) a second input invoking an application that corresponds to the notification, and in response to receiving the input invoking the application that corresponds to the notification, the device displays a user interface of the application, where the user interface of the application provides more functions than the first long version of the notification and the user interface of the application provides more functions than the second long version of the notification (e.g., user interface 5028 of the instant messaging application shown in FIG. 5II provides user interface objects to allow a user to view other messaging conversations, or details about the current conversation).

It should be understood that the particular order in which the operations in FIGS. 8A-8B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 900, 1000, 1100, 1200 and 1300) are also applicable in an analogous manner to method 700 described above with respect to FIGS. 8A-8B. For example, the notifications, communications, communication-preparation indicators, user inputs and user interfaces described above with reference to method 800 optionally have one or more of the characteristics of the notifications, communications, communication-preparation indicators, user inputs and user interfaces described herein with reference to other methods described herein (e.g., methods 600, 700, 900, 1000, 1100, 1200 and 1300). For brevity, these details are not repeated here.

Figure 9A:
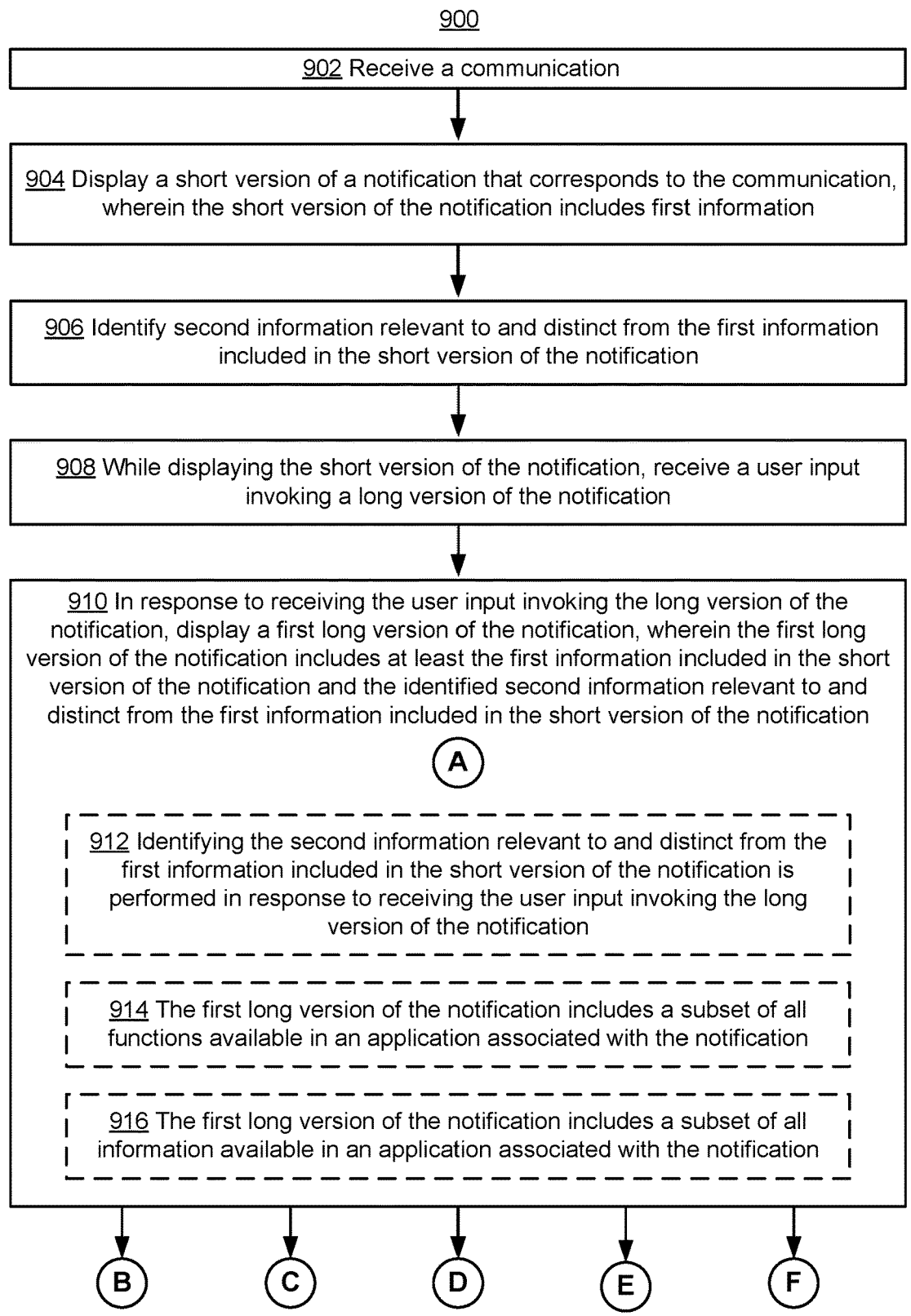
FIGS. 9A-9B are flow diagrams illustrating a method of retrieving information associated with notifications in accordance with some embodiments.
Figure 9B:
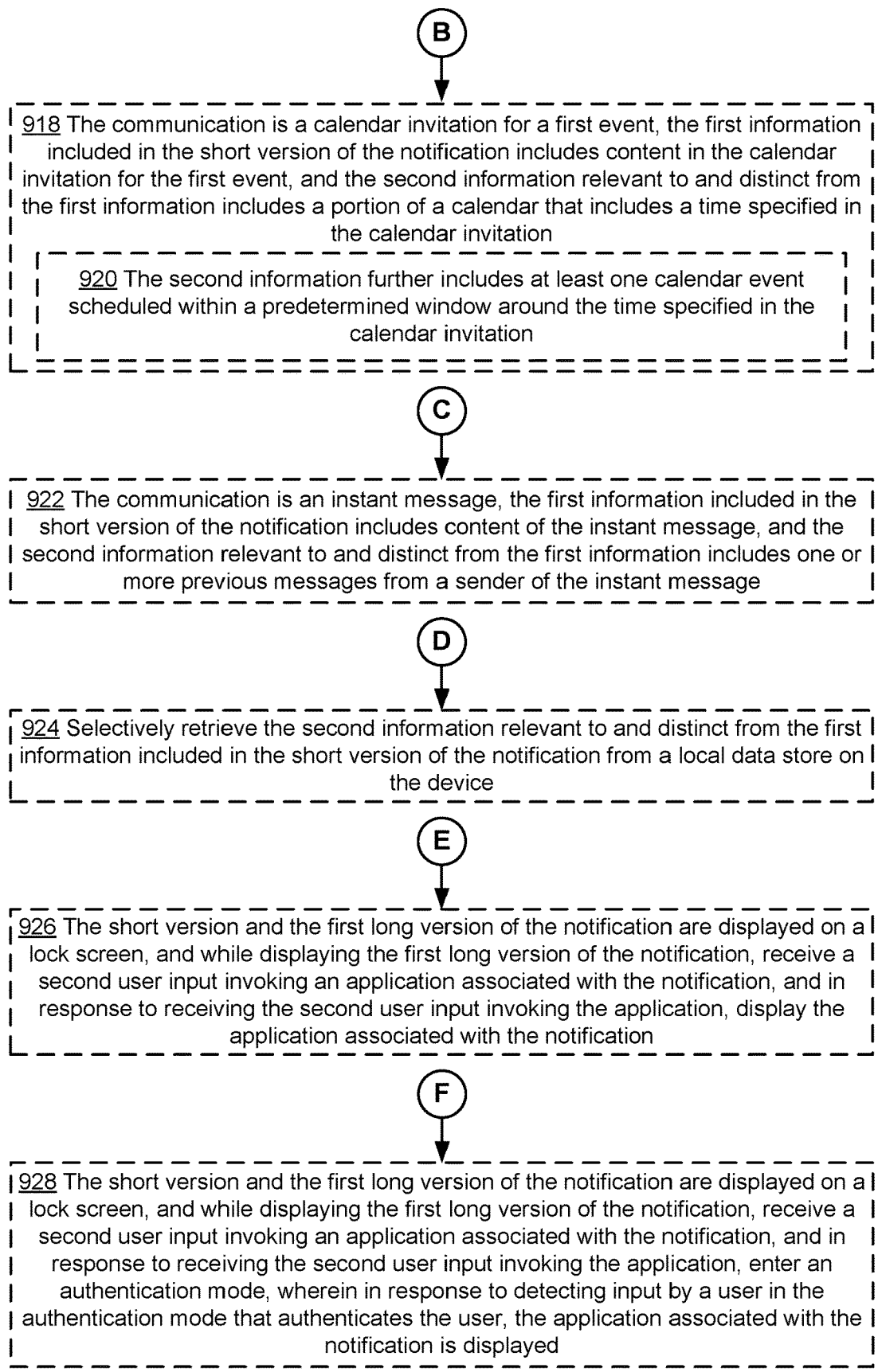

FIGS. 9A-9B illustrate a flow diagram of a method 900 of retrieving information associated with notifications in accordance with some embodiments. The method 900 is performed at an electronic device (e.g., device 300, FIG. 3, or portable multifunction device 100, FIG. 1A) with a display, and a touch-sensitive surface. In some embodiments, the display is a touch-screen display and the touch-sensitive surface is on or integrated with the display. In some embodiments, the display is separate from the touch-sensitive surface. Some operations in method 900 are, optionally, combined and/or the order of some operations is, optionally, changed.

As described below, the method 900 provides an intuitive way to retrieve information associated with notifications. The method reduces the number, extent, and/or nature of the inputs from a user when viewing relevant information associated with notifications on a display, thereby creating a more efficient human-machine interface. For battery-operated electronic devices, enabling a user to view relevant information associated with notifications on a display faster and more efficiently conserves power and increases the time between battery charges.

The device receives (902) a communication, and displays (904) a short version of a notification that corresponds to the communication, where the short version of the notification includes first information. For example, as shown in FIG. 5CC, short version notification 5066 is displayed, corresponding to a received communication (e.g., a calendar invitation).

The device identifies (906) second information relevant to and distinct from the first information included in the short version of the notification; (e.g., the second information is information that provides context for the first information). While displaying the short version of the notification, the device receives (908) a user input invoking a long version of the notification. For example, as shown in FIG. 5CC, user input 5068 is detected, directed to short version notification 5066.

In response to receiving the user input invoking the long version of the notification, the device displays (910) a first long version of the notification, wherein the first long version of the notification includes at least the first information included in the short version of the notification and the identified second information relevant to and distinct from the first information included in the short version of the notification. FIG. 5DD illustrates an exemplary response to detecting or receiving user input 5068 in FIG. 5CC, invoking a first long version notification 5070. In FIG. 5DD, exemplary long version notification 5070 includes the information in short version notification 5066, in FIG. 5CC (e.g., the time, date, location and title of the meeting request).

In some embodiments, identifying the second information relevant to and distinct from the first information included in the short version of the notification is performed (912) in response to receiving the user input invoking the long version of the notification. For example, in response to detecting user input 5068 in FIG. 5CC, second information (e.g., additional calendar context information), is identified.

In some embodiments, the first long version of the notification includes (914) a subset of all functions available in an application associated with the notification. In some embodiments, the first long version of the notification includes (916) a subset of all information available in an application associated with the notification. For example, as shown in FIGS. 5GG and 5II, first long version notification 5080 includes a subset of all functions and information available in the application associated with the notification, represented by user interface 5028 in FIG. 5II (e.g., displaying affordances to view other message conversations, and displaying additional messages in the current conversation).

In some embodiments, the communication is (918) a calendar invitation for a first event, the first information included in the short version of the notification includes content in the calendar invitation for the first event, and the second information relevant to and distinct from the first information includes a portion of a calendar that includes a time specified in the calendar invitation. For example, the portion of the calendar may display the hours or days around the time or date of the event in the calendar invitation. In some embodiments, the second information may also specify whether there is any event scheduled in that portion of the calendar (e.g., the schedule events are shown as grayed out portions within the displayed portion of the calendar, but no specific information is provided about the scheduled events). In some embodiments, the grayed out events are in a long version of the notification shown to the user when the device is in a locked state, and the specifics of the scheduled events are shown to the user in a different long version of the notification, which is provided when the device is in an unlocked state. FIG. 5DD illustrates an exemplary first long version notification 5070 corresponding to a short version notification 5066, and long version notification 5070 displaying additional information (e.g., second information), distinct from the first information shown in short version notification 5066.

In some embodiments, the second information further includes (920) at least one calendar event scheduled within a predetermined window around the time specified in the calendar invitation. For example, as shown in FIG. 5DD, the second information includes two additional calendar events scheduled within a half hour before the invitation and a half hour after. In some embodiments, the predetermined time window is one day. In some embodiments, the predetermined time window is 2 hours. In some embodiments, the predetermined time window is one week. In some embodiments, the predetermined time window is approximately centered around the time specified in the calendar invitation. In some embodiments, the predetermined time window has a predetermined start time/day (e.g., 12:00 AM/Monday) and end time/day (11:59 PM/Sunday). In some embodiments, the scheduled calendar events are retrieved from the data store used to store calendar information by the calendar application. In some embodiments, the scheduled calendar events are only revealed in the calendar shown in the long version of the notification if the device is in an unlocked state. Otherwise, the device may first require the user to go through an authentication process before showing the long version of the notification to the user.

In some embodiments, the communication is (922) an instant message, the first information included in the short version of the notification includes content of the instant message, and the second information relevant to and distinct from the first information includes one or more previous messages from a sender of the instant message. For example, as shown in FIGS. 5AA and 5BB, short version notification 5058 corresponds to a received instant message, and includes the content of the instant message. Long version notification 5062 includes second information, including at least an additional message in the instant messaging conversation.

In some embodiments, the device selectively retrieves (924) the second information relevant to and distinct from the first information included in the short version of the notification from a local data store on the device. For example, in some embodiments, the local data store is a data store used by the application associated with the notification to store data associated with the application. For an instant message application, the data store optionally stores previous messages, contacts, etc. For a calendar application, the data store optionally stores calendar event information and preferred calendar format, etc. In some embodiments, additional content is included in the first long version of the notification, where the additional content is retrieved from other sources, such as the Internet, the operating system, or other applications installed on the device.

In some embodiments, the short version and the first long version of the notification are displayed on a lock screen (e.g., as shown in FIGS. 5JJ and 5KK), and while displaying the first long version of the notification, the device receives (926) a second user input invoking an application associated with the notification. For example, user input 5092 is detected directed to long version notification 5090, in FIG. 5KK. In response to receiving the second user input invoking the application, the device displays the application associated with the notification. FIG. 5MM illustrates an exemplary response to detecting user input 5092, invoking an associated calendar application.

In some embodiments, the short version and the first long version of the notification are displayed on a lock screen (e.g., as shown in FIGS. 5JJ and 5KK), and while displaying the first long version of the notification, the device receives (928) a second user input invoking an application associated with the notification. For example, user input 5092 is detected directed to long version notification 5090, in FIG. 5KK. In response to receiving the second user input invoking the application, the device enters an authentication mode, where in response to detecting input by a user in the authentication mode that authenticates the user, the application associated with the notification is displayed. For example, as shown in FIG. 5LL, an authentication mode is entered by the device, and successful authentication of the identity of a registered user of the device results in display of an application (e.g., calendar application) associated with notification 5090.

It should be understood that the particular order in which the operations in FIGS. 9A-9B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 1000, 1100, 1200 and 1300) are also applicable in an analogous manner to method 900 described above with respect to FIGS. 9A-9B. For example, the notifications, communications, communication-preparation indicators, user inputs and user interfaces described above with reference to method 900 optionally have one or more of the characteristics of the notifications, communications, communication-preparation indicators, user inputs and user interfaces described herein with reference to other methods described herein (e.g., methods 600, 700, 800, 1000, 1100, 1200 and 1300). For brevity, these details are not repeated here.

Figure 10A:
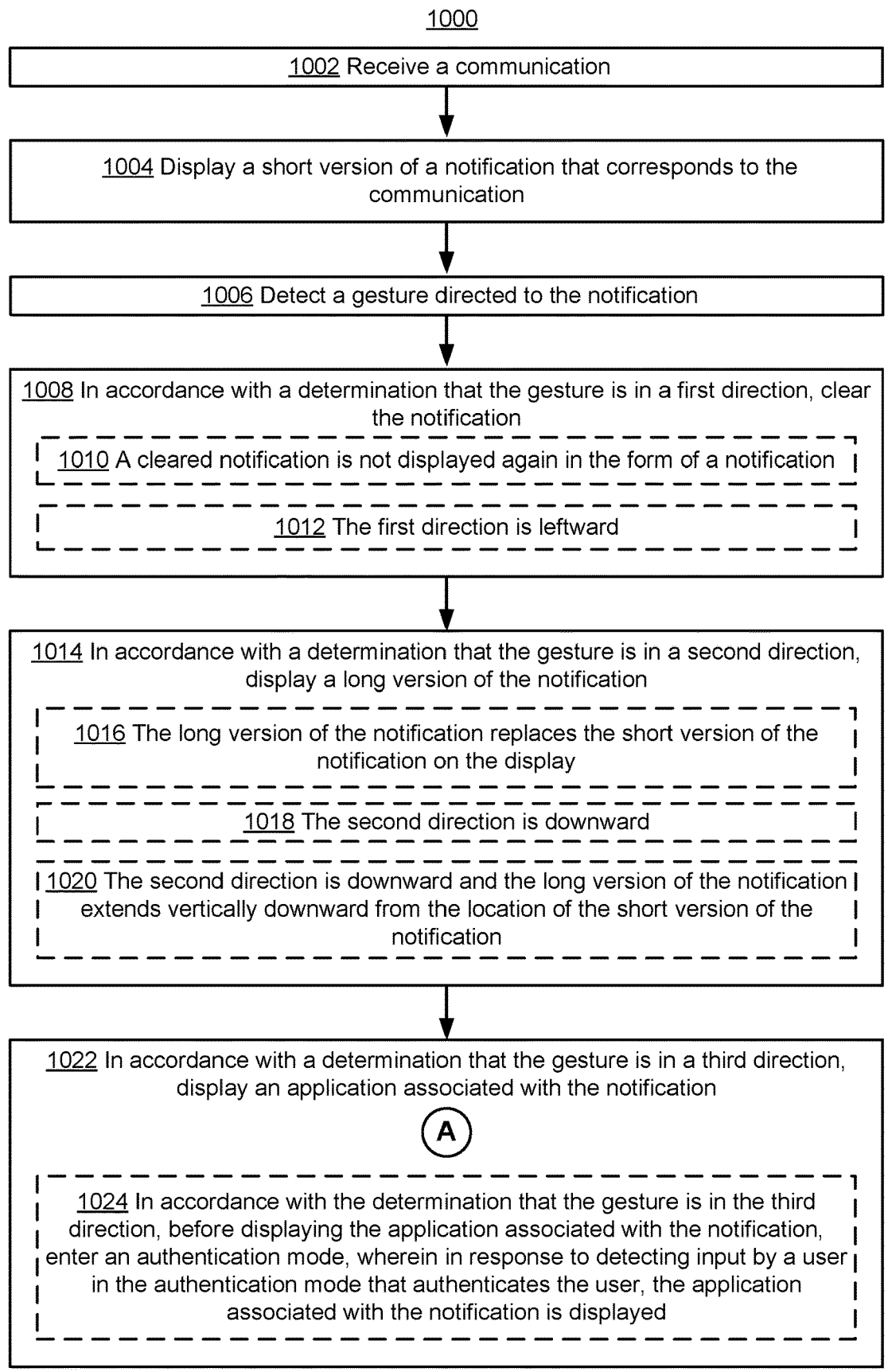
FIGS. 10A-10B are flow diagrams illustrating a method of interacting with notifications on a display in accordance with some embodiments.
Figure 10B:
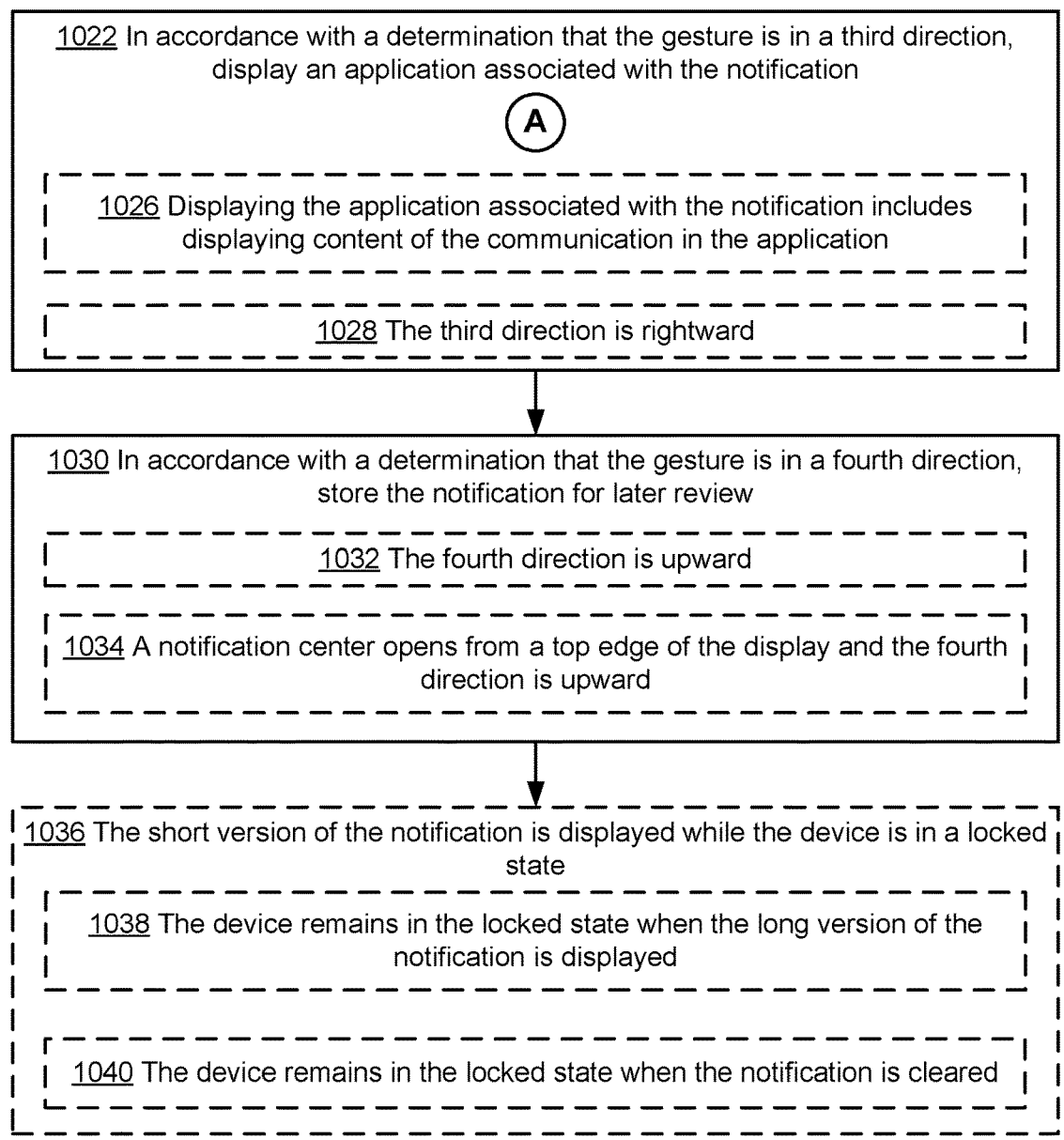

FIGS. 10A-10B illustrate a flow diagram of a method 1000 of interacting with notifications in accordance with some embodiments. The method 1000 is performed at an electronic device (e.g., device 300, FIG. 3, or portable multifunction device 100, FIG. 1A) with a display, and a touch-sensitive surface. In some embodiments, the display is a touch-screen display and the touch-sensitive surface is on or integrated with the display. In some embodiments, the display is separate from the touch-sensitive surface. Some operations in method 1000 are, optionally, combined and/or the order of some operations is, optionally, changed.

As described below, the method 1000 provides an intuitive way to clear and otherwise interact with notifications via directional gestures. The method reduces the number, extent, and/or nature of the inputs from a user when interacting with notifications on a display, thereby creating a more efficient human-machine interface. For battery-operated electronic devices, enabling a user to clear notifications on a display faster and more efficiently conserves power and increases the time between battery charges.

The device receives (1002) a communication (e.g., a telephone call request, a voice mail, an instant message, an email, a calendar invitation, etc.). The device displays (1004) a short version of a notification that corresponds to the communication. The device detects (1006) a gesture directed to the notification. For example, as shown in FIG. 5OO, the device displays short version notification 5098, corresponding to a received communication. FIG. 5OO also displays detection of user input 5100, directed to notification 5098.

In accordance with a determination that the gesture is in a first direction, the device clears (1008) the notification. For example, FIGS. 5OO and 5PP illustrate that user input 5100 is in a first direction, and notification 5098 is cleared. In some embodiments, a cleared notification (1010) is not displayed again in the form of a notification, as shown in FIG. 5PP. In some embodiments, the first direction is (1012) leftward, as shown by user input 5100 in FIG. 5OO.

In accordance with a determination that the gesture is in a second direction, the device displays (1014) a long version of the notification. In some embodiments, the long version of the notification replaces (1016) the short version of the notification on the display. For example, as shown in FIGS. 5RR and 5SS, user input 5104 is detected directed to short version notification 5102, and long version notification 5106 replaces display of short version notification 5102. In some embodiments, the second direction is (1018) downward, for example as shown in FIG. 5RR. In some embodiments, the second direction is downward and the long version of the notification extends (1020) vertically downward from the location of the short version of the notification.

In accordance with a determination that the gesture is in a third direction, the device displays (1022) an application associated with the notification. For example, FIG. 5UU illustrates detection of user input 5110 in a third direction, and in some embodiments, the application associated with short version notification 5108 is launched and displayed as shown in FIG. 5WW. In some embodiments, in accordance with the determination that the gesture is in the third direction, before displaying the application associated with the notification, the device enters (1024) an authentication mode, wherein in response to detecting input by a user in the authentication mode that authenticates the user, the application associated with the notification is displayed. FIG. 5VV illustrates that in some embodiments, before displaying the application in FIG. 5WW, the device enters an authentication mode.

In some embodiments, displaying (1026) the application associated with the notification includes displaying content of the communication in the application. For example, FIG. 5WW illustrates displaying content in the application associated with short version notification 5108 (e.g., information indicating that "Mom" posted a photo to a shared photo album). In some embodiments, the third direction is (1028) rightward (e.g., direction of user input 5110 in FIG. 5UU).

In accordance with a determination that the gesture is in a fourth direction, the device stores (1030) the notification for later review. In some embodiments, the fourth direction is (1032) upward. In some embodiments, a notification center opens (1034) from a top edge of the display and the fourth direction is upward. For example, FIGS. 5XX and 5YY illustrate storage of notification 5116 for later review, in response to detection of user input 5120 (e.g., in an upward direction). FIG. 5YY also illustrates opening of a notification center 5118 from a top edge of the display, and in some embodiments, placement of notification 5116 into notification center 5118.

In some embodiments, the short version of the notification is displayed (1036) while the device is in a locked state. In some embodiments, the device remains (1038) in the locked state when the long version of the notification is displayed. In some embodiments, the device remains (1040) in the locked state when the notification is cleared.

It should be understood that the particular order in which the operations in FIGS. 10A-10B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1100, 1200 and 1300) are also applicable in an analogous manner to method 1000 described above with respect to FIGS. 10A-10B. For example, the notifications, communications, communication-preparation indicators, user inputs and user interfaces described above with reference to method 1000 optionally have one or more of the characteristics of the notifications, communications, communication-preparation indicators, user inputs and user interfaces described herein with reference to other methods described herein (e.g., methods 600, 700, 800, 900, 1100, 1200 and 1300). For brevity, these details are not repeated here.

Figure 11A:
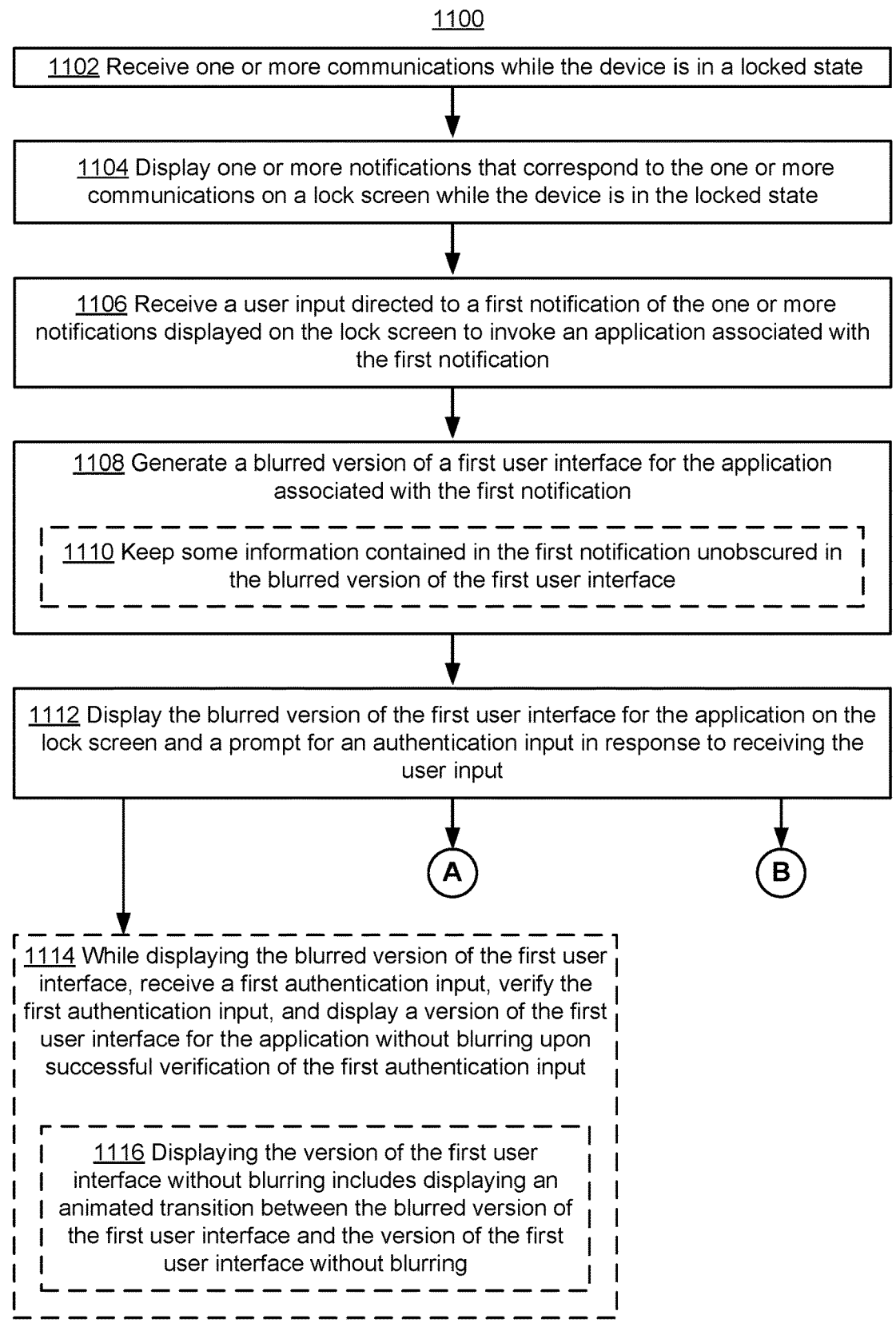
FIGS. 11A-11B are flow diagrams illustrating a method of displaying application user interfaces in accordance with some embodiments.
Figure 11B:
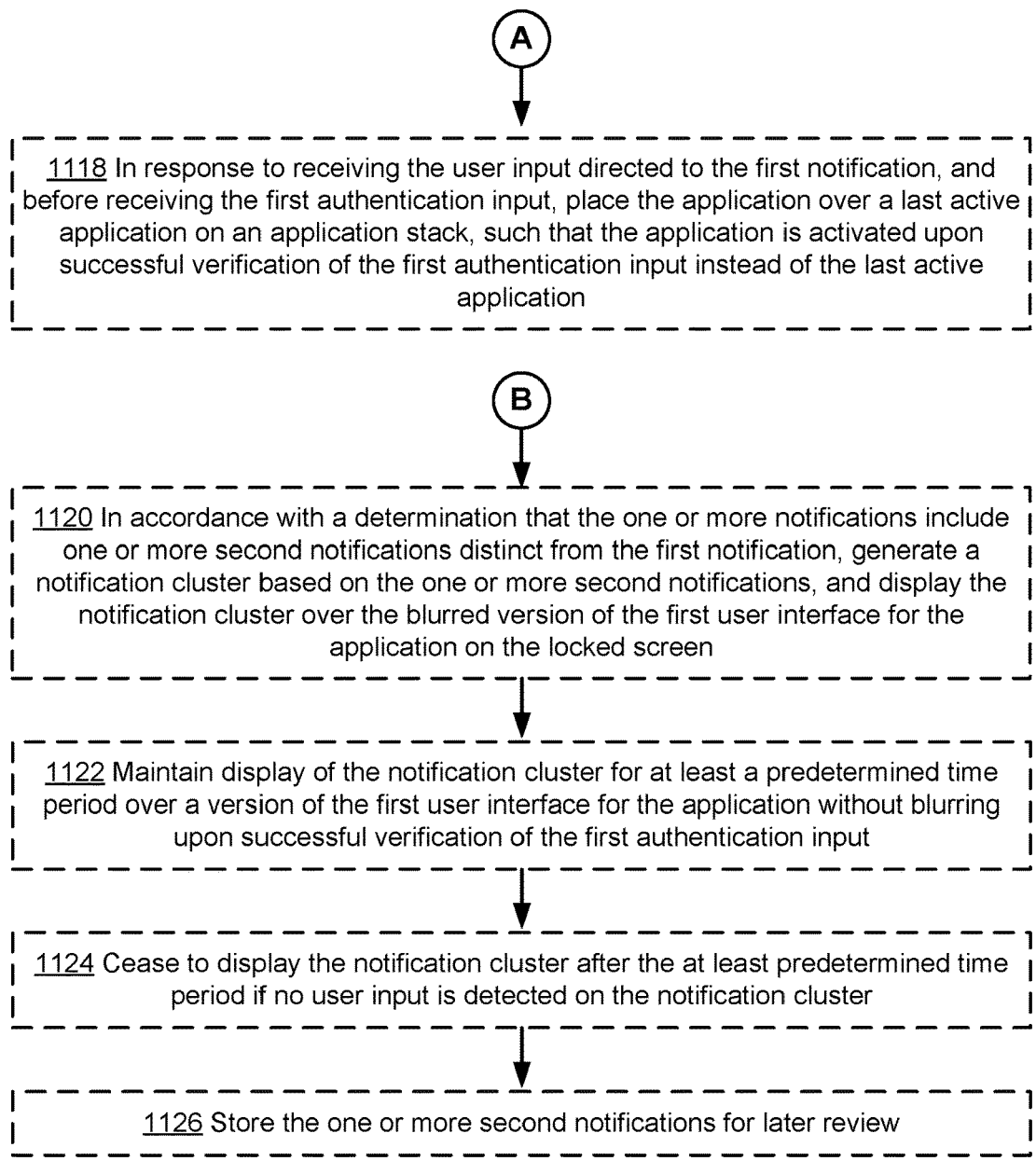

FIGS. 11A-11B illustrate a flow diagram of a method 1100 of displaying application user interfaces in accordance with some embodiments. The method 1100 is performed at an electronic device (e.g., device 300, FIG. 3, or portable multifunction device 100, FIG. 1A) with a display, and a touch-sensitive surface. In some embodiments, the display is a touch-screen display and the touch-sensitive surface is on or integrated with the display. In some embodiments, the display is separate from the touch-sensitive surface. Some operations in method 1100 are, optionally, combined and/or the order of some operations is, optionally, changed.

As described below, the method 1100 provides increased security and privacy for a user when interacting with notifications and their corresponding applications.

The device receives (1102) one or more communications while the device is in a locked state. The device displays (1104) one or more notifications that correspond to the one or more communications on a lock screen while the device is in the locked state. The device receives (1106) a user input directed to a first notification of the one or more notifications displayed on the lock screen to invoke an application associated with the first notification. For example, FIG. 5AAA illustrates display of three notifications (e.g., 5122, 5126 and 5128), while the device is in a locked state. In FIG. 5AAA, user input 5124 is detected, directed to notification 5122.

The device generates (1108) a blurred version of a first user interface for the application associated with the first notification. In some embodiments, generating a blurred version of the first user interface includes keeping (1110) some information contained in the first notification (e.g., message text in a notification for an instant message) unobscured in the blurred version of the first user interface (e.g., a user interface of an instant messaging application that displays a conversation session associated with the newly received instant message). In some embodiments, to generate the "blurred" user interface, some information (e.g., personal, private, and/or confidential information) in the first user interface is obscured by blurring, shading, or the like, and other information (e.g., general, public, and/or non-confidential information) in the first user interface is not obscured). FIG. 5BBB illustrates a blurred version of user interface 5130 corresponding to notification 5122, selected by user input 5124 in FIG. 5AAA. The user interface 5130 in FIG. 5BBB also shows blurred and un-blurred portions.

The device displays (1112) the blurred version of the first user interface for the application on the lock screen and a prompt for authentication input in response to receiving the user input. An example of this is shown in FIG. 5BBB, including an exemplary authentication prompt 5132. In some embodiments, while displaying the blurred version of the first user interface, the device receives (1114) a first authentication input, verifies the first authentication input, and displays a version of the first user interface for the application without blurring upon successful verification of the first authentication input. In some embodiments, displaying (1116) the version of the first user interface without blurring includes displaying an animated transition between the blurred version of the first user interface and the version of the first user interface without blurring. For example, as shown in FIG. 5CCC, an animated transition is displayed between the blurred version of user interface 5130 and an unblurred version of user interface 5130 shown in FIG. 5DDD.

In some embodiments, in response to receiving the user input directed to the first notification, and before receiving the first authentication input, the device places (1118) the application over a last active application on an application stack, such that the application is activated upon successful verification of the first authentication input instead of the last active application.

In some embodiments, in accordance with a determination that the one or more notifications include one or more second notifications distinct from the first notification, the device generates (1120) a notification cluster based on the one or more second notifications, and displays the notification cluster over the blurred version of the first user interface for the application on the lock screen. For example, FIG. 5FFF illustrates display of notifications 5126 and 5128 over the blurred version of user interface 5130.

In some embodiments, the device maintains (1122) display of the notification cluster for at least a predetermined time period over a version of the first user interface for the application without blurring upon successful verification of the first authentication input, an example of which is shown in FIG. 5GGG. In some embodiments, the device ceases (1124) to display the notification cluster after the at least predetermined time period if no user input is detected on the notification cluster. In some embodiments, the device stores (1126) the one or more second notifications for later review.

It should be understood that the particular order in which the operations in FIGS. 11A-11B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, 1200 and 1300) are also applicable in an analogous manner to method 700 described above with respect to FIGS. 11A-11B. For example, the notifications, communications, communication-preparation indicators, user inputs and user interfaces described above with reference to method 1100 optionally have one or more of the characteristics of the notifications, communications, communication-preparation indicators, user inputs and user interfaces described herein with reference to other methods described herein (e.g., methods 600, 700, 800, 900, 1000, 1200 and 1300). For brevity, these details are not repeated here.

FIGS. 12A-12B illustrate a flow diagram of a method 1200 of clustering notifications in accordance with some embodiments. The method 1200 is performed at an electronic device (e.g., device 300, FIG. 3, or portable multifunction device 100, FIG. 1A) with a display, and a touch-sensitive surface. In some embodiments, the display is a touch-screen display and the touch-sensitive surface is on or integrated with the display. In some embodiments, the display is separate from the touch-sensitive surface. Some operations in method 1200 are, optionally, combined and/or the order of some operations is, optionally, changed.

As described below, the method 1200 provides an intuitive way to display and interact with a cluster of notifications (e.g., without having to view the notifications in a separate notification center user interface). The method reduces the number, extent, and/or nature of the inputs from a user when interacting with multiple notifications on a display, thereby creating a more efficient human-machine interface. For battery-operated electronic devices, enabling a user to view and interact with multiple notifications on a display faster and more efficiently conserves power and increases the time between battery charges.

The device displays (1202) a plurality of notifications (e.g., multiple separate notifications of single events/communications, or multiple coalesced notifications, or a mixture of both types of notifications) on a lock screen while the device is in a locked state, as shown in FIG. 5III. The device detects (1204) an authentication input to unlock the device (e.g., the authentication input may be a fingerprint input on a touch-sensitive button or a dedicated area on a touch-sensitive display or device casing, or an authentication gesture on the touch-sensitive display or device casing), as shown in FIG. 5777. In some embodiments, the authentication input is detected when the device is in a dormant state (e.g., after the device has fallen asleep while displaying the plurality of notifications and has ceased to display the plurality of notifications on the lock screen), and the authentication input (e.g., the fingerprint input) may be part of a waking input (e.g., a press input on button with a fingerprint sensor) to wake up the device from the dormant state. In some embodiments, the fingerprint input is detected while the device is awake and the notifications are displayed on the lock screen.

In response to detecting the authentication input to unlock the device, the device verifies (1206) the authentication input. The device unlocks (1208) the device in accordance with successful verification of the authentication input. In response to unlocking of the device in accordance with successful verification of the authentication input, the device displays (1210) a first user interface of the device (e.g., the first user interface may be a home screen of the device or the user interface of the last active application before the device went into the locked state), and arranges the plurality of notifications into a cluster overlaid on the first user interface. An example of this is shown in FIG. 5KKK, illustrating cluster 5138 of notifications overlaid on unlock-state user interface 5046.

In some embodiments, the notifications are stacked into a cluster and overlaid near the top edge of the first user interface, as shown in FIG. 5KKK. In some embodiments, the cluster includes a badge that shows the number of notifications in the cluster. In some embodiments, the cluster is a 3D horizontal stack (e.g., with each notification represented as a card with its right edge revealed and its left edge concealed behind another card on top of it) and is browsable by a swipe input across the width of cluster to bring up one notification at a time as the contact of the swipe passes the position of the notification in the stack (e.g., when the contact touches the exposed edge of the card representing the notification). In some embodiments, the cluster is not browsable, and an input directed to the cluster disposes of the notifications in the cluster together in the same manner (e.g., clear, store, un-cluster, etc.).

In some embodiments, while the cluster is overlaid on the first user interface, the device receives (1212) a user input directed to the cluster (e.g., a tap input on the cluster, or a downward swipe across the cluster), and in response to receiving the user input directed to the cluster, the device determines whether the user input satisfies a first criterion, and in accordance with a determination that the user input satisfies the first criterion, expands the notification cluster to show the plurality of notifications. FIG. 5LLL illustrates expansion of notification cluster 5138 in response to detecting user input 5140 in FIG. 5KKK. In some embodiments, if a downward swipe is associated with the command for un-clustering the notifications, then the first criterion is that the user input is a downward swipe across the cluster. In some embodiments, if a deep press input is associated with the un-clustering of the notifications, the first criterion is an intensity threshold associated with fully expanding the notification cluster into individual notifications. In some embodiments, a light press below the required intensity to fully expand the notification cluster causes the cluster to expand in accordance with the intensity of the light press, and retract into the cluster upon lift-off of the light press input.

In some embodiments, while the cluster is overlaid on the first user interface, the device receives (1214) a user input directed to the cluster (e.g., an upward swipe across the cluster or a left or right swipe across the cluster), and in response to receiving the user input directed to the cluster, the device determines whether the user input satisfies a second criterion, and in accordance with a determination that the user input satisfies the second criterion (e.g., the second criterion may be met by any input that is different from the input that causes the un-clustering of the notifications), and ceases to display the cluster. An example of this is shown in FIGS. 5MMM and 5NNN, where user input 5142 is an upward swipe gesture detected on notification cluster 5138, and results in ceasing to display cluster 5138.

In some embodiments, the device clears (1216) the plurality of notifications after ceasing to display the cluster, and in some embodiments, a cleared notification is not (1218) displayed as a notification again. In some embodiments, the device stores (1220) the plurality of notifications in a notification center after ceasing to display the cluster. In some embodiments, clearing a notification deletes the notification from the device. In some embodiments, clearing a notification marks the event or communication associated with the notification as read or reviewed in an application associated with the notification.

In some embodiments, the device determines (1222) whether a user input directed to the cluster has been received during a predetermined time window (e.g., 5, 10, or 15 seconds) since the cluster was overlaid on the first user interface, and in accordance with a determination that no user input directed to the cluster has been received during the predetermined time window since the cluster was overlaid on the first user interface, the device ceases to display the cluster, for instance as shown in FIG. 5PPP after determining that no user input directed to cluster 5138 was detected in FIG. 5OOO.

In some embodiments, the device clears (1224) the plurality of notifications after ceasing to display the cluster. In some embodiments, the device stores (1226) the plurality of notifications in a notification center after ceasing to display the cluster.

It should be understood that the particular order in which the operations in FIGS. 12A-12B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, 1100 and 1300) are also applicable in an analogous manner to method 1200 described above with respect to FIGS. 12A-12B. For example, the notifications, communications, communication-preparation indicators, user inputs and user interfaces described above with reference to method 1200 optionally have one or more of the characteristics of the notifications, communications, communication-preparation indicators, user inputs and user interfaces described herein with reference to other methods described herein (e.g., methods 600, 700, 800, 900, 1000, 1100 and 1300). For brevity, these details are not repeated here.

Figure 13A:
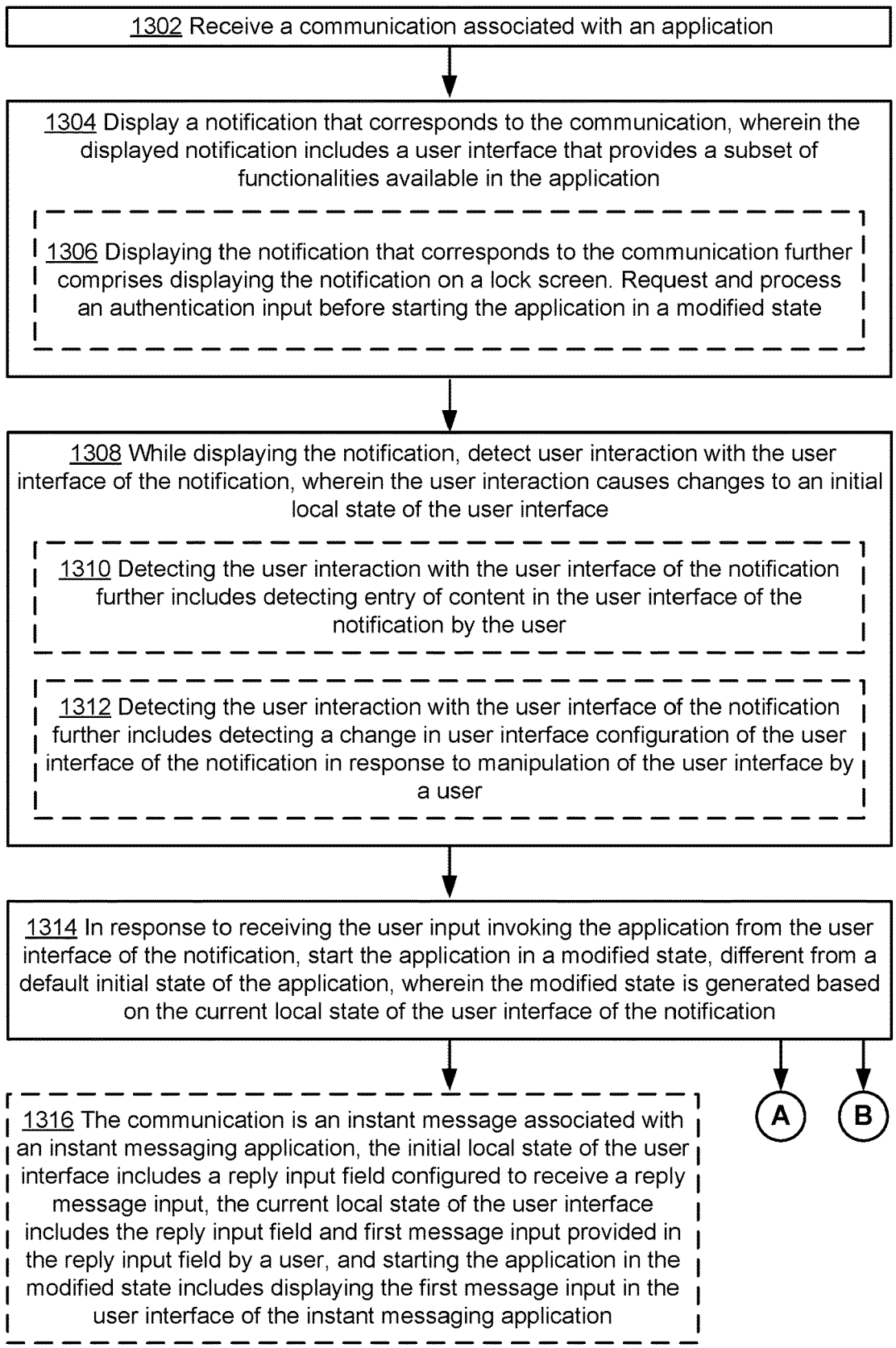

FIGS. 13A-13B illustrate a flow diagram of a method 1300 of transferring notification information to a corresponding application in accordance with some embodiments. The method 1300 is performed at an electronic device (e.g., device 300, FIG. 3, or portable multifunction device 100, FIG. 1A) with a display, and a touch-sensitive surface. In some embodiments, the display is a touch-screen display and the touch-sensitive surface is on or integrated with the display. In some embodiments, the display is separate from the touch-sensitive surface. Some operations in method 1300 are, optionally, combined and/or the order of some operations is, optionally, changed.

As described below, the method 1300 provides a seamless way to transfer notification information to a corresponding application. The method reduces the number, extent, and/or nature of the inputs from a user when shifting from interacting with a notification to interacting with a corresponding application, thereby creating a more efficient human-machine interface.

The device receives (1302) a communication associated with an application (e.g., receiving an instant message associated with an instant messaging application as shown in FIG. 5QQQ, or receiving a calendar invitation associated with a calendar application as shown in FIG. 5UUU). The device displays (1304) a notification that corresponds to the communication, where the displayed notification includes a user interface that provides a subset (less than all) of functionalities available in the application (e.g., notification 5148 in FIG. 5UUU provides fewer calendar application options than the application does). For example, the notification for the instant message includes the message sender and message text of the instant message, a textual reply input box for receiving textual input from the user, and a send button for sending the textual reply once the reply is completed by the user. In another example, the notification for the calendar invitation includes a daily event view showing a portion of the user's calendar (including any existing scheduled events) on the day of the event specified in the calendar invitation. The user optionally interacts with the notification interface to bring up a weekly event view showing a larger portion of the user's calendar (including any existing scheduled events) during the week of the event specified in the calendar invitation. The user also optionally interacts with the notification interface to browse to one or more adjacent days in the calendar to see what's been scheduled in those day(s).

In some embodiments, the device displays (1306) the notification that corresponds to the communication further comprises displaying the notification on a lock screen, and the device requests and processes an authentication input before starting the application in a modified state. FIG. 5ZZZ illustrates the device requesting an authentication input, and in response to successful authentication of the identity of a registered user of the device, the application is launched and displayed as shown in FIG. 5AAAA.

While displaying the notification, the device detects (1308) user interaction with the user interface of the notification, wherein the user interaction causes changes to an initial local state of the user interface (e.g., changes to the UI appearance by browsing to a different part of the UI or inputting information.). In some embodiments, detecting the user interaction with the user interface of the notification further includes (1310) detecting entry of content in the user interface of the notification by the user (e.g., entry of text in field 5146, in FIG. 5RRR). In some embodiments, detecting the user interaction with the user interface of the notification includes (1312) detecting a change in user interface configuration of the user interface of the notification in response to manipulation of the user interface by a user (e.g., detecting scrolling of calendar content in notification 5148, as shown in FIG. 5VVV).

In response to receiving the user input invoking the application from the user interface of the notification, the device starts (1314) the application in a modified state, different from a default initial state of the application, where the modified state is generated based on the current local state of the user interface of the notification. In some embodiments, the default initial state of the application for when the user invokes the application from the notification is based on the initial local state shown in the notification, rather than the current local state.

In some embodiments, the communication is (1316) an instant message associated with an instant messaging application, the initial local state of the user interface includes a reply input field configured to receive a reply message input, the current local state of the user interface includes the reply input field and first message input provided in the reply input field by a user, and starting the application in the modified state includes displaying the first message input in the user interface of the instant messaging application, as shown in FIGS. 5QQQ-5TTT.

In some embodiments, the communication is (1318) a calendar invitation associated with a calendar application, the initial local state of the user interface includes a first portion of a calendar in a first view, the current local state of the user interface includes a second portion of the calendar in a second view that is different from the first portion of the calendar in the first view, and starting the application in the modified state includes displaying the second portion of the calendar in the second view, as shown in FIGS. 5UUU-5XXX.

In some embodiments, the device provides (1320) data regarding the current local state of the user interface of the notification to the application. In some embodiments, the device stores (1322) the data regarding the current local state of the user interface of the notification in a data store accessible by the application, and in some embodiments, the device provides (1324) data regarding the current local state of user interface of the notification to the application further comprises sending the data regarding the current local state of the user interface of the notification to the application.

It should be understood that the particular order in which the operations in FIGS. 13A-13B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, 1100 and 1200) are also applicable in an analogous manner to method 1300 described above with respect to FIGS. 13A-13B. For example, the notifications, communications, communication-preparation indicators, user inputs and user interfaces described above with reference to method 1300 optionally have one or more of the characteristics of the notifications, communications, communication-preparation indicators, user inputs and user interfaces described herein with reference to other methods described herein (e.g., methods 600, 700, 800, 900, 1000, 1200 and 1300). For brevity, these details are not repeated here.

Figure 14:
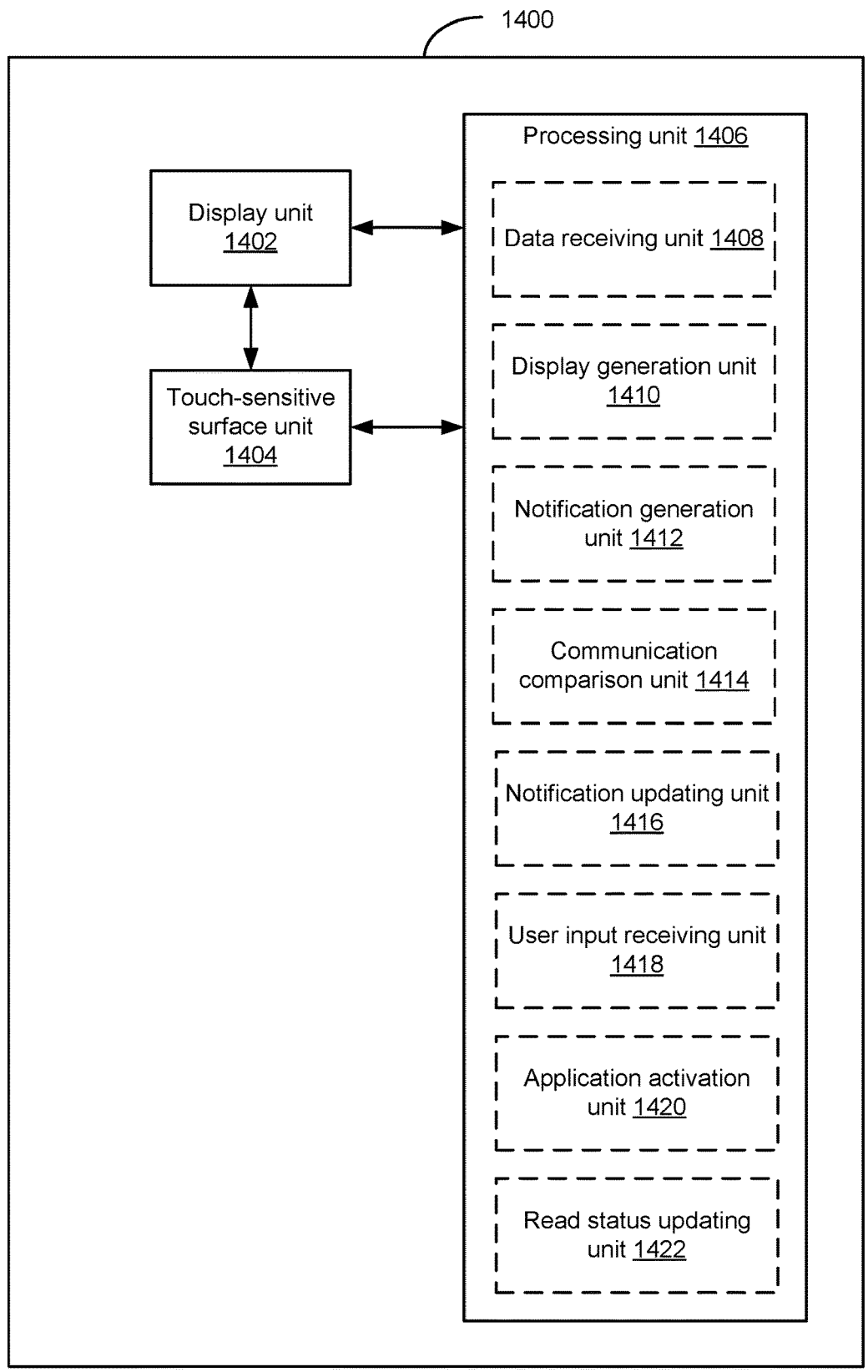
FIGS. 14-20 are functional block diagrams of electronic devices in accordance with some embodiments.

In accordance with some embodiments, FIG. 14 shows a functional block diagram of an electronic device 1400 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 14 are, optionally, combined or separated into sub-blocks to implement the principles of the various described embodiments. Therefore, the description herein optionally supports any possible combination or separation or further definition of the functional blocks described herein.

As shown in FIG. 14, an electronic device 1400 includes a display unit 1402 configured to display a user interface, and a touch-sensitive surface unit 1404 configured to receive contacts; and a processing unit 1406 coupled with the display unit 1402, and the touch-sensitive surface unit 1404. In some embodiments, the processing unit 1406 includes: a data receiving unit 1408, a display enablement unit 1410, a notification generation unit 1412, a communication comparison unit 1414, a notification updating unit 1416, a user input receiving unit 1418, an application activation unit 1420, and a read status updating unit 1422.

The processing unit 1406 is configured to: receive a first communication at the device while the device is in a locked state (e.g., with the data receiving unit 1408); in response to receiving the first communication at the device while the device is in the locked state, enable, for display on a lock screen (e.g., with display enablement unit 1410), a first notification for the first communication received at the device (e.g., generated with notification generation unit 1412), where the first notification includes content of the first communication; receive a second communication at the device while the device is in the locked state (e.g., with data receiving unit 1408); and in response to receiving the second communication at the device while the device is in the locked state, determine whether the second communication and the first communication are received from the same sender (e.g., with communication comparison unit 1414); in accordance with a determination that the second communication and the first communication are from the same sender, update the first notification for display on the lock screen such that the updated first notification concurrently includes the content of the first communication and content of the second communication (e.g., with notification updating unit 1416); and in accordance with a determination that the second communication and the first communication are not from the same sender, generate a second notification, distinct from the first notification, for concurrent display on the lock screen with the first notification (e.g., with notification generation unit 1412).

In some embodiments, the processing unit 1406 is further configured to: in response to receiving the second communication at the device while the device is in the locked state, enable for display the updated first notification or enable for concurrent display, the first and second notifications (e.g., with display enablement unit 1410) in accordance with whether the second communication and the first communication are received from the same sender (e.g., determined with communication comparison unit 1414).

In some embodiments, the processing unit 1406 is further configured to: after receiving the second communication, receive a user input to activate the device from a dormant state (e.g., with data receiving unit 1408), and in response to receiving the user input to activate the device from the dormant state, enable for display the updated first notification or enable for concurrent display (e.g., with display enablement unit 1410), the first and second notifications in accordance with whether the second communication and the first communication are received from the same sender (e.g., determined with communication comparison unit 1414). In some embodiments, the first communication and the second communication are instant messages, and in accordance with the determination that the second communication and the first communication are from the same sender, the updated first notification (e.g., updated by notification updating unit 1416), sequentially includes a message body from the first communication and a message body from the second communication.

In some embodiments, the processing unit 1406 is further configured to: while the device is in the locked state, receive an input directed to the updated first notification (e.g., with user input receiving unit 1418), and in response to receiving the input directed to the updated first notification while the device is in the locked state, enable, for display on the lock screen (e.g., with display enablement unit 1410), an alternative version of the updated first notification, wherein the alternative version of the updated first notification includes a first set of action controls for content in the updated first notification that corresponds to the first communication, and a second set of action controls for content in the updated first notification that corresponds to the second communication, distinct from the first set of action controls for content in the updated first notification that corresponds to the first communication.

In some embodiments, the processing unit 1406 is further configured to: while the device is in the locked state, receive an input directed to the updated first notification (e.g., with user input receiving unit 1418), and in response to receiving the input directed to the updated first notification while the device is in the locked state, generate a third notification, for concurrent display on the lock screen with the first notification (e.g., with notification generation unit 1412).

In some embodiments, the processing unit 1406 is further configured to: receive an input directed to the updated first notification (e.g., with user input receiving unit 1418), and in response to receiving the input directed to the updated first notification, activate an application associated with the first and second communications (e.g., with application activation unit 1420), the application displaying the first communication and the second communication in context with a previous communication session with the same user.

In some embodiments, the processing unit 1406 is further configured to: receive a dismissal input directed to the updated first notification (e.g., with user input receiving unit 1418), and in response to receiving the dismissal input directed to the updated first notification, update respective read/unread statuses of the first communication and the second communication in accordance with the dismissal input (e.g., with read status updating unit 1422).

In some embodiments, the first notification displays a timestamp with a receipt time of the first communication, and updating the first notification for display on the lock screen (e.g., with notification updating unit 1416) includes updating the timestamp to display a receipt time of the second communication.

In some embodiments, the processing unit 1406 is further configured to: at a first time after receiving the first communication and prior to receiving the second communication, enable for display the first notification and a third notification in accordance with a first display order (e.g., with display enablement unit 1410), and at a second time after receiving the second communication, enable for display the updated first notification and the third notification in accordance with a second display order that is different from the first display order (e.g., with display enablement unit 1410), wherein the second display order is generated based on the updated timestamp in the updated first notification.

In some embodiments, the processing unit 1406 is further configured to: after receiving the first communication and before receiving the second communication, enable for display the first notification on the lock screen, wherein the first notification includes content in the first communication (e.g., with display enablement unit 1410 and notification generation unit 1412); while displaying the first notification on the lock screen and before receiving the second communication, receive information that indicates a sender of the first communication is preparing another communication (e.g., with data receiving unit 1408), and in response to receiving the information that indicates the sender of the first communication is preparing another communication, update the displayed first notification on the lock screen (e.g., with notification updating unit 1416) to concurrently display content in the first communication, and a communication-preparation indicator that indicates preparation of another communication by the sender of the first communication.

In some embodiments, the second communication is received while the first notification concurrently displays content in the first communication and the communication-preparation indicator on the lock screen, and the processing unit 1406 is further configured to: in accordance with the determination that the second communication and the first communication are from the same sender, update the displayed first notification (e.g., with notification updating unit 1416) on the lock screen to concurrently display content in the first communication and content in the second communication, and cease to display the communication-preparation indicator (e.g., with display enablement unit 1410).

In some embodiments, the processing unit 1406 is configured to: receive a first communication at the device while the device is in a locked state (e.g., with data receiving unit 1408); in response to receiving the first communication at the device while the device is in the locked state, enable, for display on a lock screen (e.g., with display enablement unit 1410), a first notification for the first communication received at the device (e.g., with notification generation unit 1412), where the first notification includes content in the first communication; while displaying the first notification on the lock screen, receive information (e.g., with data receiving unit 1408) that indicates a sender of the first communication is preparing another communication; and in response to receiving the information that indicates the sender of the first communication is preparing another communication, update the displayed first notification (e.g., with notification updating unit 1416) on the lock screen to concurrently display content in the first communication and a communication-preparation indicator that indicates preparation of another communication by the sender of the first communication.

In some embodiments, the processing unit 1406 is further configured to: while displaying the updated first notification that concurrently includes content in the first communication and the communication-preparation indicator that indicates preparation of another communication by the sender of the first communication, receive a second communication from the sender of the first communication (e.g., with data receiving unit 1408), and in response to receiving the second communication, update the displayed first notification on the lock screen (e.g., with notification updating unit 1416) to concurrently display content in the first communication and content in the second communication, and cease to display the communication-preparation indicator (e.g., with display enablement unit 1410).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6D and 7 are, optionally, implemented by components depicted in FIGS. 1A-1B or FIG. 14. For example, communication receiving operation 602, notification generation operation 604, and notification updating operation 708 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 15:
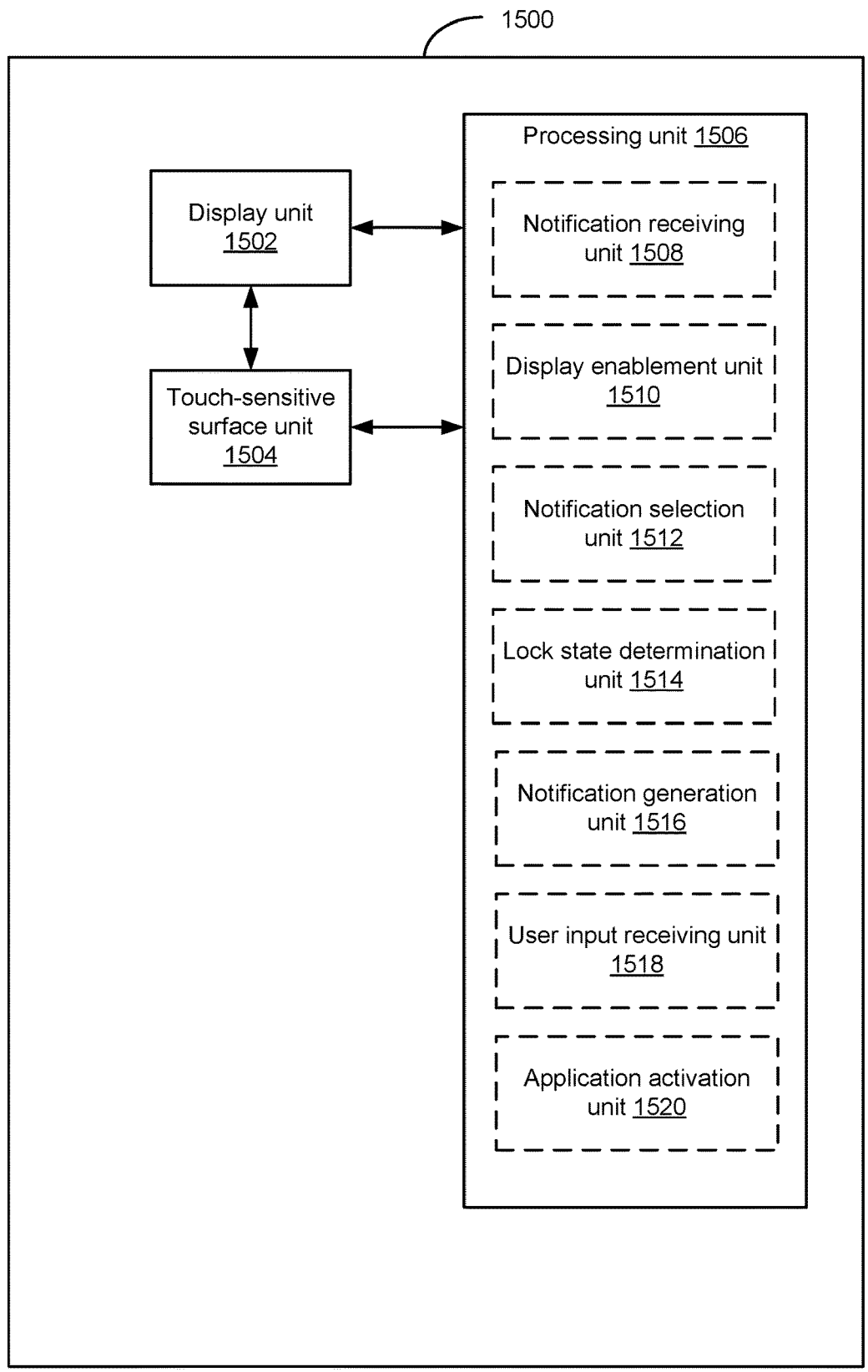

In accordance with some embodiments, FIG. 15 shows a functional block diagram of an electronic device 1500 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 15 are, optionally, combined or separated into sub-blocks to implement the principles of the various described embodiments. Therefore, the description herein optionally supports any possible combination or separation or further definition of the functional blocks described herein.

As shown in FIG. 15, an electronic device 1500 includes a display unit 1502 configured to display a user interface, and a touch-sensitive surface unit 1504 configured to receive contacts; and a processing unit 1506 coupled with the display unit 1502, and the touch-sensitive surface unit 1504. In some embodiments, the processing unit 1506 includes: a notification receiving unit 1508, a display enablement unit 1510, a notification selection unit 1512, a lock state determination unit 1514, a notification generation unit 1516, a user input receiving unit 1518, and an application activation unit 1520.

The processing unit 1506 is configured to: receive a notification (e.g., with notification receiving unit 1508); enable for display a short version of the notification (e.g., with display enablement unit 1510); while enabling for display the short version of the notification, receive an input invoking a corresponding long version of the notification (e.g., with user input receiving unit 1518), distinct from the short version of the notification; determine whether the input invoking the corresponding long version of the notification is received while the device is in a locked state or an unlocked state (e.g., with lock state determination unit 1514); in accordance with a determination that the input is received while the device is in the locked state, enable for display a first long version of the notification (e.g., with display enablement unit 1510 and notification selection unit 1512); and in accordance with a determination that the input is received while the device is in the unlocked state, enable for display a second long version of the notification that is distinct from the first-long version of the notification (e.g., with display enablement unit 1510 and notification selection unit 1512).

In some embodiments, the second long version of the notification includes more content relevant to the notification than the first long version of the notification. In some embodiments, the second long version of the notification includes more functions of an application that corresponds to the notification than the first long version of the notification. In some embodiments, the short version of the notification displays a newly arrived communication (e.g., an instant message), and wherein the second long version of the notification displays the newly arrived communication (e.g., the instant message) and at least one previous communication associated with the newly arrived communication (e.g., a previous instant message from the same sender) that is not displayed in the first long version of the notification.

In some embodiments, the short version of the notification displays a calendar invitation, and wherein the second long version of the notification displays at least one previously scheduled event relevant to the calendar invitation that is not displayed in the first long version of the notification. In some embodiments, the short version of the notification displays a calendar invitation, and wherein the second long version of the notification displays at least one portion of a calendar that is not displayed in the first long version of the notification. In some embodiments, the second long version of the notification includes at least one user interface control not available in the first long version of the notification.

In some embodiments, the processing unit 1506 is further configured to: while displaying either the first long version of the notification or the second long version of the notification, receive a second input invoking an application that corresponds to the notification (e.g., with user input receiving unit 1518), and in response to receiving the input invoking the application that corresponds to the notification (e.g., with application activation unit 1520), enable for display a user interface of the application (e.g., with display enablement unit 1510), wherein the user interface of the application provides more content than the first long version of the notification and the user interface of the application provides more content than the second long version of the notification.

In some embodiments, the processing unit 1506 is further configured to: while displaying either the first long version of the notification or the second long version of the notification, receive a second input invoking an application that corresponds to the notification (e.g., with user input receiving unit 1518), and in response to receiving the input invoking the application that corresponds to the notification (e.g., with application activation unit 1520), enable for display a user interface of the application (e.g., with display enablement unit 1510), wherein the user interface of the application provides more functions than the first long version of the notification and the user interface of the application provides more functions than the second long version of the notification.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8B are, optionally, implemented by components depicted in FIGS. 1A-1B or FIG. 15. For example, input receiving operation 806, determination operation 808, and display operation 812 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 16:
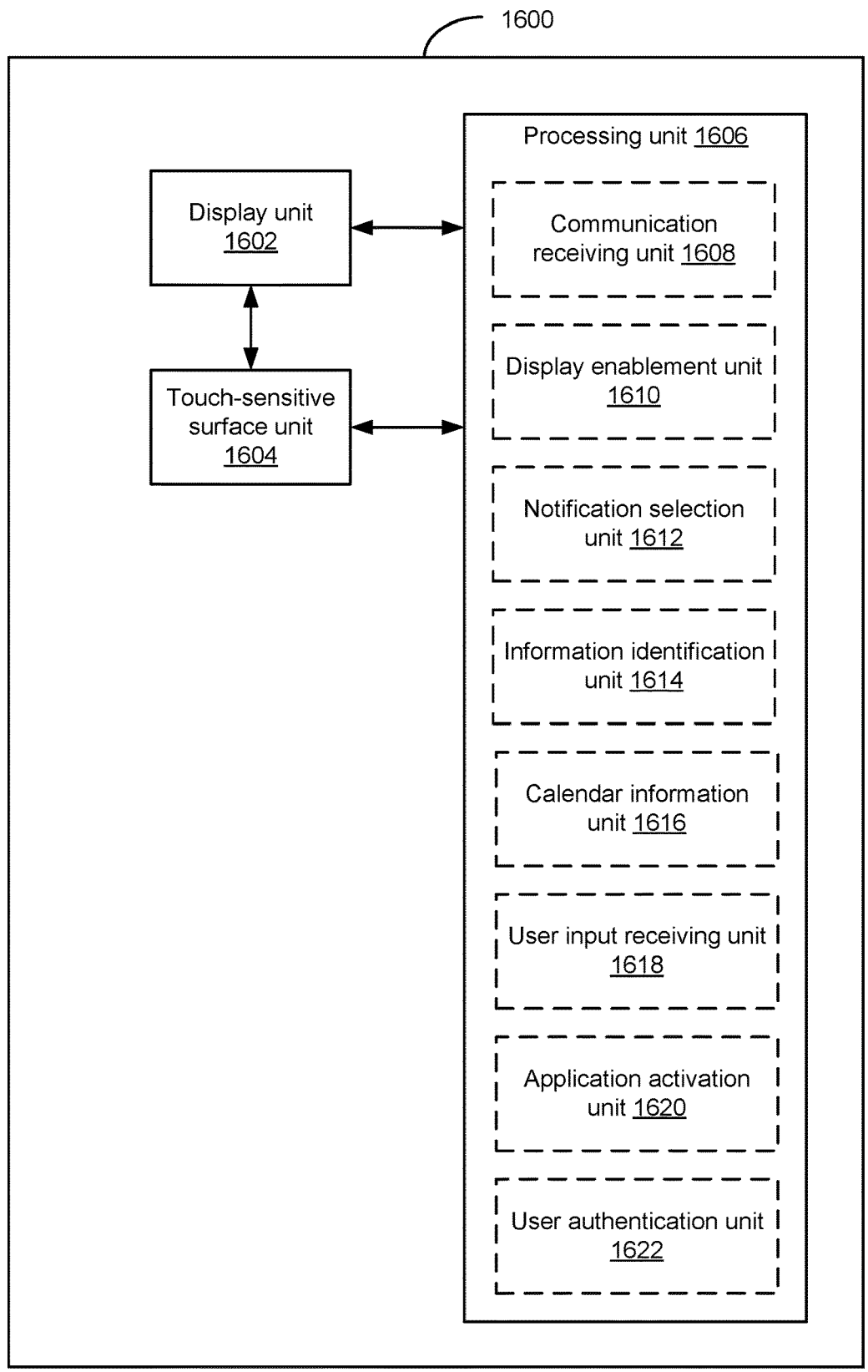

In accordance with some embodiments, FIG. 16 shows a functional block diagram of an electronic device 1600 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, an electronic device 1600 includes a display unit 1602 configured to display a user interface, and a touch-sensitive surface unit 1604 configured to receive contacts; and a processing unit 1606 coupled with the display unit 1602, and the touch-sensitive surface unit 1604. In some embodiments, the processing unit 1606 includes: a communication receiving unit 1608, a display enablement unit 1610, a notification selection unit 1612, an information identification unit 1614, a calendar information unit 1616, a user input receiving unit 1618, an application activation unit 1620, and a user authentication unit 1422.

The processing unit 1606 is configured to: receive a communication (e.g., with communication receiving unit 1608); enable for display a short version of a notification that corresponds to the communication (e.g., with display enablement unit 1610), wherein the short version of the notification includes first information; identify second information relevant to and distinct from the first information included in the short version of the notification (e.g., with information identification unit 1614); while displaying the short version of the notification, receive a user input invoking a long version of the notification (e.g., with user input receiving unit 1618 and notification selection unit 1612); and in response to receiving the user input invoking the long version of the notification, enable for display a first long version of the notification (e.g., with display enablement unit 1610), wherein the first long version of the notification includes at least the first information included in the short version of the notification and the identified second information relevant to and distinct from the first information included in the short version of the notification.

In some embodiments, identifying the second information relevant to and distinct from the first information included in the short version of the notification (e.g., with information identification unit 1614), is performed in response to receiving the user input invoking the long version of the notification. In some embodiments, the communication is a calendar invitation for a first event, the first information included in the short version of the notification includes content in the calendar invitation for the first event, and the second information relevant to and distinct from the first information includes a portion of a calendar that includes a time specified in the calendar invitation (e.g., with calendar information unit 1616). In some embodiments, the second information further includes at least one calendar event scheduled within a predetermined window around the time specified in the calendar invitation (e.g., with calendar information unit 1616).

In some embodiments, the communication is an instant message, the first information included in the short version of the notification includes content of the instant message, and the second information relevant to and distinct from the first information includes one or more previous messages from a sender of the instant message. In some embodiments, the first long version of the notification includes a subset of all functions available in an application associated with the notification. In some embodiments, the first long version of the notification includes a subset of all information available in an application associated with the notification.

In some embodiments, the processing unit 1606 is further configured to: selectively retrieve the second information relevant to and distinct from the first information included in the short version of the notification from a local data store on the device (e.g., with information identification unit 1614). In some embodiments, the short version and the first long version of the notification are displayed on a lock screen, and the processing unit 1606 is further configured to: while displaying the first long version of the notification, receive a second user input (e.g., with user input receiving unit 1618) invoking an application associated with the notification (e.g., with application activation unit 1620); and in response to receiving the second user input invoking the application, enable for display the application associated with the notification (e.g., with display enablement unit 1610).

In some embodiments, the short version and the first long version of the notification are displayed on a lock screen, and the processing unit 1606 is further configured to: while displaying the first long version of the notification, receive a second user input (e.g., with user input receiving unit 1618) invoking an application associated with the notification (e.g., with application activation unit 1620), and in response to receiving the second user input invoking the application, enter an authentication mode (e.g., with user authentication unit 1622), where in response to detecting input by a user in the authentication mode that authenticates the user, the application associated with the notification is displayed (e.g., with application activation unit 1620).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9B are, optionally, implemented by components depicted in FIGS. 1A-1B or FIG. 16. For example, communication receiving operation 902, user input receiving operation 908, and information identification operation 912 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 17:
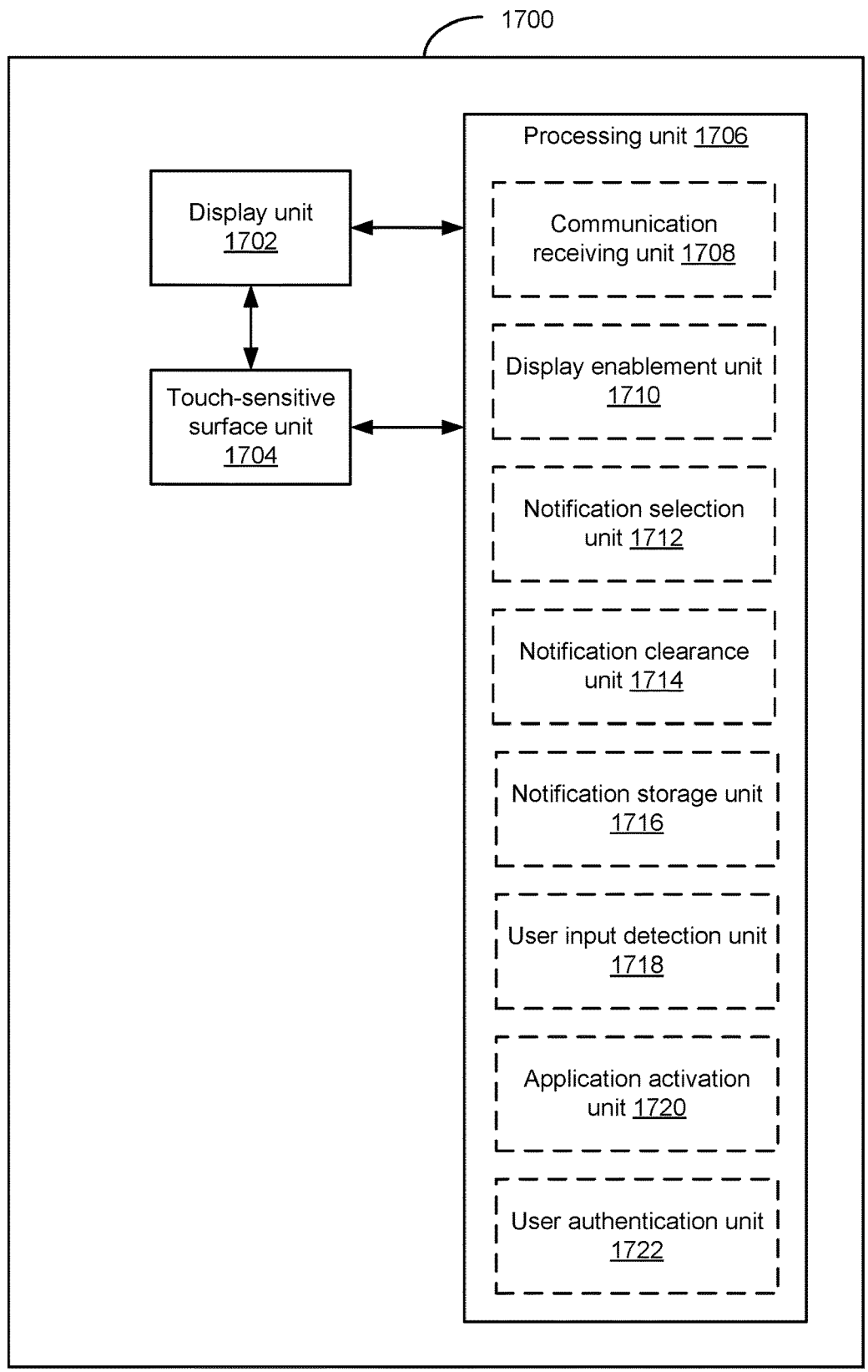

In accordance with some embodiments, FIG. 17 shows a functional block diagram of an electronic device 1700 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 17 are, optionally, combined or separated into sub-blocks to implement the principles of the various described embodiments. Therefore, the description herein optionally supports any possible combination or separation or further definition of the functional blocks described herein.

As shown in FIG. 17, an electronic device 1700 includes a display unit 1702 configured to display a user interface, and a touch-sensitive surface unit 1704 configured to receive contacts; and a processing unit 1706 coupled with the display unit 1702, and the touch-sensitive surface unit 1704. In some embodiments, the processing unit 1706 includes: a communication receiving unit 1708, a display enablement unit 1710, a notification selection unit 1712, a notification clearance unit 1714, a notification storage unit 1716, a user input receiving unit 1718, an application activation unit 1720, and a user authentication unit 1722.

The processing unit 1706 is configured to: receive a communication (e.g., with communication receiving unit 1708); enable display of a short version of a notification that corresponds to the communication (e.g., with display enablement unit 1710); detect a gesture directed to the notification (e.g., with user input detection unit 1718); in accordance with a determination that the gesture is in a first direction, clear the notification (e.g., with notification clearance unit 1714); in accordance with a determination that the gesture is in a second direction, enable display of a long version of the notification (e.g., with display enablement unit 1710); in accordance with a determination that the gesture is in a third direction, enable display of an application associated with the notification (e.g., with display enablement unit 1710 and application activation unit 1720); and in accordance with a determination that the gesture is in a fourth direction, store the notification for later review (e.g., with notification storage unit 1716).

In some embodiments, the processing unit 1706 is further configured to: in accordance with the determination that the gesture is in the third direction, before displaying the application associated with the notification, enter an authentication mode (e.g., with user authentication unit 1722), where in response to detecting input by a user in the authentication mode that authenticates the user (e.g., with user input detection unit 1718 and user authentication unit 1722), the application associated with the notification is enabled for display (e.g., with display enablement unit 1710).

In some embodiments, a cleared notification is not displayed again in the form of a notification. In some embodiments, the long version of the notification replaces the short version of the notification on the display. In some embodiments, enabling for display the application associated with the notification includes enabling for display content of the communication in the application (e.g., with display enablement unit 1710 and application activation unit 1720).

In some embodiments, the short version of the notification is displayed while the device is in a locked state. In some embodiments, the device remains in the locked state when the long version of the notification is displayed. In some embodiments, the device remains in the locked state when the notification is cleared. In some embodiments, the first direction is leftward. In some embodiments, the second direction is downward. In some embodiments, the third direction is rightward. In some embodiments, the fourth direction is upward. In some embodiments, a notification center opens from a top edge of the display and the fourth direction is upward. In some embodiments, the second direction is downward and the long version of the notification extends vertically downward from the location of the short version of the notification.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 10A-10B are, optionally, implemented by components depicted in FIGS. 1A-1B or FIG. 17. For example, gesture detection operation 1006, display operation 1014, and storage operation 1030 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 18:
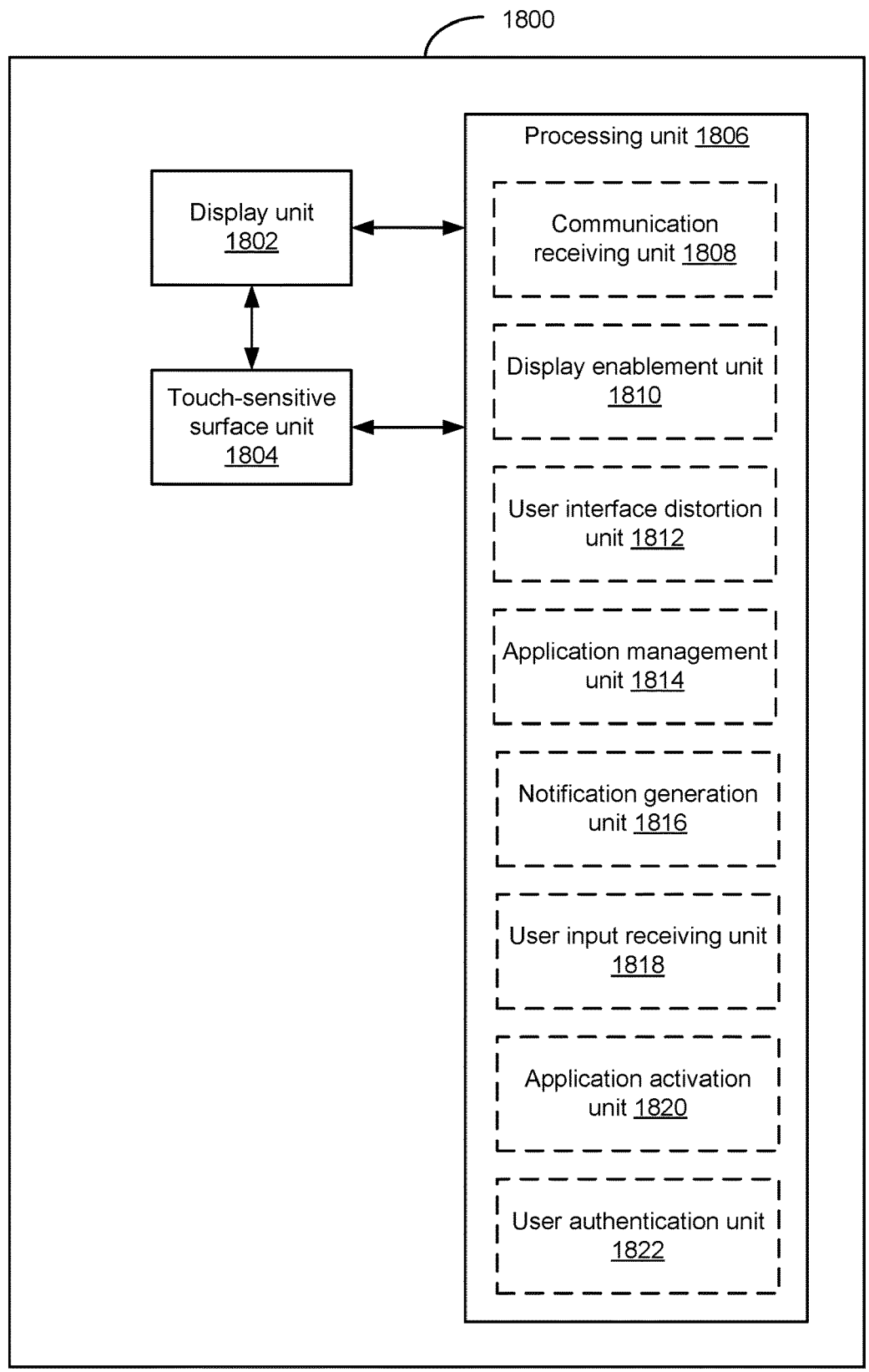

In accordance with some embodiments, FIG. 18 shows a functional block diagram of an electronic device 1800 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 18 are, optionally, combined or separated into sub-blocks to implement the principles of the various described embodiments. Therefore, the description herein optionally supports any possible combination or separation or further definition of the functional blocks described herein.

As shown in FIG. 18, an electronic device 1800 includes a display unit 1802 configured to display a user interface, and a touch-sensitive surface unit 1804 configured to receive contacts; and a processing unit 1806 coupled with the display unit 1802, and the touch-sensitive surface unit 1804. In some embodiments, the processing unit 1806 includes: a communication receiving unit 1808, a display enablement unit 1810, a user interface distortion unit 1812, an application management unit 1814, a notification generation unit 1816, a user input receiving unit 1818, an application activation unit 1820, and a user authentication unit 1822.

The processing unit 1806 is configured to: receive one or more communications while the device is in a locked state (e.g., with communication receiving unit 1808); enable for display one or more notifications that correspond to the one or more communications on a lock screen while the device is in the locked state (e.g., with display enablement unit 1810); receive a user input directed to a first notification of the one or more notifications displayed on the lock screen (e.g., with user input receiving unit 1818) to invoke an application associated with the first notification (e.g., with application activation unit 1820); generate a blurred version of a first user interface for the application associated with the first notification (e.g., with user interface distortion unit 1812); and enable for display the blurred version of the first user interface for the application on the lock screen (e.g., with display enablement unit 1810) and a prompt for authentication input in response to receiving the user input (e.g., with user authentication unit 1822).

In some embodiments, the processing unit 1806 is further configured to: while enabling for display the blurred version of the first user interface, receive a first authentication input (e.g., with user input receiving unit 1818); verify the first authentication input (e.g., with user authentication unit 1822); and enable for display a version of the first user interface (e.g., with display enablement unit 1810) for the application without blurring upon successful verification of the first authentication input (e.g., with user authentication unit 1822).

In some embodiments, enabling for display the version of the first user interface (e.g., with display enablement unit 1810) without blurring includes: enabling for display an animated transition between the blurred version of the first user interface and the version of the first user interface without blurring (e.g., with display enablement unit 1810 and user interface distortion unit 1812).

In some embodiments, the processing unit 1806 is further configured to: in response to receiving the user input directed to the first notification, and before receiving the first authentication input: place the application over a last active application on an application stack (e.g., with application management unit 1814), such that the application is activated upon successful verification of the first authentication input instead of the last active application (e.g., with application activation unit 1820).

In some embodiments, generating the blurred version of the first user interface (e.g., with user interface distortion unit 1812) includes keeping some information contained in the first notification unobscured in the blurred version of the first user interface.

In some embodiments, the processing unit 1806 is further configured to: in accordance with a determination that the one or more notifications include one or more second notifications distinct from the first notification, generate a notification cluster based on the one or more second notifications (e.g., with notification generation unit 1816); and enable for display the notification cluster over the blurred version of the first user interface for the application on the lock screen (e.g., with display enablement unit 1810).

In some embodiments, the processing unit 1806 is further configured to: maintain enabling display of the notification cluster for at least a predetermined time period over a version of the first user interface for the application without blurring upon successful verification of the first authentication input (e.g., with display enablement unit 1810).

In some embodiments, the processing unit 1806 is further configured to: cease to enable display of the notification cluster after the at least predetermined time period if no user input is detected on the notification cluster (e.g., with display enablement unit 1810). In some embodiments, the processing unit 1806 is further configured to: store the one or more second notifications for later review (e.g., with notification generation unit 1816).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 11A-11B are, optionally, implemented by components depicted in FIGS. 1A-1B or FIG. 18. For example, displaying operation 1104, user interface distortion generation operation 1108, and input receiving operation 1114 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 19:
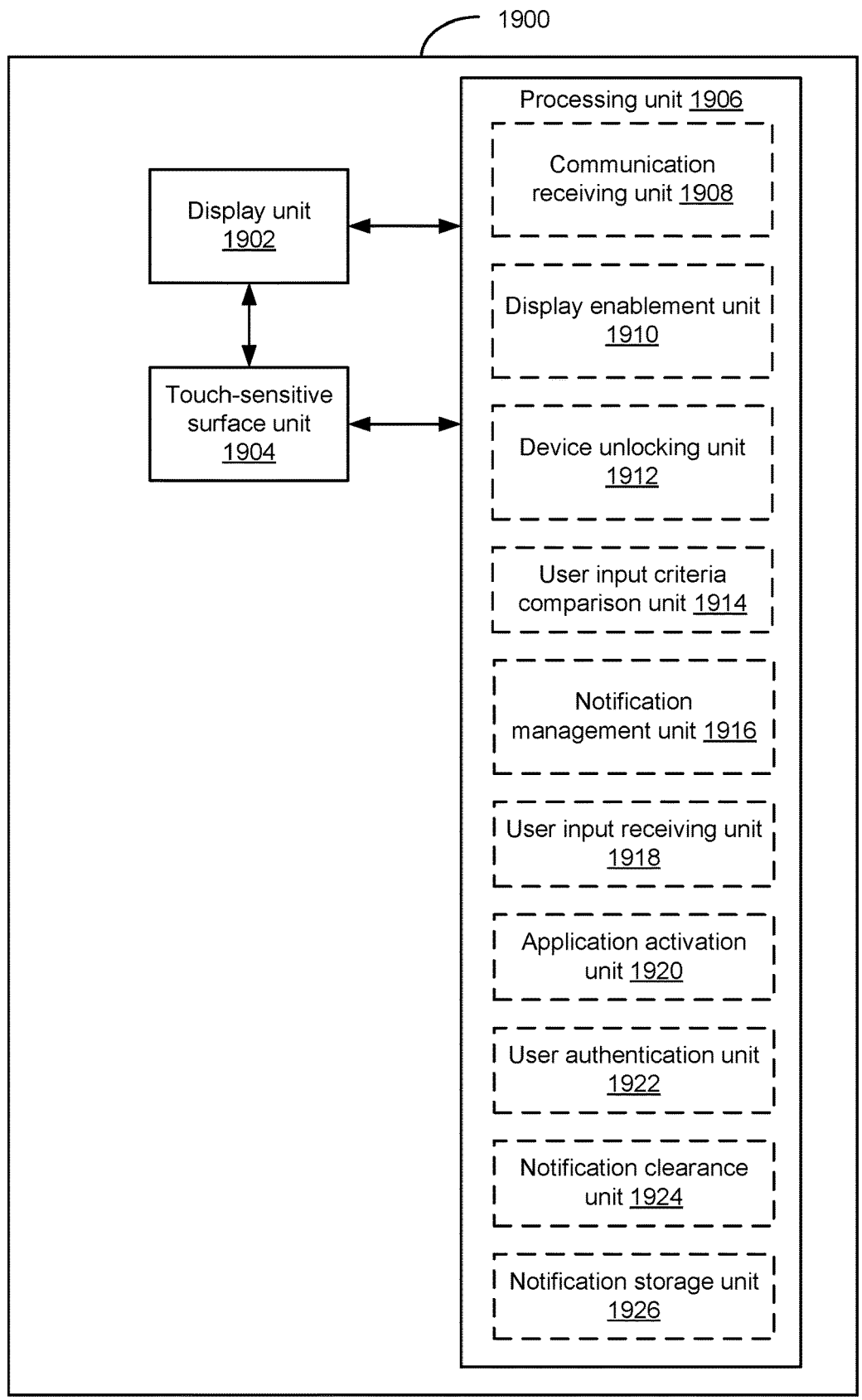

In accordance with some embodiments, FIG. 19 shows a functional block diagram of an electronic device 1900 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 19 are, optionally, combined or separated into sub-blocks to implement the principles of the various described embodiments. Therefore, the description herein optionally supports any possible combination or separation or further definition of the functional blocks described herein.

As shown in FIG. 19, an electronic device 1900 includes a display unit 1902 configured to display a user interface, and a touch-sensitive surface unit 1904 configured to receive contacts; and a processing unit 1906 coupled with the display unit 1902, and the touch-sensitive surface unit 1904. In some embodiments, the processing unit 1906 includes: a communication receiving unit 1908, a display enablement unit 1910, a device unlocking unit 1912, a user input criteria comparison unit 1914, a notification management unit 1916, a user input receiving unit 1918, an application activation unit 1920, a user authentication unit 1922, a notification clearance unit 1924 and a notification storage unit 1926.

The processing unit 1906 is configured to: enable for display a plurality of notifications on a lock screen while the device is in a locked state (e.g., with display enablement unit 1910); detect an authentication input to unlock the device (e.g., with user authentication unit 1922); in response to detecting the authentication input to unlock the device, verify the authentication input (e.g., with user authentication unit 1922); unlock the device in accordance with successful verification of the authentication input (e.g., with device unlocking unit 1912); in response to unlocking of the device in accordance with successful verification of the authentication input, enable for display a first user interface of the device (e.g., with display enablement unit 1910); and arrange the plurality of notifications into a cluster overlaid on the first user interface (e.g., with notification management unit 1916).

In some embodiments, the processing unit 1906 is further configured to: while the cluster is overlaid on the first user interface, receive a user input directed to the cluster (e.g., with user input receiving unit 1918); in response to receiving the user input directed to the cluster, determine whether the user input satisfies a first criterion (e.g., with user input criteria comparison unit 1914); and in accordance with a determination that the user input satisfies the first criterion, expand the notification cluster to show the plurality of notifications (e.g., with notification management unit).

In some embodiments, the processing unit 1906 is further configured to: while the cluster is overlaid on the first user interface, receive a user input directed to the cluster (e.g., with user input receiving unit 1918); and in response to receiving the user input directed to the cluster, determine whether the user input satisfies a second criterion (e.g., with user input criteria comparison unit 1914); and in accordance with a determination that the user input satisfies the second criterion, cease to enable display of the cluster (e.g., with display enablement unit 1910).

In some embodiments, the processing unit 1906 is further configured to: clear the plurality of notifications after ceasing to enable display of the cluster (e.g., with notification clearance unit 1924). In some embodiments, a cleared notification is not displayed as a notification again.

In some embodiments, the processing unit 1906 is further configured to: store the plurality of notifications in a notification center after ceasing to enable display of the cluster (e.g., with notification storage unit 1926).

In some embodiments, the processing unit 1906 is further configured to: determine whether a user input directed to the cluster has been received during a predetermined time window since the cluster was overlaid on the first user interface (e.g., with user input criteria comparison unit 1914); and, in accordance with a determination that no user input directed to the cluster has been received during the predetermined time window since the cluster was overlaid on the first user interface, cease to enable display of the cluster (e.g., with display enablement unit 1910).

In some embodiments, the processing unit 1906 is further configured to: clear the plurality of notifications after ceasing to enable display of the cluster (e.g., with notification clearance unit 1924). In some embodiments, the processing unit 1906 is further configured to: store the plurality of notifications in a notification center after ceasing to enable display of the cluster (e.g., with notification storage unit 1926).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 12A-12B are, optionally, implemented by components depicted in FIGS. 1A-1B or FIG. 19. For example, display operation 1202, detection operation 1204, and unlocking operation 1208 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 20:
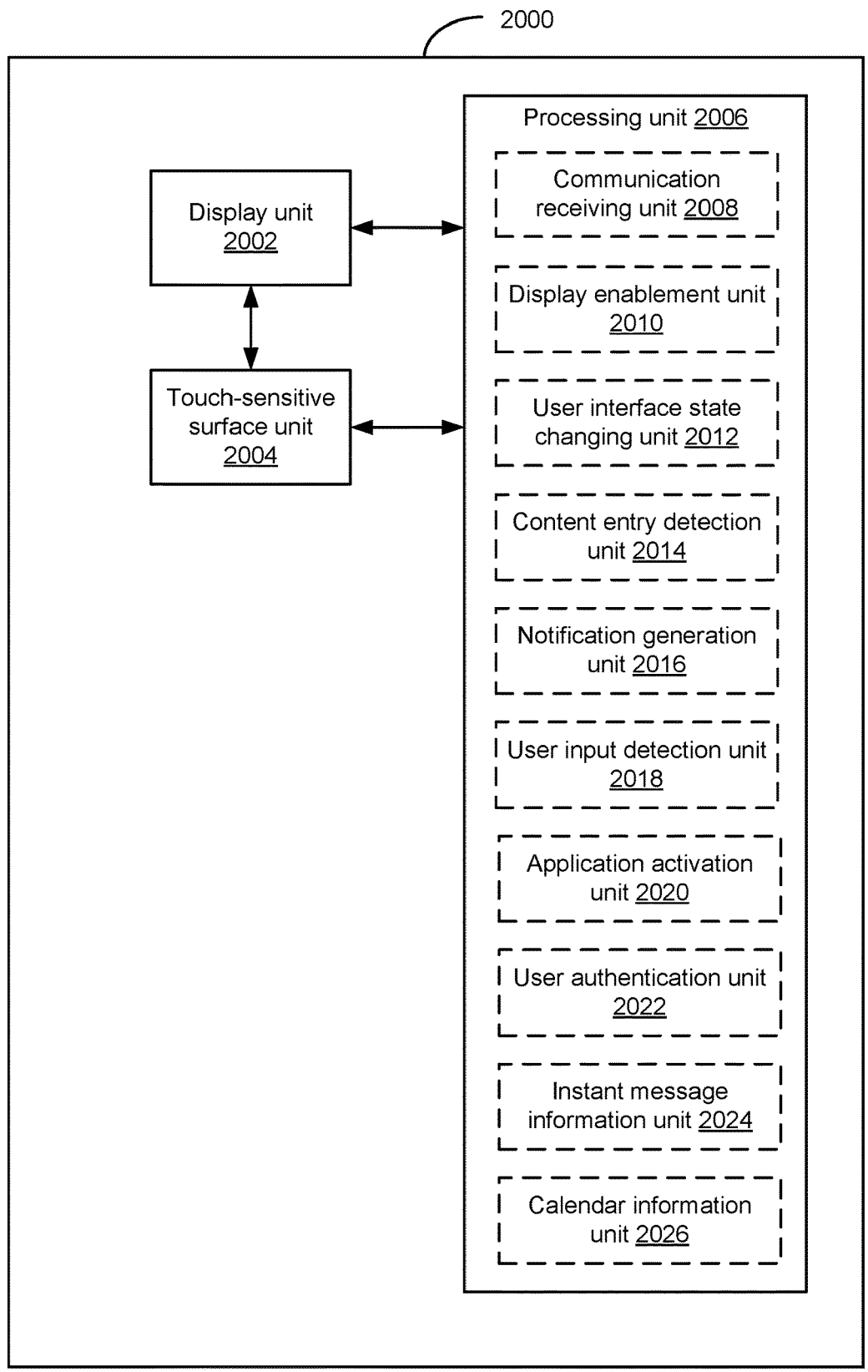

In accordance with some embodiments, FIG. 20 shows a functional block diagram of an electronic device 2000 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 20 are, optionally, combined or separated into sub-blocks to implement the principles of the various described embodiments. Therefore, the description herein optionally supports any possible combination or separation or further definition of the functional blocks described herein.

As shown in FIG. 20, an electronic device 2000 includes a display unit 2002 configured to display a user interface, and a touch-sensitive surface unit 2004 configured to receive contacts; and a processing unit 2006 coupled with the display unit 2002, and the touch-sensitive surface unit 2004. In some embodiments, the processing unit 2006 includes: a communication receiving unit 2008, a display enablement unit 2010, a user interface state changing unit 2012, a content entry detection unit 2014, a notification generation unit 2016, a user input detection unit 2018, an application activation unit 2020, a user authentication unit 2022, an instant message information unit 2024 and a calendar information unit 2026.

The processing unit 2006 is configured to: receive a communication associated with an application (e.g., with communication receiving unit 2008); enable for display a notification that corresponds to the communication (e.g., with display enablement unit 2010), wherein the displayed notification includes a user interface that provides a subset of functionalities available in the application; while enabling for display the notification, detect user interaction with the user interface of the notification (e.g., with user input detection unit 2018), wherein the user interaction causes changes to an initial local state of the user interface (e.g., with user interface state changing unit 2012); in response to detecting the user interaction with the user interface of the notification, enable for display a current local state of the user interface that is different from the initial local state of the user interface (e.g., with display enablement unit 2010); while enabling for display the current local state of the user interface, receive a user input invoking the application from the user interface of the notification (e.g., with user input detection unit 2018); and in response to receiving the user input invoking the application from the user interface of the notification, start the application in a modified state, different from a default initial state of the application, wherein the modified state is generated based on the current local state of the user interface of the notification (e.g., with application activation unit 2020).

In some embodiments, detecting the user interaction with the user interface of the notification further includes detecting entry of content in the user interface of the notification by the user (e.g., with content entry detection unit 2014).

In some embodiments, the communication is an instant message associated with an instant messaging application, the initial local state of the user interface includes a reply input field configured to receive a reply message input, the current local state of the user interface includes the reply input field and first message input provided in the reply input field by a user, and starting the application in the modified state includes displaying the first message input in the user interface of the instant messaging application (e.g., with instant message information unit 2024).

In some embodiments, detecting the user interaction with the user interface of the notification includes detecting a change in user interface configuration of the user interface of the notification in response to manipulation of the user interface by a user (e.g., with user interface state changing unit 2012 and user input detection unit 2018).

In some embodiments, the communication is a calendar invitation associated with a calendar application, the initial local state of the user interface includes a first portion of a calendar in a first view, the current local state of the user interface includes a second portion of the calendar in a second view that is different from the first portion of the calendar in the first view, and starting the application in the modified state includes displaying the second portion of the calendar in the second view (e.g., with calendar information unit 2026).

In some embodiments, displaying the notification that corresponds to the communication further comprises displaying the notification on a lock screen, and the processing unit 2006 is further configured to: request and process an authentication input before starting the application in a modified state (e.g., with user authentication unit 2022).

In some embodiments, the processing unit 2006 is further configured to: provide data regarding the current local state of the user interface of the notification to the application (e.g., with user interface state changing unit 2012). In some embodiments, the processing unit 2006 is further configured to: store the data regarding the current local state of the user interface of the notification in a data store accessible by the application (e.g., with user interface state changing unit 2012).

In some embodiments, providing data regarding the current local state of user interface of the notification to the application further comprises sending the data regarding the current local state of the user interface of the notification to the application (e.g., with user interface state changing unit 2012).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 13A-13B are, optionally, implemented by components depicted in FIGS. 1A-1B or FIG. 20. For example, notification displaying operation 1304, detection operation 1308, and application starting operation 1314 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at an electronic device with a display:
   receiving a communication associated with an application;
   displaying a notification that corresponds to the communication, wherein the displayed notification includes a user interface that provides a subset of functionalities available in the application;
   while displaying the notification, detecting user interaction with the user interface of the notification, including entry of content by a user in a reply input field of the user interface of the notification, wherein the user interaction causes changes to an initial local state of the user interface of the notification;
   in response to detecting the user interaction with the user interface of the notification, displaying a current local state of the user interface of the notification that is different from the initial local state of the user interface of the notification;
   while displaying the current local state of the user interface of the notification, receiving a user input invoking the application from the user interface of the notification; and,
   in response to receiving the user input invoking the application from the user interface of the notification, starting the application in a modified state, different from a default initial state of the application, wherein the modified state of the application is generated based on the current local state of the user interface of the notification, the modified state of the application including a message input field that includes the content entered by the user in the reply input field of the user interface of the notification.

2. The method of claim 1, wherein the communication is an instant message associated with an instant messaging application, the initial local state of the user interface includes the reply input field configured to receive a reply message input, the current local state of the user interface includes the reply input field and a first message input provided in the reply input field by the user, and starting the application in the modified state includes displaying, in a user interface of the instant messaging application, the first message input in the message input field.

3. The method of claim 1, wherein detecting the user interaction with the user interface of the notification includes:
   detecting a change in user interface configuration of the user interface of the notification in response to manipulation of the user interface by a user.

4. The method of claim 1, wherein displaying the notification that corresponds to the communication further comprises displaying the notification on a lock screen, and wherein the method includes:
   requesting and processing an authentication input before starting the application in a modified state.

5. The method of claim 1, including:
   providing data regarding the current local state of the user interface of the notification to the application.

6. The method of claim 5, including:
   storing the data regarding the current local state of the user interface of the notification in a data store accessible by the application.

7. The method of claim 5, wherein providing data regarding the current local state of the user interface of the notification to the application further comprises:
   sending the data regarding the current local state of the user interface of the notification to the application.

8. An electronic device, comprising:
   a display;
   one or more processors;
   memory; and
   one or more programs, wherein the one or more programs are stored in the memory and configured to be executed by the one or more processors, the one or more programs including instructions that cause the electronic device to perform a set of operations, comprising:
      receiving a communication associated with an application;
      displaying a notification that corresponds to the communication, wherein the displayed notification includes a user interface that provides a subset of functionalities available in the application;
      while displaying the notification, detecting user interaction with the user interface of the notification, including entry of content by a user in a reply input field of the user interface of the notification, wherein the user interaction causes changes to an initial local state of the user interface of the notification;
      in response to detecting the user interaction with the user interface of the notification, displaying a current local state of the user interface of the notification that is different from the initial local state of the user interface of the notification;
      while displaying the current local state of the user interface of the notification, receiving a user input invoking the application from the user interface of the notification; and,
      in response to receiving the user input invoking the application from the user interface of the notification, starting the application in a modified state, different from a default initial state of the application, wherein the modified state of the application is generated based on the current local state of the user interface of the notification, the modified state of the application including a message input field that includes the content entered by the user in the reply input field of the user interface of the notification.

9. The electronic device of claim 8, wherein the communication is an instant message associated with an instant messaging application, the initial local state of the user interface includes the reply input field configured to receive a reply message input, the current local state of the user interface includes the reply input field and first message input provided in the reply input field by a user, and starting the application in the modified state includes displaying, in a user interface of the instant messaging application, the first message input in the message input field.

10. The electronic device of claim 8, wherein detecting the user interaction with the user interface of the notification includes:
   detecting a change in user interface configuration of the user interface of the notification in response to manipulation of the user interface by a user.

11. A non-transitory computer readable storage medium storing one or more programs, which, when executed by an electronic device having a display and one or more processors configured to executed the one or more programs, cause the electronic device to:
   receive a communication associated with an application;
   display a notification that corresponds to the communication, wherein the displayed notification includes a user interface that provides a subset of functionalities available in the application;
   while displaying the notification, detect user interaction with the user interface of the notification, including entry of content by a user in a reply input field of the user interface of the notification, wherein the user interaction causes changes to an initial local state of the user interface of the notification;
   in response to detecting the user interaction with the user interface of the notification, display a current local state of the user interface of the notification that is different from the initial local state of the user interface of the notification;
   while displaying the current local state of the user interface of the notification, receive a user input invoking the application from the user interface of the notification; and,
   in response to receiving the user input invoking the application from the user interface of the notification, start the application in a modified state, different from a default initial state of the application, wherein the modified state of the application is generated based on the current local state of the user interface of the notification, the modified state of the application including a message input field that includes the content entered by the user in the reply input field of the user interface of the notification.

12. The computer readable storage medium of claim 11, wherein the communication is an instant message associated with an instant messaging application, the initial local state of the user interface includes the reply input field configured to receive a reply message input, the current local state of the user interface includes the reply input field and first message input provided in the reply input field by a user, and starting the application in the modified state includes displaying, in a user interface of the instant messaging application, the first message input in the message input field.

13. The computer readable storage medium of claim 11, wherein detecting the user interaction with the user interface of the notification includes:

detecting a change in user interface configuration of the user interface of the notification in response to manipulation of the user interface by a user.

14. The computer readable storage medium of claim 11, wherein displaying the notification that corresponds to the communication further comprises displaying the notification on a lock screen, and wherein the one or more programs include instructions, which, when executed by the electronic device, cause the electronic device to:

request and process an authentication input before starting the application in a modified state.

15. The computer readable storage medium of claim 11, wherein the one or more programs include instructions, which, when executed by the electronic device, cause the electronic device to:

provide data regarding the current local state of the user interface of the notification to the application.

16. The computer readable storage medium of claim 15, wherein the one or more programs include instructions, which, when executed by the electronic device, cause the electronic device to:

store the data regarding the current local state of the user interface of the notification in a data store accessible by the application.

17. The computer readable storage medium of claim 15, wherein providing data regarding the current local state of the user interface of the notification to the application further comprises:

sending the data regarding the current local state of the user interface of the notification to the application.

18. The electronic device of claim 8, wherein displaying the notification that corresponds to the communication further comprises displaying the notification on a lock screen, and wherein the one or more programs include instructions for requesting and processing an authentication input before starting the application in a modified state.

19. The electronic device of claim 8, wherein the one or more programs include instructions for providing data regarding the current local state of the user interface of the notification to the application.

20. The electronic device of claim 19, wherein the one or more programs include instructions for storing the data regarding the current local state of the user interface of the notification in a data store accessible by the application.

21. The electronic device of claim 19, wherein providing data regarding the current local state of the user interface of the notification to the application further comprises:

sending the data regarding the current local state of the user interface of the notification to the application.

\* \* \* \* \*

UNITED STATES PATENT AND TRADEMARK OFFICE
CERTIFICATE OF CORRECTION

PATENT NO. : 11,635,887 B2
APPLICATION NO. : 16/136178
DATED : April 25, 2023
INVENTOR(S) : Yang et al.

Page 1 of 1

It is certified that error appears in the above-identified patent and that said Letters Patent is hereby corrected as shown below:

In the Claims

Claim 11, Column 86, Line 34, please delete "to executed the" and insert --to execute the--.

Signed and Sealed this
Third Day of October, 2023

Katherine Kelly Vidal
*Director of the United States Patent and Trademark Office*